US008884975B2

(12) United States Patent
Satoh et al.

(10) Patent No.: US 8,884,975 B2
(45) Date of Patent: Nov. 11, 2014

(54) IMAGE PROJECTION APPARATUS, MEMORY CONTROL APPARATUS, LASER PROJECTOR, AND MEMORY ACCESS METHOD

(75) Inventors: Tetsuya Satoh, Miyagi (JP); Hideaki Yamamoto, Kanagawa (JP); Kenichiroh Saisho, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 197 days.

(21) Appl. No.: 13/295,384

(22) Filed: Nov. 14, 2011

(65) Prior Publication Data

US 2012/0127184 A1 May 24, 2012

(30) Foreign Application Priority Data

Nov. 19, 2010 (JP) ................................. 2010-259459
Mar. 22, 2011 (JP) ................................. 2011-063216

(51) Int. Cl.
| | | |
|---|---|---|
| G06T 1/60 | (2006.01) | |
| G06F 12/00 | (2006.01) | |
| G09G 5/36 | (2006.01) | |
| G09G 5/00 | (2006.01) | |
| H04N 9/31 | (2006.01) | |

(52) U.S. Cl.
CPC ........... H04N 9/3197 (2013.01); H04N 9/3129 (2013.01); H04N 9/3185 (2013.01)
USPC ............ 345/530; 345/564; 345/545; 345/581

(58) Field of Classification Search
None
See application file for complete search history.

(56) References Cited

U.S. PATENT DOCUMENTS

| 4,504,146 A | * | 3/1985 | Morgan ........................ 356/472 |
|---|---|---|---|
| 4,649,234 A | * | 3/1987 | Jans .............................. 379/138 |
| 4,754,399 A | * | 6/1988 | Yamamoto et al. ............. 710/57 |
| 5,097,480 A | * | 3/1992 | Pease .............................. 372/97 |
| 5,157,735 A | * | 10/1992 | Maeda et al. ................. 382/141 |
| 5,300,942 A | * | 4/1994 | Dolgoff .......................... 345/32 |

(Continued)

FOREIGN PATENT DOCUMENTS

| JP | 08-065686 | 3/1996 |
|---|---|---|
| JP | 11-184751 | 7/1999 |

(Continued)

OTHER PUBLICATIONS

Partial European Search Report dated Mar. 19, 2012.

(Continued)

*Primary Examiner* — Said Broome
*Assistant Examiner* — Charles L Beard
(74) *Attorney, Agent, or Firm* — IPUSA, PLLC

(57) ABSTRACT

An image projection apparatus includes an input part that inputs image data, a frame memory that stores the image data, a laser oscillator that radiates a laser to a screen, a deflection part including a reflective optical element and configured to oscillate the reflective optical element with respect to two perpendicularly intersecting axes, a storage part that stores coefficient data of a polynomial expression, an irradiation position calculating part that calculates an irradiation position based on a coefficient obtained by using the coefficient data and an oscillation angle of the reflective optical element, an address calculating part that calculates an address in the frame memory corresponding to the irradiation position, a memory control part that reads out pixel data of the address, and a laser drive part that oscillates the laser oscillator in accordance with a luminance that corresponds to the pixel data.

14 Claims, 44 Drawing Sheets

(56) References Cited

U.S. PATENT DOCUMENTS

| | | | |
|---|---|---|---|
| 5,398,212 A | 3/1995 | Imura et al. | |
| 5,781,135 A * | 7/1998 | Kim et al. | 341/67 |
| 5,880,786 A | 3/1999 | Oku et al. | |
| 5,950,229 A * | 9/1999 | Jeddeloh | 711/150 |
| 6,412,039 B1 * | 6/2002 | Chang | 711/5 |
| 6,456,329 B1 * | 9/2002 | Tinker et al. | 348/448 |
| 6,547,397 B1 * | 4/2003 | Kaufman et al. | 353/28 |
| 6,590,606 B1 * | 7/2003 | Hiller et al. | 348/203 |
| RE38,618 E * | 10/2004 | West | 348/537 |
| 6,989,823 B1 * | 1/2006 | Lasneski | 345/204 |
| 7,164,442 B2 * | 1/2007 | Takane | 348/240.2 |
| 7,256,917 B2 * | 8/2007 | Ishihara | 359/202.1 |
| 7,492,495 B2 * | 2/2009 | Ishihara et al. | 359/202.1 |
| 7,669,037 B1 * | 2/2010 | Schumacher et al. | 712/34 |
| 7,743,176 B1 * | 6/2010 | Turney et al. | 710/22 |
| 7,835,053 B2 * | 11/2010 | Takemoto et al. | 359/207.7 |
| 7,839,552 B2 * | 11/2010 | Ishihara | 359/206.1 |
| 7,957,047 B2 * | 6/2011 | Konno | 359/215.1 |
| 7,972,011 B2 * | 7/2011 | Kurozuka et al. | 353/50 |
| 8,274,522 B2 * | 9/2012 | Brown et al. | 345/560 |
| 2002/0051095 A1 * | 5/2002 | Su | 348/745 |
| 2002/0125324 A1 * | 9/2002 | Yavid et al. | 235/462.45 |
| 2003/0035590 A1 * | 2/2003 | Takeuchi et al. | 382/254 |
| 2003/0038810 A1 * | 2/2003 | Emberling | 345/540 |
| 2003/0067587 A1 * | 4/2003 | Yamasaki et al. | 353/30 |
| 2003/0085849 A1 * | 5/2003 | Grabert | 345/30 |
| 2003/0085867 A1 * | 5/2003 | Grabert | 345/156 |
| 2003/0103047 A1 * | 6/2003 | Chiabrera et al. | 345/419 |
| 2003/0182353 A1 * | 9/2003 | Flanigan et al. | 709/104 |
| 2003/0222892 A1 * | 12/2003 | Diamond et al. | 345/647 |
| 2003/0231261 A1 * | 12/2003 | Bassi et al. | 348/745 |
| 2004/0125712 A1 * | 7/2004 | Ohkubo et al. | 369/44.32 |
| 2005/0012745 A1 * | 1/2005 | Kondo et al. | 345/427 |
| 2005/0117189 A1 * | 6/2005 | Murakawa et al. | 359/237 |
| 2005/0128578 A1 * | 6/2005 | Sugawara et al. | 359/443 |
| 2005/0219674 A1 * | 10/2005 | Asai et al. | 359/213 |
| 2006/0087628 A1 * | 4/2006 | Dvorkis et al. | 353/121 |
| 2006/0165309 A1 * | 7/2006 | Yachi et al. | 382/284 |
| 2006/0200456 A1 * | 9/2006 | Zohar et al. | 707/4 |
| 2006/0239336 A1 * | 10/2006 | Baraniuk et al. | 375/216 |
| 2006/0280360 A1 * | 12/2006 | Holub | 382/162 |
| 2007/0012875 A1 * | 1/2007 | Miyazawa | 250/234 |
| 2007/0041070 A1 * | 2/2007 | Ishibe et al. | 359/216 |
| 2007/0063134 A1 * | 3/2007 | Wine et al. | 250/235 |
| 2007/0070309 A1 * | 3/2007 | Stern | 353/119 |
| 2007/0285629 A1 * | 12/2007 | Yavid | 353/97 |
| 2008/0080782 A1 * | 4/2008 | Olsson et al. | 382/266 |
| 2008/0136742 A1 * | 6/2008 | Tegreene et al. | 345/7 |
| 2008/0158525 A1 * | 7/2008 | Fujiyo et al. | 353/99 |
| 2008/0180470 A1 * | 7/2008 | Oku | 347/5 |
| 2008/0201521 A1 * | 8/2008 | Mizoguchi | 711/103 |
| 2008/0226029 A1 * | 9/2008 | Weir et al. | 378/65 |
| 2008/0239252 A1 * | 10/2008 | Konno et al. | 353/98 |
| 2008/0266468 A1 * | 10/2008 | Cossairt et al. | 348/759 |
| 2008/0284359 A1 * | 11/2008 | Watanabe | 318/129 |
| 2008/0287806 A1 * | 11/2008 | Wood et al. | 600/473 |
| 2008/0297868 A1 * | 12/2008 | Mizumoto | 359/199 |
| 2009/0027748 A1 * | 1/2009 | Sprague et al. | 359/199 |
| 2009/0033808 A1 * | 2/2009 | Maeda et al. | 348/756 |
| 2009/0040500 A1 * | 2/2009 | Nishiushi | 356/3.11 |
| 2009/0059179 A1 * | 3/2009 | Kobori et al. | 353/52 |
| 2009/0091666 A1 * | 4/2009 | Kurozuka et al. | 348/744 |
| 2009/0096779 A1 * | 4/2009 | Ikegami | 345/214 |
| 2009/0147224 A1 * | 6/2009 | Kurozuka et al. | 353/98 |
| 2009/0180168 A1 * | 7/2009 | Kurozuka et al. | 359/221.2 |
| 2009/0185249 A1 * | 7/2009 | Obi et al. | 359/198.1 |
| 2009/0224136 A1 * | 9/2009 | Ikegami | 250/205 |
| 2009/0225165 A1 * | 9/2009 | Reneker et al. | 348/144 |
| 2009/0228737 A1 * | 9/2009 | Navon et al. | 713/600 |
| 2009/0284816 A1 * | 11/2009 | Davis et al. | 359/199.1 |
| 2010/0066515 A1 * | 3/2010 | Shimazaki et al. | 340/435 |
| 2010/0074596 A1 * | 3/2010 | Satoh et al. | 386/109 |
| 2010/0182137 A1 * | 7/2010 | Pryor | 340/425.5 |
| 2010/0182668 A1 * | 7/2010 | Abe et al. | 359/202.1 |
| 2010/0195180 A1 * | 8/2010 | Akanuma et al. | 359/200.8 |
| 2010/0201894 A1 * | 8/2010 | Nakayama et al. | 348/745 |
| 2010/0309536 A1 * | 12/2010 | Akanuma et al. | 359/200.8 |
| 2010/0315605 A1 * | 12/2010 | Arita | 353/98 |
| 2010/0321478 A1 * | 12/2010 | Sliwa et al. | 348/51 |
| 2010/0328640 A1 * | 12/2010 | Uemura | 355/71 |
| 2011/0019021 A1 * | 1/2011 | Yoshizumi | 348/222.1 |
| 2011/0019112 A1 * | 1/2011 | Dolgoff | 349/8 |
| 2011/0051210 A1 * | 3/2011 | Chikaoka et al. | 359/199.1 |
| 2011/0102763 A1 * | 5/2011 | Brown et al. | 356/4.01 |
| 2011/0128602 A1 * | 6/2011 | Hamano et al. | 359/205.1 |
| 2011/0141441 A1 * | 6/2011 | Konno et al. | 353/69 |
| 2011/0199546 A1 * | 8/2011 | Izumida | 348/744 |
| 2011/0267361 A1 * | 11/2011 | Kurozuka | 345/531 |
| 2012/0017147 A1 * | 1/2012 | Mark | 715/702 |
| 2012/0169752 A1 * | 7/2012 | Kurozuka | 345/545 |
| 2012/0182531 A1 * | 7/2012 | Ueno et al. | 353/85 |
| 2012/0257262 A1 * | 10/2012 | Shimizu et al. | 358/475 |
| 2012/0262365 A1 * | 10/2012 | Mallinson | 345/156 |
| 2012/0313974 A1 * | 12/2012 | Ueno et al. | 345/668 |
| 2013/0120428 A1 * | 5/2013 | Freeman et al. | 345/589 |

FOREIGN PATENT DOCUMENTS

| | | |
|---|---|---|
| JP | 2004-295029 | 10/2004 |
| JP | 2005-242036 | 9/2005 |
| JP | 2005-333676 | 12/2005 |
| JP | 2006-337922 | 12/2006 |
| JP | 3923695 | 6/2007 |
| JP | 2007-199251 | 8/2007 |
| JP | 2008-151887 | 7/2008 |
| JP | 2008-227638 | 9/2008 |
| JP | 2008-249797 | 10/2008 |
| JP | 4187425 | 11/2008 |
| JP | 2009-015332 | 1/2009 |
| JP | 2009-180753 | 8/2009 |
| JP | 2009-222973 | 10/2009 |
| JP | 2009-244330 | 10/2009 |
| JP | 2010-008735 | 1/2010 |
| JP | 2010-049232 | 3/2010 |
| JP | 2010-097092 | 4/2010 |
| JP | 4481625 | 6/2010 |
| JP | 4522253 | 8/2010 |
| JP | 2010-230730 | 10/2010 |
| WO | WO 02/101443 A2 | 12/2002 |
| WO | WO 2007/105678 | 9/2007 |
| WO | WO 2010/044205 A1 | 4/2010 |

OTHER PUBLICATIONS

Extended European Search Report dated Feb. 11, 2014.

* cited by examiner

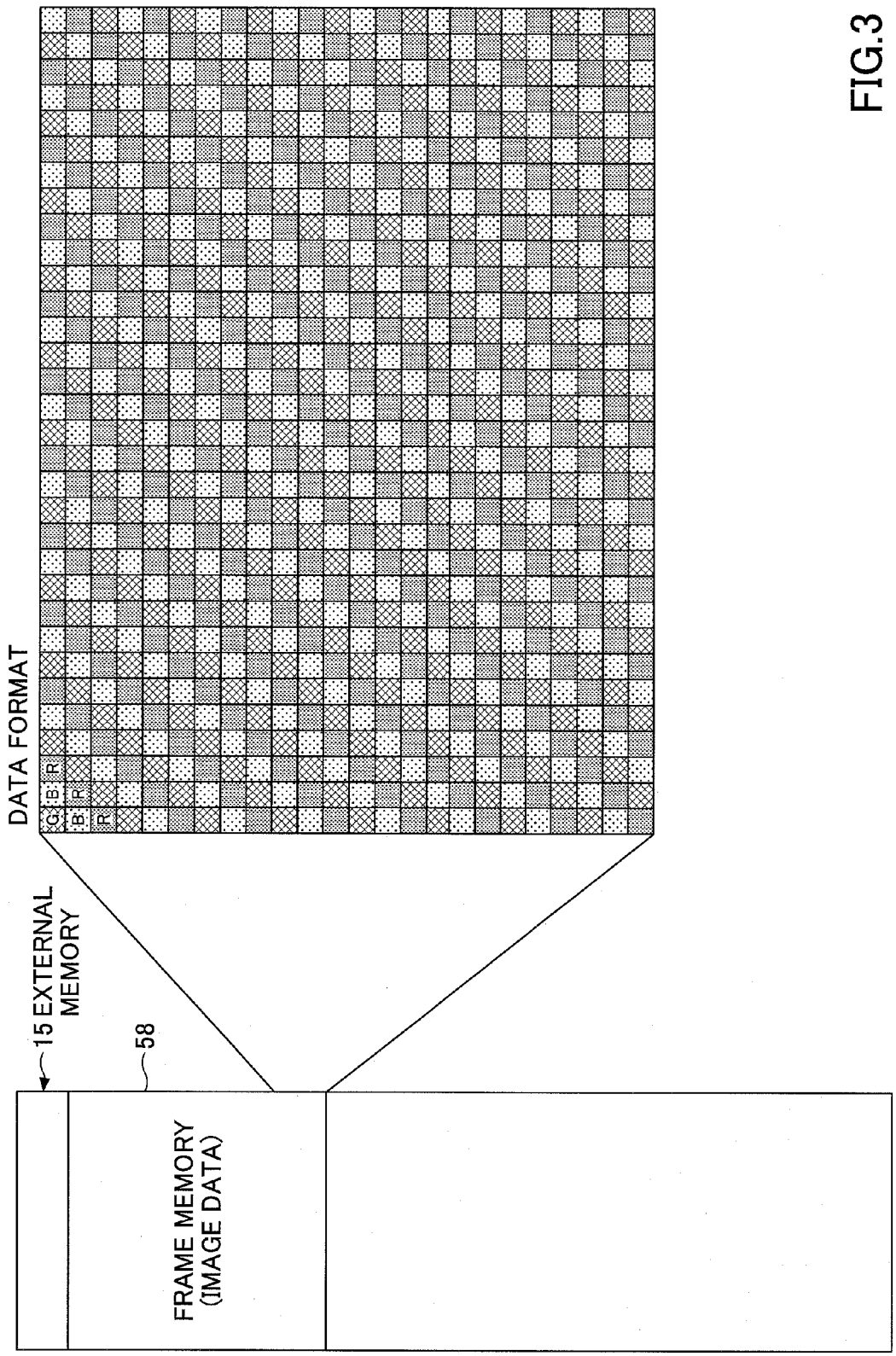

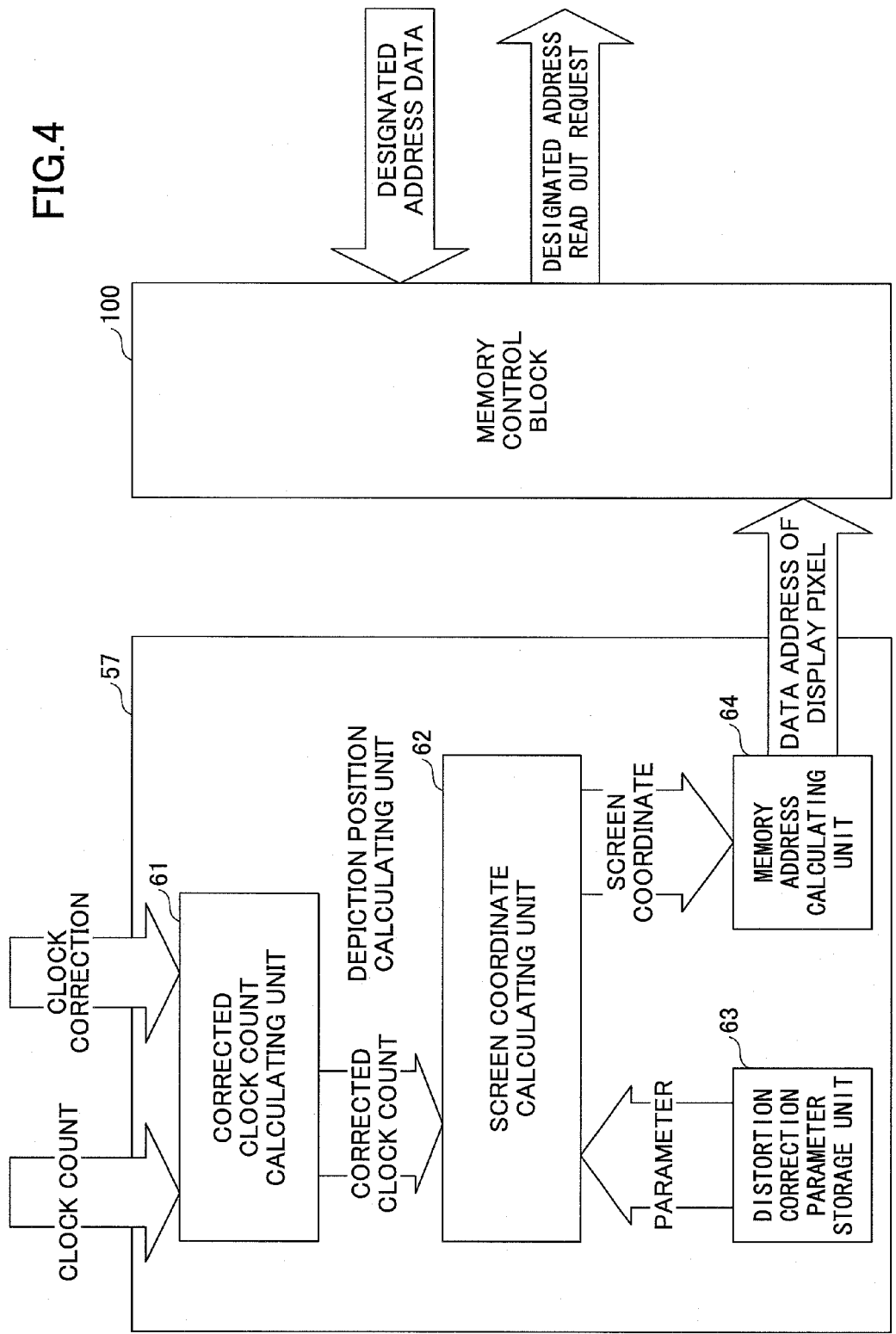

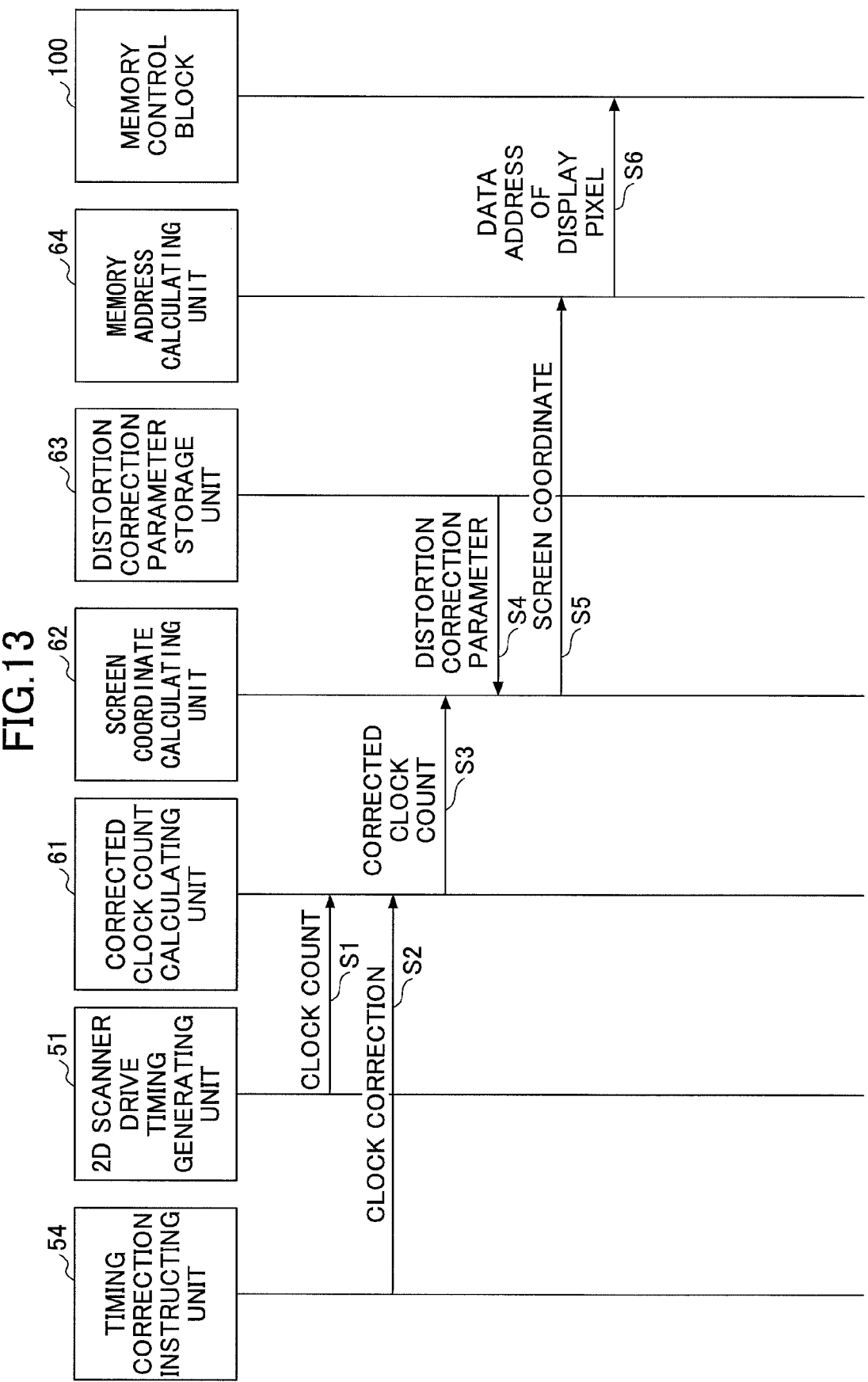

FIG.14

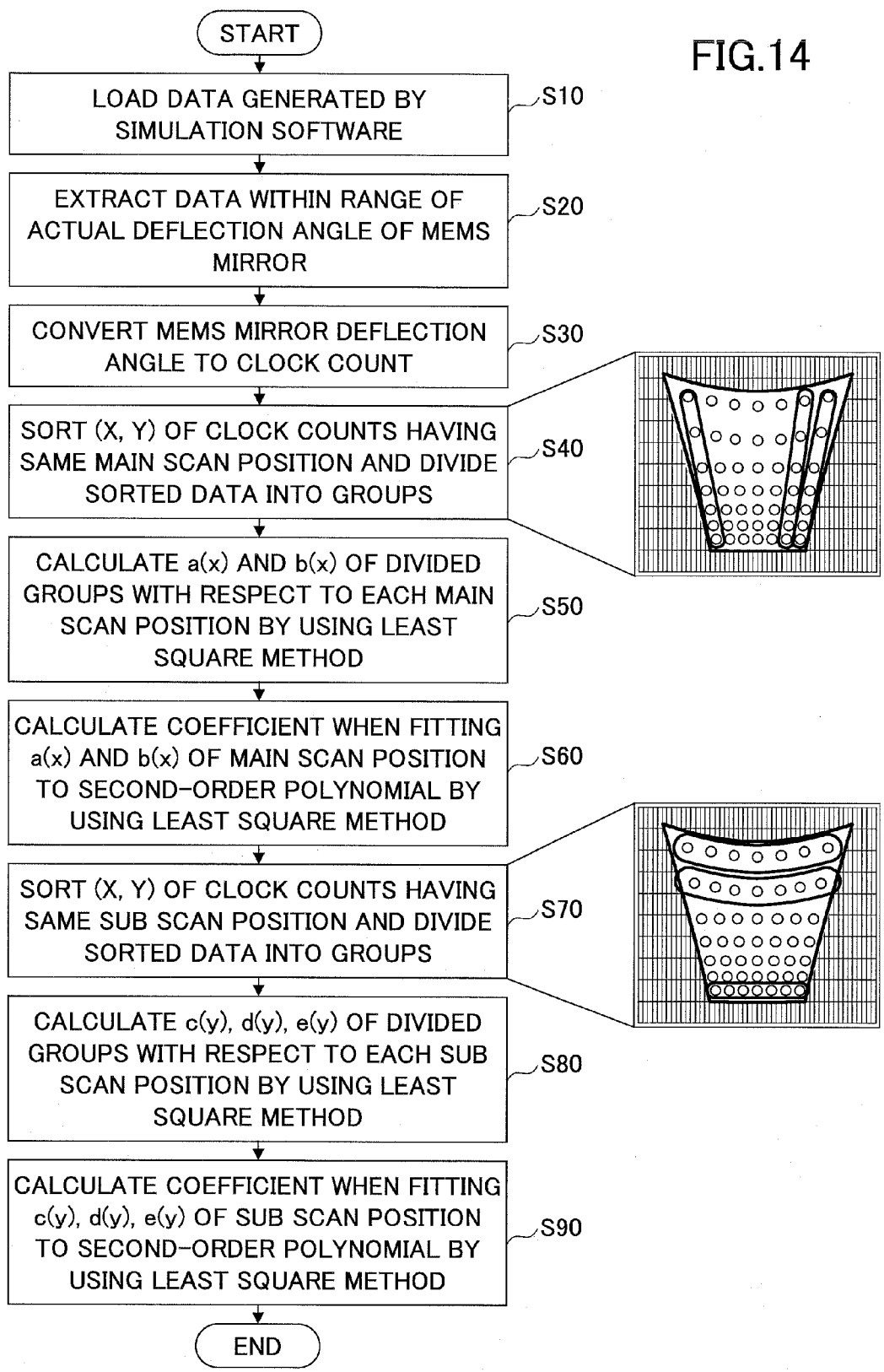

```
              START
                │
                ▼
   ┌──────────────────────────────┐
   │  LOAD DATA GENERATED BY      │── S10
   │  SIMULATION SOFTWARE         │
   └──────────────────────────────┘
                │
                ▼
   ┌──────────────────────────────┐
   │  EXTRACT DATA WITHIN RANGE OF│── S20
   │  ACTUAL DEFLECTION ANGLE OF  │
   │  MEMS MIRROR                 │
   └──────────────────────────────┘
                │
                ▼
   ┌──────────────────────────────┐
   │  CONVERT MEMS MIRROR         │── S30
   │  DEFLECTION ANGLE TO         │
   │  CLOCK COUNT                 │
   └──────────────────────────────┘
                │
                ▼
   ┌──────────────────────────────┐
   │  SORT (X, Y) OF CLOCK COUNTS │── S40
   │  HAVING SAME MAIN SCAN       │
   │  POSITION AND DIVIDE         │
   │  SORTED DATA INTO GROUPS     │
   └──────────────────────────────┘
                │
                ▼
   ┌──────────────────────────────┐
   │  CALCULATE a(x) AND b(x) OF  │
   │  DIVIDED GROUPS WITH RESPECT │── S50
   │  TO EACH MAIN SCAN POSITION  │
   │  BY USING LEAST SQUARE METHOD│
   └──────────────────────────────┘
                │
                ▼
   ┌──────────────────────────────┐
   │  CALCULATE COEFFICIENT WHEN  │
   │  FITTING a(x) AND b(x) OF    │── S60
   │  MAIN SCAN POSITION TO       │
   │  SECOND-ORDER POLYNOMIAL BY  │
   │  USING LEAST SQUARE METHOD   │
   └──────────────────────────────┘
                │
                ▼
   ┌──────────────────────────────┐
   │  SORT (X, Y) OF CLOCK COUNTS │── S70
   │  HAVING SAME SUB SCAN        │
   │  POSITION AND DIVIDE SORTED  │
   │  DATA INTO GROUPS            │
   └──────────────────────────────┘
                │
                ▼
   ┌──────────────────────────────┐
   │  CALCULATE c(y), d(y), e(y)  │
   │  OF DIVIDED GROUPS WITH      │── S80
   │  RESPECT TO EACH SUB SCAN    │
   │  POSITION BY USING LEAST     │
   │  SQUARE METHOD               │
   └──────────────────────────────┘
                │
                ▼
   ┌──────────────────────────────┐
   │  CALCULATE COEFFICIENT WHEN  │
   │  FITTING c(y), d(y), e(y) OF │── S90
   │  SUB SCAN POSITION TO        │
   │  SECOND-ORDER POLYNOMIAL BY  │
   │  USING LEAST SQUARE METHOD   │
   └──────────────────────────────┘
                │
                ▼
               END
```

FIG.20

| PREVAILING STANDARD SIZE | IMAGE SIZE | MEMORY CAPACITY 24bit(32bit)/pix |
|---|---|---|
| VGA | 640x480 | 7.1Mbits(9.4Mbits) |
| SVGA | 800x600 | 11Mbits(15Mbits) |
| XGA | 1024x768 | 18Mbits(24Mbits) |
| SXGA | 1240x1024 | 30Mbits(38.8Mbits) |
| HD(720p) | 1240x720 | 20.5Mbits(27.3Mbits) |
| Full-HD(1080p) | 1920x1080 | 45Mbits(60Mbits) |

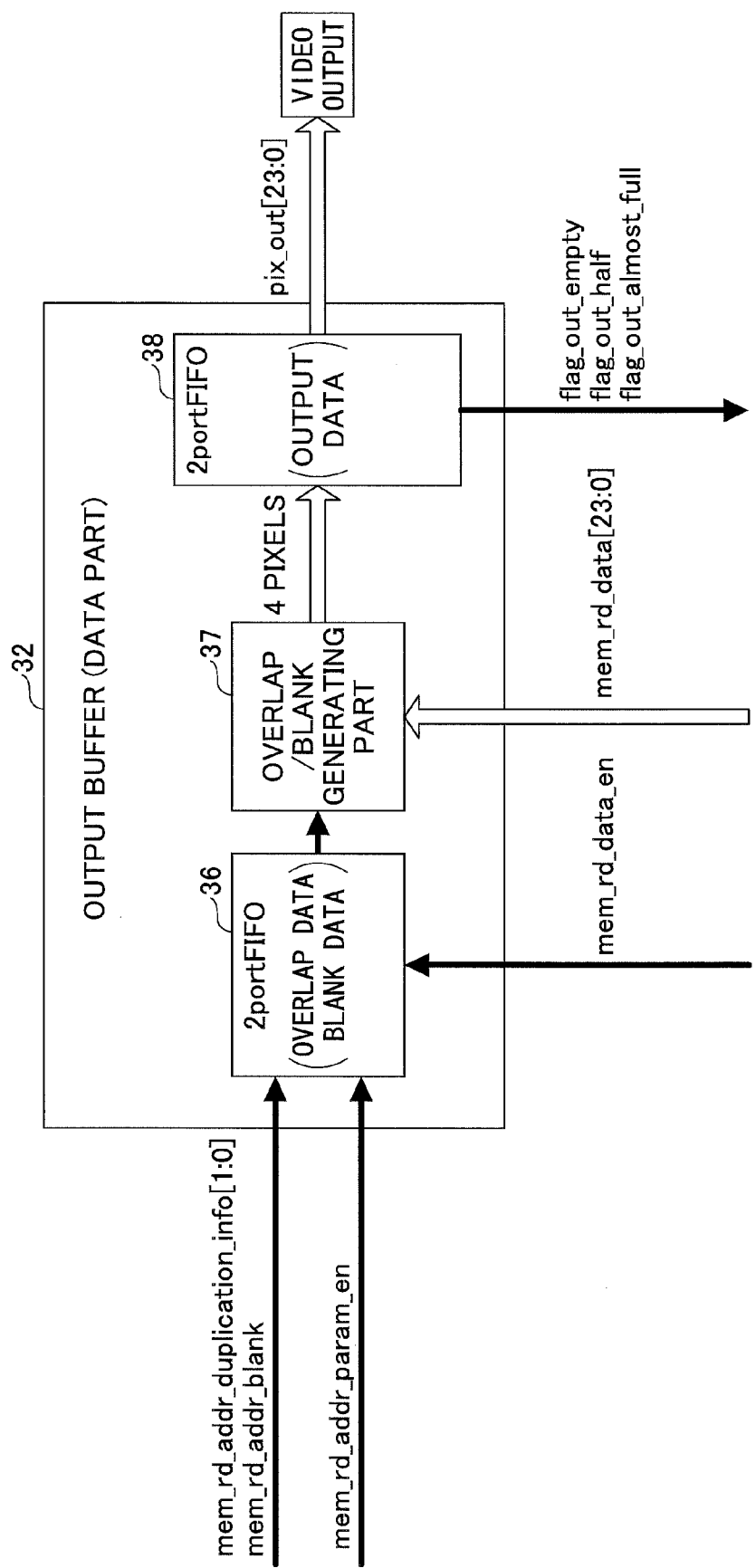

FIG.37

| No. | INPUT FLAG | OUTPUT FLAG | SELECTED BUFFER |
|---|---|---|---|
| 1 | Flag_in_empty | Flag_out_empty | OUTPUT SIDE |
| 2 | Flag_in_empty | NO INDICATION | OUTPUT SIDE |
| 3 | Flag_in_empty | Flag_out_half | OUTPUT SIDE |
| 4 | Flag_in_empty | Flag_out_almost_full | OUTPUT SIDE |
| 5 | NO INDICATION | Flag_out_empty | OUTPUT SIDE |
| 6 | NO INDICATION | NO INDICATION | OUTPUT SIDE |
| 7 | NO INDICATION | Flag_out_half | OUTPUT SIDE |
| 8 | NO INDICATION | Flag_out_almost_full | INPUT SIDE(MAINTAIN UNTIL Flag_in_empty APPEARS) |
| 9 | Flag_in_half | Flag_out_empty | OUTPUT SIDE(MAINTAIN UNTIL Flag_out_half\|Flag_out_addr_empty APPEARS) |
| 10 | Flag_in_half | NO INDICATION | OUTPUT SIDE(MAINTAIN UNTIL Flag_out_half\|Flag_out_addr_empty APPEARS) |
| 11 | Flag_in_half | Flag_out_half | INPUT SIDE(MAINTAIN UNTIL Flag_in_empty APPEARS) |
| 12 | Flag_in_half | Flag_out_almost_full | INPUT SIDE(MAINTAIN UNTIL Flag_in_empty APPEARS) |
| 13 | Flag_in_full | Flag_out_empty | OUTPUT SIDE(ERROR) |
| 14 | Flag_in_full | NO INDICATION | INPUT SIDE(ERROR) |
| 15 | Flag_in_full | Flag_out_half | INPUT SIDE(ERROR) |
| 16 | Flag_in_full | Flag_out_almost_full | INPUT SIDE(ERROR) |

IMAGE PROJECTION APPARATUS, MEMORY CONTROL APPARATUS, LASER PROJECTOR, AND MEMORY ACCESS METHOD

BACKGROUND OF THE INVENTION

1. Field of the Invention

The present invention relates to an image projection apparatus, a memory control apparatus, a laser projector, and a memory access method.

2. Description of the Related Art

Currently, there is developed an image projection apparatus using a laser as a light source (hereinafter also referred to as a "projector"). The use of a laser as a light source enables a projector to attain extremely high chroma and high color reproduction. A DLP (Digital Light Processing) method, a LCOS (Liquid Crystal On Silicon) method, and a method using an MEMS (Micro-Electro-Mechanical-System) are known as methods for projecting a laser to a surface.

However, in a case where a laser is projected from a projector, it is known that a projection image projected by the projector is distorted and shaped as a trapezoid when the angle formed by projection image and a light beam at the center of the projected laser is not perpendicular (hereinafter also referred to as "oblique projection").

FIGS. 38A-38C are schematic diagrams for describing a projection image in a case where oblique projection occurs in an optical system. FIG. 38A illustrates an example of a projection image in a case of no oblique projection. FIG. 38B illustrates an example of a projection image in a case of oblique projection (upward projection). FIG. 38C illustrates another example of a projection image in a case of oblique projection (downward projection).

In FIG. 38A, the projection image is projected without any distortion because the light from the projector is projected at a distance (distance from the projector to the wall) and an angle (angle formed by the projection image and the light beam at the center of the projected light) that are anticipated at the time of designing the optical system. In FIG. 38B, an upper side of the projection image is longer than a lower side of the projection image because the light projected from the projector is inclined upward with respect to the angle anticipated at the time of designing the optical system. As a result, the projection image is distorted and becomes a trapezoid shape.

In FIG. 38C, a lower side of the projection image is longer than an upper side of the projection image because the light projected from the projector is inclined downward with respect to the angle anticipated at the time of designing the optical system. As a result, the projection image is distorted and becomes a trapezoid shape.

Although there are several methods for correcting a distorted projection image from a trapezoid shape to a quadrate shape, projectors such as a projector using a DLP process (DLP projector) or a projector using a LCOS process (LCOS projector) needs to perform an image process on an input image (image to be input to an optical polarization element) beforehand. That is, the DLP projector and the LCOS are required to perform an image process (e.g., pixel skipping, pixel interpolation) on the input image beforehand because a single pixel formed on optical polarization element corresponds to a single pixel of an image formed on a projection plane.

FIG. 39A is a schematic diagram for describing the DLP projector. The DLP projector uses a DMD (Digital Micromirror Device) having mirrors integrated in units of pixels. FIG. 39A illustrates an example of a DMD corresponding to 4 pixels (2×2). In the DMD of FIG. 39A, the upper right mirror is switched off whereas the other mirrors are switched on. Accordingly, in the projection image projected from the light source, a black image is formed on the upper right pixel in correspondence with the status of the mirrors of the DMD. Hence, with a DLP projector, 1 mirror of a polarization element corresponds to 1 pixel of a projection image.

FIG. 39B is a schematic diagram for describing correction of a trapezoid image in a case of using a DLP projector. Because a micro-mirror of a DLP (as well as a liquid crystal of a LCOS projector) has a one-to-one relationship with respect to a pixel of a projection image, the projector cannot change the position of a pixel being projected. For example, in order to correct a distorted projection image as illustrated on the left side of FIG. 3B to a rectangle as illustrated on the right side of FIG. 3B, it is necessary to reflect light from the micro-mirrors corresponding to the pixels of the rectangle. This results in reduction of valid pixels. Further, degradation of the projection image may occur due to pixels of the original image data being skipped in association with the reduction of valid pixels.

FIG. 40A is a schematic diagram for describing a projector using a laser scanning method (laser scanning type projector). The laser scanning type projector forms an image on a projection plane by polarizing a laser with a 2D (two-dimensional) scanner (x-y scanner). In FIG. 40A, the laser radiated from a laser oscillator transmits through a half-mirror. Then, the laser is polarized by the 2D scanner. Then, the path of the laser is changed by the half-mirror, to thereby form an image on a screen. Because the 2D scanner is continuously operated, an area to be depicted can be adjusted by adjusting the timing of radiating the laser. Thereby, an area equal to or smaller than a single pixel can be depicted.

FIG. 40B is a schematic diagram for describing trapezoid correction of a laser scanning type projector. With a laser scanning type projector, trapezoid correction can be achieved without reduction of valid pixels by making slight adjustments of pixel positions by adjusting the timing of radiating a laser.

However, as disclosed in Japanese Laid-Open Patent Publication No. 2007-199251, controlling the oscillation of an oscillation mirror based on the position of a vertical axis is difficult and unrealistic considering that the oscillation mirror is oscillating in a resonant state.

Further, in Japanese Laid-Open Patent Publication No. 2004-295029 where the timing of radiating a laser is controlled, the trajectory of the laser formed by an oscillation mirror in a resonant state is calculated with actual numbers including trigonometric functions and inverse trigonometric functions. Therefore, in a case of correcting the timing of radiating the laser while calculating a depiction area of the laser at real time, there is a problem in which the calculation cannot keep up with the correction.

Further, in Japanese Laid-Open Patent Publication No. 2010-230730, the method for calculating non-depiction areas or controlling the laser after the calculation are not described in detail. Therefore, it is assumed that the technology disclosed in Japanese Laid-Open Patent Publication No. 2010-230730 contains problems yet to be resolved in order to be realized.

SUMMARY OF THE INVENTION

The present invention may provide an image projection apparatus, a memory control apparatus, a laser projector, and a memory access method that substantially eliminate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by an image projection apparatus, a memory control apparatus, a laser projector, and a memory access method particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides an image projection apparatus including an input part configured to input image data; a frame memory configured to store the image data; a laser oscillator configured to radiate a laser to a screen; a deflection part including a reflective optical element and configured to oscillate the reflective optical element with respect to two perpendicularly intersecting axes; a storage part configured to store coefficient data of a polynomial expression; an irradiation position calculating part configured to calculate an irradiation position based on a coefficient obtained by using the coefficient data and an oscillation angle of the reflective optical element; an address calculating part configured to calculate an address in the frame memory corresponding to the irradiation position; a memory control part configured to read out pixel data of the address; and a laser drive part configured to oscillate the laser oscillator in accordance with a luminance corresponding to the pixel data.

Other objects, features and advantages of the present invention will become more apparent from the following detailed description when read in conjunction with the accompanying drawings.

BRIEF DESCRIPTION OF THE DRAWINGS

FIG. 3 is a schematic diagram for describing image data stored in a frame memory according to an embodiment of the present invention;

FIG. 4 is a schematic diagram illustrating a depiction position calculating unit according to an embodiment of the present invention;

FIG. 13 is a sequence diagram illustrating an overall operation of the image output system circuit according to an embodiment of the present invention;

FIG. 14 is a flowchart illustrating steps of obtaining 15 coefficients from data pertaining to (X, Y) by performing simulation according to an embodiment of the present invention;

FIG. 20 is a table illustrating an example of the relationship between image size and storage capacity;

FIG. 32 is a block diagram illustrating an exemplary configuration of a data part of an output buffer according to an embodiment of the present invention;

FIG. 37 illustrates an example of an arbitration table generated according to an arbitration policy according to an embodiment of the present invention;

DETAILED DESCRIPTION OF THE PREFERRED EMBODIMENTS

[First Embodiment]

Figure 1:
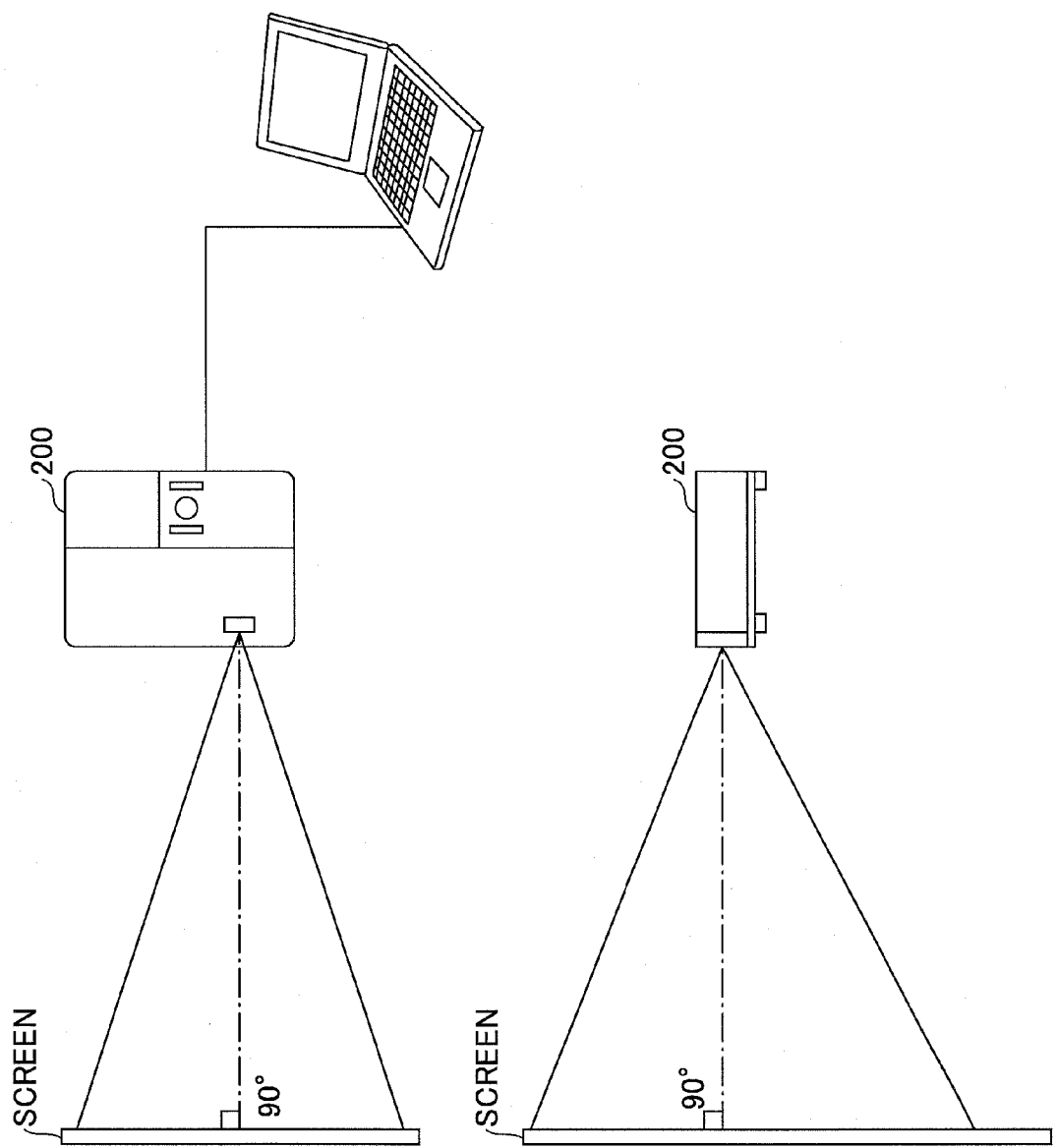
FIGS. 1A and 1B are schematic diagrams illustrating an example of a laser projector and an input terminal according to an embodiment of the present invention.

FIGS. 1A and 1B are schematic diagrams illustrating an example of a laser projector (hereinafter also referred to as "LPJ") 200 and an input terminal according to an embodiment of the present invention. The input terminal is for inputting image data to the LPJ 200. The input terminal may be, for example, a PC (Personal Computer), a television set, a BD (Blu-ray Disc) player, or a recording medium on which image data is recorded. The LPJ 200 generates a laser based on the image data and forms a projection image on a screen by reflecting the laser on a 2D scanner. In a case where the LPJ 200 has no optical system (e.g., lens), the LPJ 200 is configured to always have the laser in focus. As illustrated in FIG. 1, the projection image is formed in a manner that a radiation part for radiating the laser is located in a position facing the center of the projection image. Alternatively, the projection image may be formed in a manner that the radiation part is located in a position facing the vicinity of the bottom end of the projection image.

Although the size of the projection image differs depending on the projection distance between the LPJ 200 and the screen, the size of the projection image may be changed so that a diagonal line of the projection image ranges from 30 cm to 300 cm. In a case where the LPJ 200 includes a zooming mechanism and a lens, the size of the projection image can be changed without changing the position of the LPJ 200.

Figure 2:
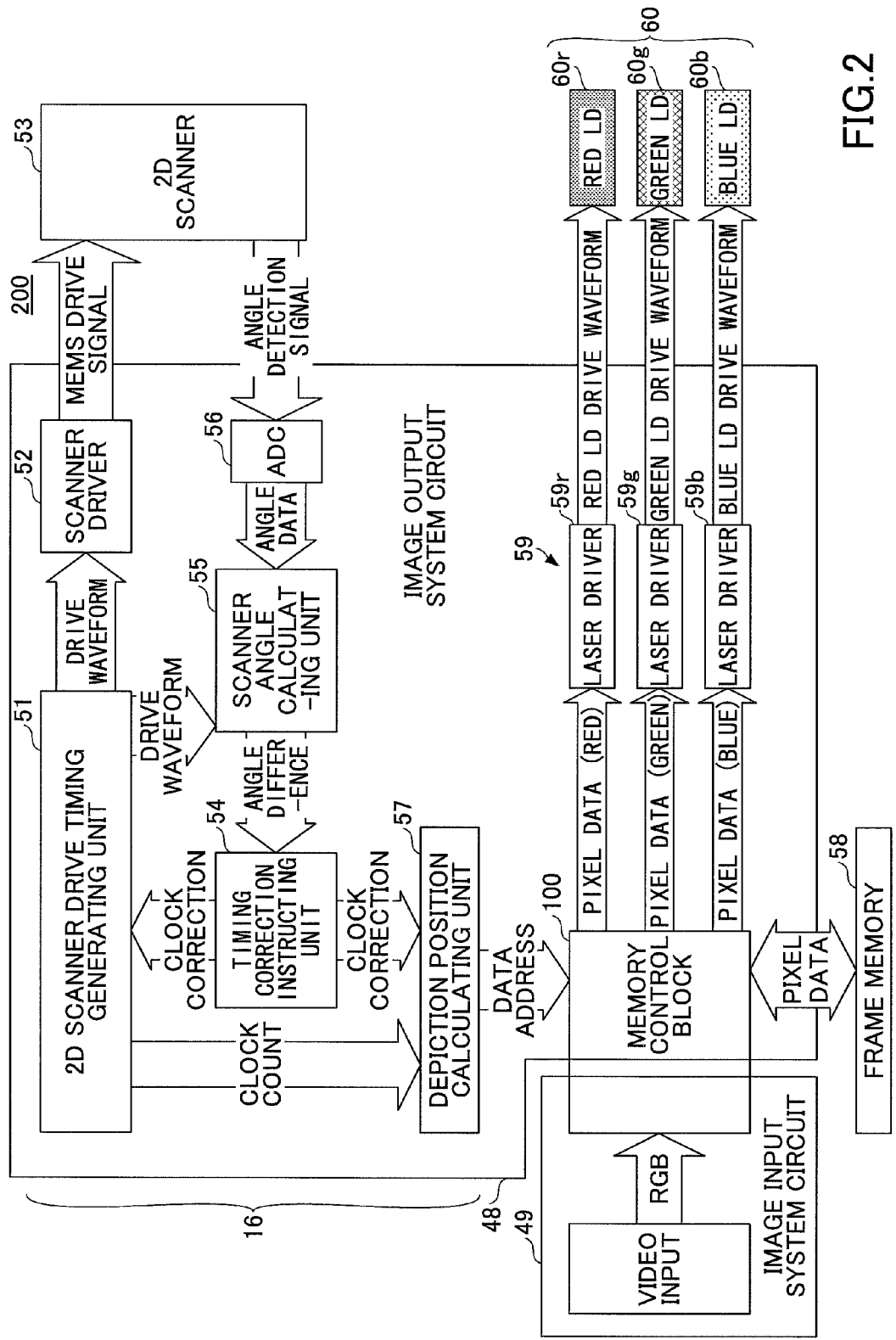
FIG. 2 is a schematic diagram illustrating a configuration of an LPJ according to an embodiment of the present invention.

FIG. 2 is a schematic diagram illustrating a configuration of the LPJ 200 according to an embodiment of the present invention. The LPJ 200 includes, for example, an image input system circuit 49, an image output system circuit 48, a frame memory 58, a 2D scanner 53, and a laser oscillator 60.

The image input system circuit 49 includes an input interface including one or more video inputs. The input interface may be a terminal for inputting digital image data (e.g., DVI terminal, HDMI terminal) or a terminal for inputting analog data (e.g., D-Sub terminal, S-Video terminal). The input interface may also be, for example, a USB terminal for connecting to a storage device (e.g., flash memory).

The video signals of the input image data are RGB signals. However, in a case where video signals of the input image data are YUV signals, the LPJ 200 converts the YUV signals into RGB signals before video input. The image data are input with a predetermined resolution (e.g., WXGA, XGA, SVGA, VGA). In a case where the video inputs are analog signals, the image input system circuit 49 performs A/D conversion on the analog signals and outputs the converted signals to a memory control block 100.

The memory control block 100 temporarily stores the image data input from the image input system circuit 49 in a frame memory 58, reads out the image data from the frame memory 58, and outputs the image data to the image output system circuit 48.

FIG. 3 is a schematic diagram for describing image data stored in the frame memory 58 according to an embodiment of the present invention. FIG. 3 illustrates an enlarged view of a portion of image data extracted from the frame memory 58. The frame memory 58 is provided in a part of an area (address range) in the below-described external memory 15. In addition to the frame memory 58, the external memory 15 also stores programs or the like. One pixel of the image data is represented with 3 bytes (24 bits (R: 8 bits, G: 8 bits, B: 8 bits). In FIG. 3, each square of the image data contains 8 bits. The memory control block 100 reads out image data having an address corresponding to a projection area (position) of the 2D scanner 53 and outputs the image data to the laser driver 59. The memory control block 100 is described in detail in the below-described second embodiment of the present invention.

Returning to FIG. 2, the image output system circuit 48 includes, for example, a two-dimensional scanner drive timing generating unit 51, a timing correction instructing unit 54, a depiction position calculating unit 57, a scanner angle calculating unit 55, a scanner driver 52, an ADC (Analog to Digital Converter) 56, and a laser driver 59.

Because the LPJ 200 uses laser as a light source, the LPJ 200 includes a laser oscillator 60 for overlapping (combining) the lasers corresponding to each one of RGB colors into a single laser and outputting the overlapped laser. The laser oscillator 60 includes laser diodes (LD) 60r, 60g, 60b corresponding to each one of RGB colors. The laser driver 59 includes laser drivers 59r, 59g, 59b for driving the LDs 60r, 60g, 60b. The laser driver 59r generates a red laser diode (LD) drive waveform for driving the laser diode 60r based on image data corresponding to R of a given pixel, the laser driver 59g generates a green laser diode (LD) drive waveform for driving the laser diode 60g based on image data corresponding to G of a given pixel, and the laser driver 59b generates a blue laser diode (LD) drive waveform for driving the laser diode 60b based on image data corresponding to B of a given pixel. Accordingly, the red LD 60r, the green LD 60g, and the blue LD 60b oscillates with an intensity based on corresponding image data. Thereby, the laser oscillator 60 radiates a laser having a luminance (color) corresponding to the image data.

The 2D scanner 53 projects a projection image by scanning the laser two-dimensionally. In this embodiment, the 2D scanner 53 is a two-axis MEMS scanner. The two-axis MEMS scanner includes a sensor (angle detector) for detecting an oscillation angle (deflection angle) of an MEMS mirror. The angle detector outputs a voltage corresponding to the oscillation angle of the MEMS mirror to the ADC 56. The ADC 56 converts the voltage corresponding to the oscillation angle into a digital oscillation angle.

The two-dimensional scanner drive timing generating unit 51 outputs a clock count to the depiction position calculating unit 57. The clock count serves as the original data of the MEMS mirror drive waveform. The MEMS mirror is driven with a resonance frequency so that a large oscillation angle can be obtained with a small amount of energy. Because the resonance frequency is determined based on, for example, the material, the shape, the size of the MEMS mirror and/or the material, the shape, the size of a beam part, a researcher or the like may be able to assume the approximate value of the resonance frequency. Further, the resonance frequency can be obtained with more accuracy by providing a sensor for detecting the frequency of the MEMS mirror. The resonance frequency is set to the two-dimensional scanner drive timing generating unit 51 by an external device such as a microcomputer (not illustrated).

The two-dimensional scanner drive timing generating unit 51 counts the number of clocks equivalent to a single cycle of scanning in the main direction and the number of clocks equivalent to a single cycle of scanning in the sub-scanning direction based on the resonance frequency set by the external device and a system clock frequency. For example, in a case where the resonance frequency with respect to a horizontal direction is 1000 Hz (1 cycle being 1 ms) and the system clock frequency is 100 MHz (10 μs), the maximum clock count with respect to the horizontal direction is 100 times because 100 counts are required for counting 1 ms. Similarly, the maximum clock count with respect to a vertical direction is determined in accordance with the resonance frequency in the horizontal direction. The two-dimensional scanner drive timing generating unit 51 counts the clocks with respect to the horizontal direction (for example, the clock count returns to 1 once the clock count reaches 100 times and repeats counting up to 100) and outputs the clock counts to the timing correction instructing unit 54 and the depiction position calculating unit 57. Instead of counting clocks separately in the horizontal direction and the vertical direction, there may be a single clock count corresponding to a single screen. In the following description, the clock count is hereinafter described without distinguishing between the horizontal direction and the vertical direction.

Further, the two-dimensional scanner drive timing generating unit 51 generates a drive waveform of the MEMS mirror for oscillating the MEMS mirror with a resonance frequency based on the clock count and outputs the drive waveform to the scanner driver 52. The drive waveform may be typical waveforms such as a PWM (pulse width modulation) waveform, a sinusoidal waveform, a triangular waveform. In this embodiment, the drive waveform with respect to the main scanning direction is a rectangular waveform and the drive waveform with respect to the sub-scanning direction is a PWM waveform.

Although the clock count serves as the original data of the drive waveform for driving the MEMS mirror, the actual movement of the MEMS mirror may deviate from the clock count due to various delay factors (e.g., delay of scanner driver 52, physical response characteristics of the MEMS mirror). Further, the oscillation of the MEMS mirror may change even if the MEMS mirror is oscillated with the same drive waveform because the resonance frequency of the MEMS mirror may change due to changing of temperature or lapsing of time.

In order to correct the deviation, the scanner angle calculating unit 55 detects the timing of an already known maximum oscillation angle of the MEMS mirror from the drive waveform and samples the oscillation angle output from the ADC 54. The oscillation angle is input to the timing correction instructing unit 54.

The timing correction instructing unit 54 determines whether there is a difference between the oscillation angle anticipated by the drive waveform and the actual angle input from the scanner angle calculating unit 55. In a case where the difference is equal to or greater than a predetermined value, the timing correction instructing unit 54 calculates the amount to be corrected (correction amount) and inputs the calculated correction amount to the two-dimensional scanner drive timing generating unit 51. Accordingly, because the clock count is corrected in accordance with the correction amount, the two-dimensional scanner drive timing generating unit 51 adjusts the frequency or drive voltage of the drive waveform. Thereby, the oscillation angle of the MEMS mirror can be adjusted to a desired angle.

Further, the timing correction instructing unit 54 outputs a phase difference between the MEMS mirror drive timing (timing of maximum oscillation) and the actual oscillation of the MEMS mirror to the depiction position calculating unit 57. The phase difference is represented with the number of clocks (clock correction amount).

Next, the depiction position calculating unit 57 according to an embodiment of the present invention is described.

FIG. 4 is a schematic diagram illustrating the depiction position calculating unit 57 according to an embodiment of the present invention. The depiction position calculating unit 57 includes, for example, a corrected clock count calculating unit 61, a screen coordinate calculating unit 62, a distortion correction parameter storage unit 63, and a memory address calculating unit 64.

The depiction position calculating unit 57 calculates the position (location) on the screen to which a laser is radiated when the MEMS mirror is positioned in a certain oscillation angle. The depiction position calculating unit 57 mainly performs the following 2 operations.

Operation 1: The depiction calculating unit 57 calculates a corrected clock count for identifying a depiction position (i.e. position of an area to be depicted) based on the clock correction (correction amount) received from the timing correction instructing unit 54 and the clock count received from the 2D scanner drive timing generating unit 51. The calculation is mainly performed by the corrected clock count calculating unit 61.

Operation 2: The depiction calculating unit 57 calculates screen coordinates based on the corrected clock count. Further, the depiction calculating unit 57 identifies the data address corresponding to the pixel to be depicted based on the screen coordinates and instructs to read out the data of the identified address. The calculation is mainly performed by the screen coordinate calculating unit 62 and the memory address calculating unit 64.

The corrected clock count calculating unit 61 calculates the corrected clock count, for example, by adding a clock correction amount (delay time) output from the timing correction instructing unit 54 to the clock count output from the 2D scanner drive timing generating unit 51 and multiplying the added value with a constant number.

Because the position to be scanned by the 2D scanner 53 is determined according to the clock count, the clock count defines unique coordinates on the screen. Accordingly, the screen coordinate calculating unit 62 can uniquely calculate the screen coordinates by performing geometric calculation using the corrected clock count. The calculation method is described in detail below.

In a case where the optical axis of the light radiated from the LPJ 200 is not perpendicular with respect to the screen, the projection image is distorted into a trapezoid shape due to the angle formed by the optical axis of the light radiated from the LPJ 200 with respect to the screen (hereinafter also referred to as "projection angle"). Even in this case, the depiction position calculating unit 57 can calculate the irradiated position on the screen at a given instant by using the projection angle. Therefore, a parameter(s) corresponding to the projection angle is supplied from the distortion correction parameter storage unit 63 to the screen coordinate calculating unit 62. Accordingly, the correction parameter storage unit 63 stores coefficients of polynomial expressions for calculating screen coordinates in correspondence with projection angles of various instances. By performing calculation using the parameters, the screen coordinates corresponding to each single clock can be calculated with fewer amounts of time and workload. Further, the screen coordinates corresponding to each single clock can be calculated even where the area scanned by the 2D scanner 53 is a trapezoid shape. Because the projection angle can be obtained from a sensor or from settings set beforehand, the projection angle is known by the depiction position calculating unit 57.

The memory address calculating unit 64 calculates the data address of the pixel to be depicted (displayed) based on the screen coordinates and outputs the calculated data address to the memory control block 100. Each address in the entire frame memory 58 has a 1-to-1 relationship with respect to each coordinate (X, Y) in the screen. Therefore, if data of the clock count (technically, data of the correction clock count) is acquired, an address of the frame memory 58 can be uniquely identified (designated). The memory address calculating unit 64 may perform a predetermined conversion calculation. Alternatively, the memory address calculating unit 64 may convert a clock count into a data address by referring to a predetermined conversion table.

Because the relationship between screen coordinates and data addresses is different in a case of front projection and oblique projection, the memory address calculating unit 64 performs types of different conversion calculation depending on the projection angle. Alternatively, the memory address calculating unit 64 may convert a clock count into a data address using different conversion tables depending on the projection angle.

It is to be noted that there may be addresses having no pixel value stored therein depending on the resolution of the image data (e.g., full HD, WXGA, XGA, SVGA, VGA). However, these addresses are assumed as blanks as described below in the second embodiment of the present invention.

[2D Scanner]

Next, the 2D scanner 53 according to an embodiment of the present invention is described. The 2D scanner 53 may be a commonly used scanner. One example of the 2D scanner 53 may have the following configuration.

Figure 5A:
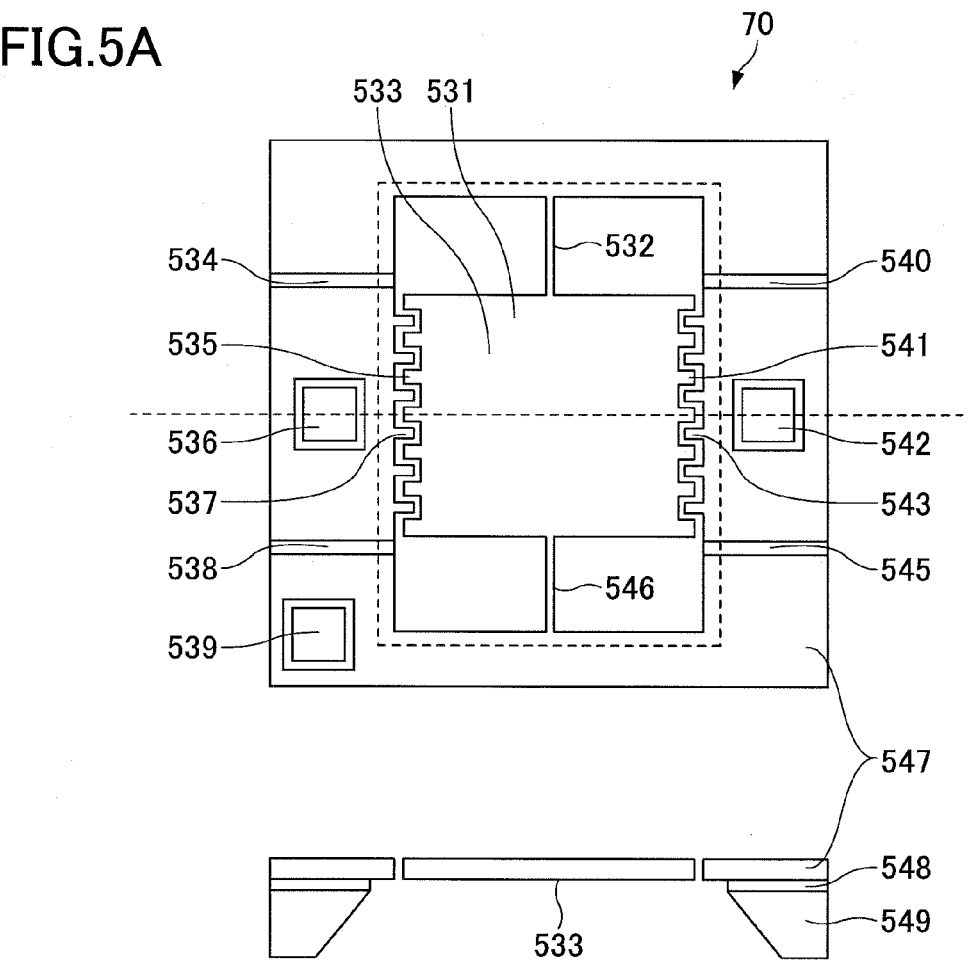
FIG. 5A is a plan view of an MEMS mirror according to an embodiment of the present invention.

FIG. 5A is a plan view of the MEMS mirror 70 according to an embodiment of the present invention. The MEMS mirror 70 has a mirror substrate 531, two torsion beams 532, 546, and an upper frame 547 that are molded as a single body on a low resistance single crystal silicon substrate. The upper frame 547 fixes the two torsion beams 532, 546 into place from an outer side thereof. The two torsion beams 532, 546 are concentric. A center portion of one side of the mirror substrate 531 is supported by the two torsion beams 532, 546. A metal thin film 533 is formed on the mirror substrate 531. The metal thin film 533 has a sufficient reflectivity with respect to the wavelength of a laser radiated thereto. The measurements of each of the mirror substrate 531, the torsion beams 532, 546 is designed for obtaining a desired resonance frequency.

The upper frame 547 is bonded to a lower frame 548 via an insulation film 548. A portion corresponding to an oscillating part of the mirror substrate 531 is removed from the lower frame 549.

The upper frame 547, the torsion beams 532, 546, and the mirror substrate 531 are molded into a single uniform body by performing etch penetration using the same substrate. In the etch penetration, the sides of the mirror substrate 531 having no torsion beam 532, 546 bonded thereto are formed into a comb-like shape. Movable electrodes 541, 535 are formed at the comb-like sides of the mirror substrate 531, so that the movable electrodes 541, 535 can be driven by electrostatic attraction.

Fixed electrodes 543, 537 are formed on both sides facing comb-like sides that face the movable electrodes 541, 535. A portion of the upper frame 547 at which the fixed electrodes 543, 537 are formed (first upper frame portion) are separated and insulated from another portion of the upper frame 547 to which the torsion beams 532, 546 are bonded (second upper frame portion) by slits 534, 538, 545, 540.

Electrode pads 542, 536, 539 are formed on the surface of the upper frame 547. The electrode pads 542, 536, 539 may be formed by depositing an Al thin film by sputtering.

When voltage is simultaneously applied to the fixed electrodes 543, 537 from the electrode pads 542, 536, electrostatic attraction occurs between the fixed electrodes 543, 537 and the movable electrodes 541, 535 facing each other via a fine gap. In a case where there is a slight amount of space (deviation) between the initial position of the fixed electrodes 543, 537 and the movable electrodes 541, 535, the moment of rotation (moment of inertia) works on the mirror substrate 531 so that the distance between the fixed electrodes 543, 537 and the movable electrodes 541, 535 becomes a shortest distance. By applying the electrostatic attraction, the deviation between the initial position of the fixed electrodes 543, 537 and the movable electrodes 541, 535 generates resonance frequency. Thereby, the oscillation angle of the MEMS mirror 70 is increased. Instead of using electrostatic attraction, electromagnetic force may alternatively be used as the driving force for generating the resonance frequency of the mirror substrate 531.

Figure 5B:
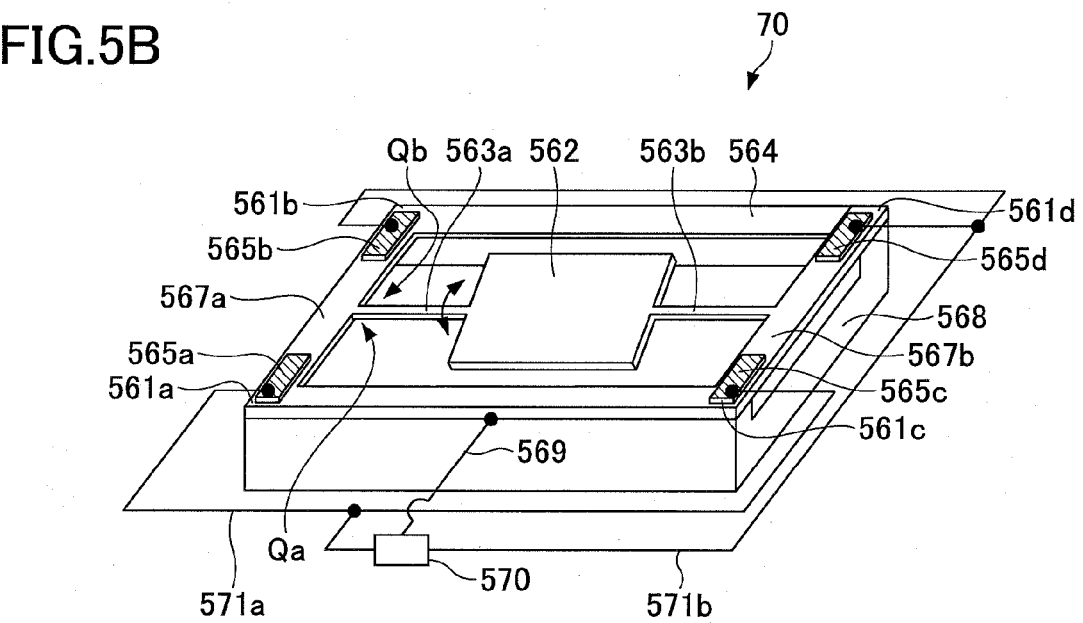
FIG. 5B is a schematic diagram of an MEMS mirror according to another embodiment of the present invention.

FIG. 5B is a schematic diagram of the MEMS mirror 70 according to another embodiment of the present invention. In the embodiment of FIG. 5B, a piezoelectric element(s) is used in the MEMS mirror 70. A first mirror support part 563a is connected to a substantially center part of a first beam part 567a at connection points Qa, Qb. In a similar manner as the first mirror part 563a, a second mirror support part 563b is connected to a second beam part 567b.

A first piezoelectric member 565a is bonded to the first beam part 567a and a first fixing part 561a with a conductive adhesive agent in a manner interposed between the first beam part 567a and the first fixing part 561a. Likewise, a second piezoelectric member 565b is bonded to the second beam part 567b and a second fixing part 561b with a conductive adhesive agent in a manner interposed between the second beam part 567b and the second fixing part 561b. Likewise, a third piezoelectric member 565c is bonded to the second beam part 567b and a third fixing part 561c with a conductive adhesive agent in a manner interposed between the second beam part 567b and the third fixing part 561c. Likewise, a fourth piezoelectric member 565d is bonded to the second beam part 567b and a fourth fixing part 561d with a conductive adhesive agent in a manner interposed between the second beam part 567b and the fourth fixing part 561d.

An alternating current is supplied from a drive circuit 570 to the first and third piezoelectric members 565a, 565c via a first wiring 571a, a shared wiring 569, and a frame part 564 formed of a conductive material. Likewise, another alternating current is supplied from the drive circuit 570 to the second and fourth piezoelectric members via a second wiring 571b, the shared wiring 569, and the frame part 564. The other alternating current has a reverse-phase with respect to the alternating current supplied to the first and third piezoelectric members 565a, 565c. Each of the first to fourth piezoelectric members 565a-565d oscillate in accordance with the alternating current from the drive circuit 570. The oscillation is transmitted to the first and second beam parts 567a, 567b.

The oscillation transmitted to the first and second beam parts 567a, 567b generates rotation torque. By applying the rotation torque to the first and second mirror support parts 563a, 563b, torsional displacement occurs in the first and second mirror support parts 563a, 563b. Accordingly, a mirror part 562 oscillates where each of the first and second mirror support parts 563a, 563b serves as an oscillating (rocking) shaft. The frequency of the oscillation of the mirror part 562 becomes a high resonance frequency.

Because each of the MEMS mirrors 70 disclosed in FIGS. 5A and 5B only has a single axis, each of the MEMS mirrors 70 can only scan in one direction. Accordingly, two MEMS mirrors 70 are to be combined in a manner that the oscillating direction of one MEMS mirror 70 is 90 degrees different from the oscillating direction of the other MEMS mirror 70. Thereby, the 2D scanner 53 is obtained. Alternatively, the 2D scanner 53 may be formed with a single mirror that oscillates around two separate axes that are oriented 90 degrees different from each other.

[Oscillation Angle and Screen Coordinates to which Laser is Radiated]

Figure 6:
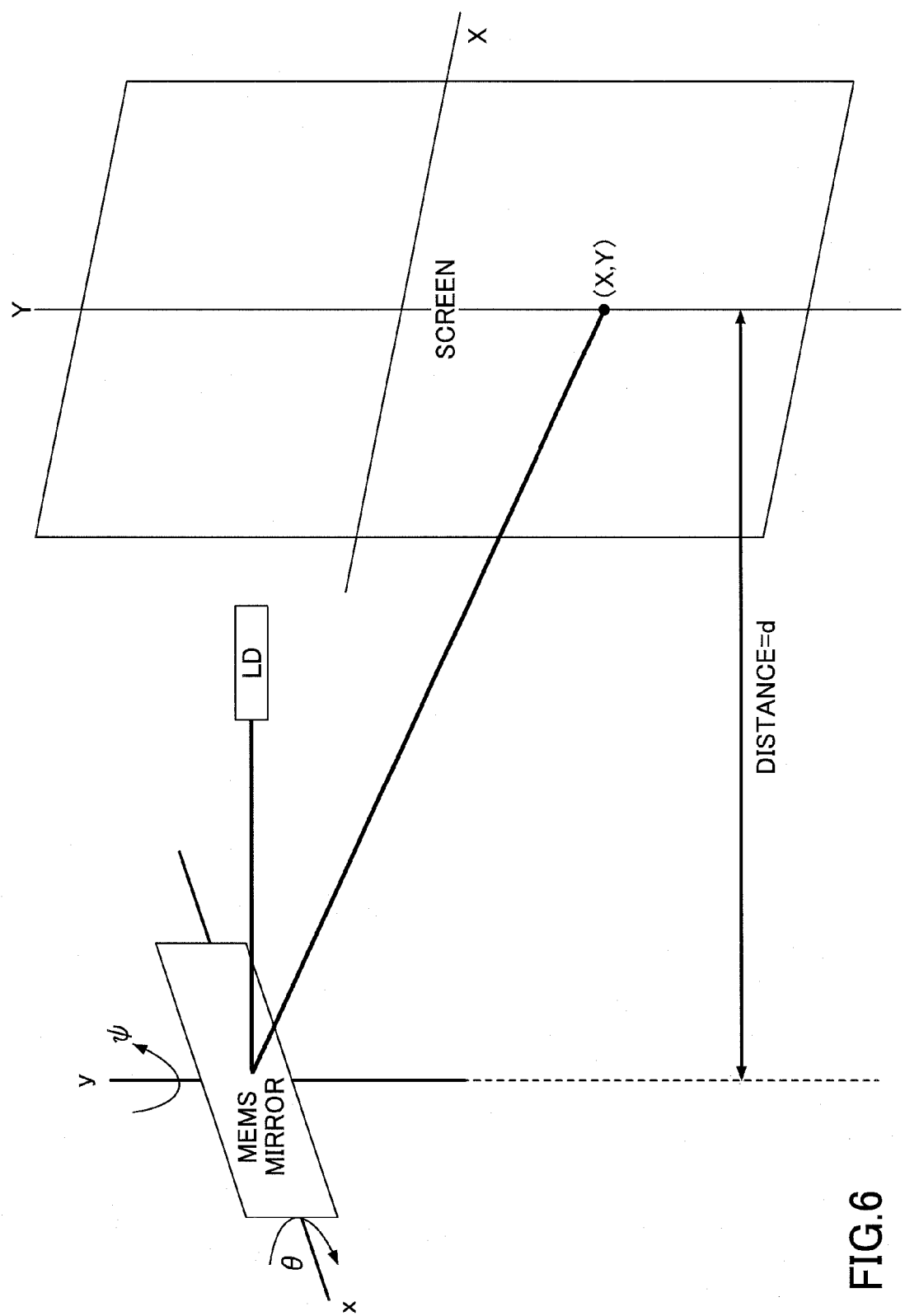
FIG. 6 is a schematic diagram for describing coordinate positions of a laser reflected from an MEMS mirror.

FIG. 6 is a schematic diagram for describing coordinate positions of a laser reflected from the MEMS mirror. For the convenience of explanation, it is assumed that the laser radiated from the laser oscillator 60 is incident to a plane of the MEMS 70 where the MEMS 70 is in a static (unmoving) state. Furthermore, a lens serving as a magnifying optical system is omitted for the convenience of explanation. Accordingly, in the embodiment of FIG. 6, a laser is reflected from the MEMS mirror 70 and reaches a single point (X, Y) on the screen.

In a case where "$\theta$" represents the oscillation angle of the MEMS mirror 70 (mirror that rotates around the y axis) with respect to the main scanning direction, and "$\phi$" represents the oscillation angle of the MEMS mirror 70 (mirror that rotates around the x axis), and "d" represents the distance between the MEMS mirror 70 and the screen, the coordinates (X,Y) of the laser incident on the screen is expressed as: ($\sqrt{d}\cdot\sin\theta\cdot\cos\phi\sqrt{d}\cdot\sin\phi$).

Figure 7:
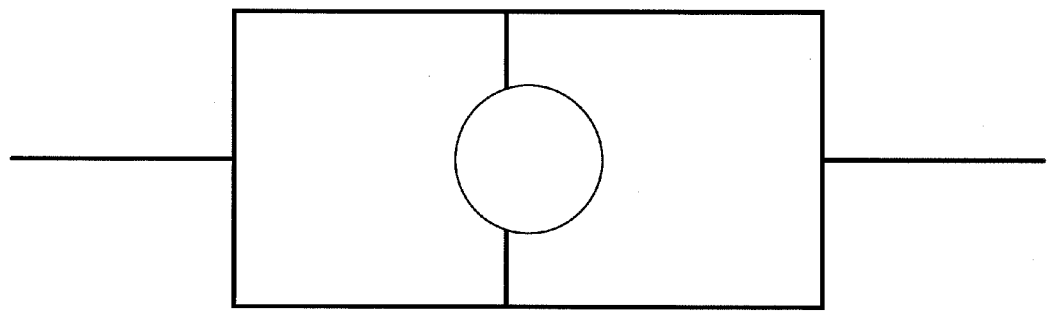
FIG. 7 is a schematic diagram illustrating two rotation axes of an MEMS mirror.

However, as illustrated in FIG. 7, the centers of the two rotation axes of the MEMS mirror 70 do not match. If the centers of the two rotation axes of the MEMS mirror 70 match, the center of the circle would match the intersecting point between the two perpendicularly intersecting straight lines. However, with an actual MEMS mirror, one of the rotation axes (in the example of FIG. 7, the vertical rotation axis) deviates from the center of the circle.

Accordingly, in a case where there are two rotation axes, the coordinates (X,Y) cannot be expressed with the foregoing trigonometric function and is instead expressed as: (d·tan $\phi$, d·tan {arctan(cos $\phi$·tan $\theta$)}).

However, even if it is possible to analytically express the coordinates, a significant amount of time would be required for the depiction position calculating unit 57 to calculate the trigonometric function. For example, it would be extremely difficult to calculate the coordinates in correspondence with a single clock of 100 MHz. Although it may be possible to calculate the coordinates in correspondence with a single clock by referring to a table indicating clock counts in correspondence with (X,Y) coordinates, a table used for an inverse trigonometric function (arctan) would be necessary because the expression (d·tan $\phi$, d·tan {arctan(cos $\phi$·tan $\theta$)} [Unmatched parentheses] includes a inverse trigonometric function (arctan). Accordingly, even if such table is used, it would still be difficult to calculate coordinates in correspondence with a single clock.

Although the aforementioned expression (d·tan $\phi$, d·tan {arctan(cos $\phi$·tan $\theta$)} is calculated in a case where no magnification lens is positioned behind an MEMS mirror, an expression that is even more complicated than the aforementioned expression (d·tan $\phi$, d·tan {arctan(cos $\phi$·tan $\theta$)}) would be necessary in a case where a magnification lens is positioned behind an MEMS mirror.

Therefore, the LPJ 200 according to an embodiment of the present invention calculates the screen coordinates (X, Y) according to a polynomial expression using $\phi$ and $\theta$.

[Model Type]

Figure 8:
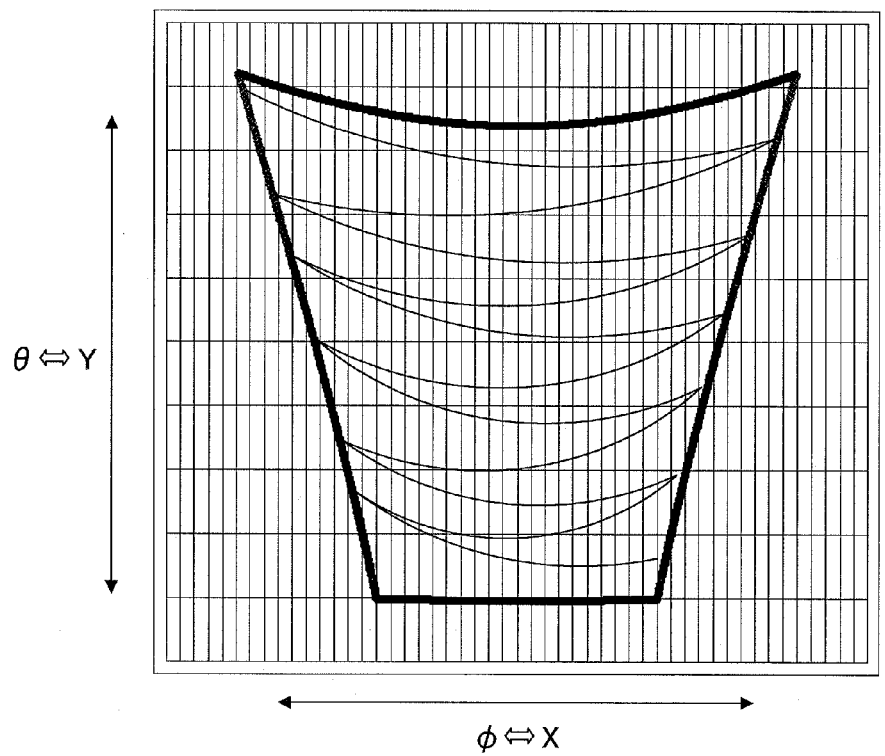
FIG. 8 is a schematic diagram illustrating an example of distortion of a projection image assumed by an LPJ according to an embodiment of the present invention.

FIG. 8 is a schematic diagram illustrating an example of distortion of a projection image assumed by the LPJ 200 according to an embodiment of the present invention. In FIG. 8, the horizontal axis represents the oscillation angle of the MEMS mirror with respect to the main scanning direction, and the vertical axis represents the oscillation angle of the MEMS mirror with respect to the sub-scanning direction. As illustrated in FIG. 8, the shape of the projection image is an envelope of a scanning range of the laser.

Figure 39A:
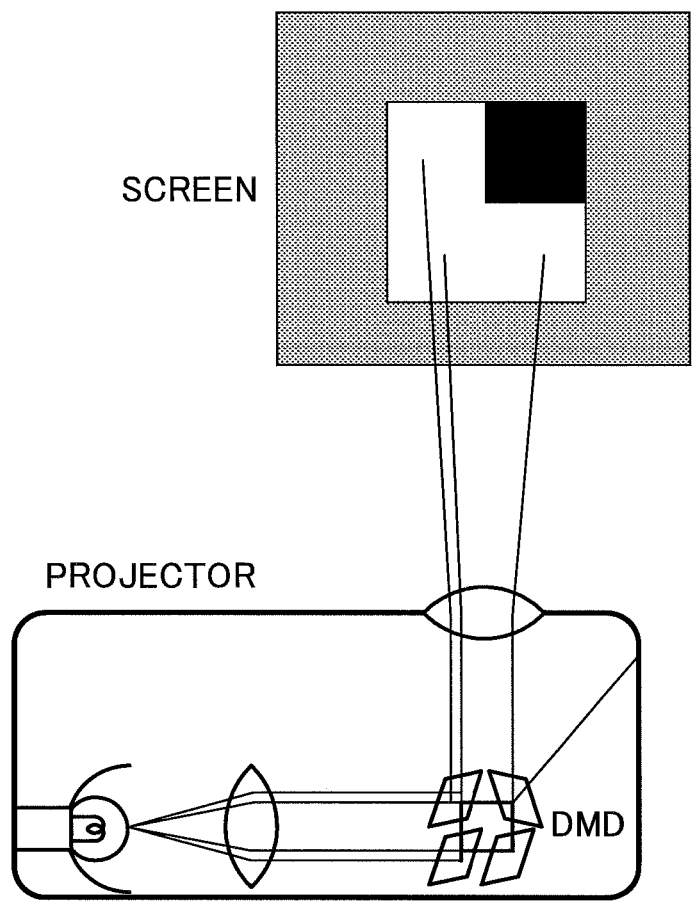
FIG. 39A is a schematic diagram for describing a DLP projector.
Figure 39B:
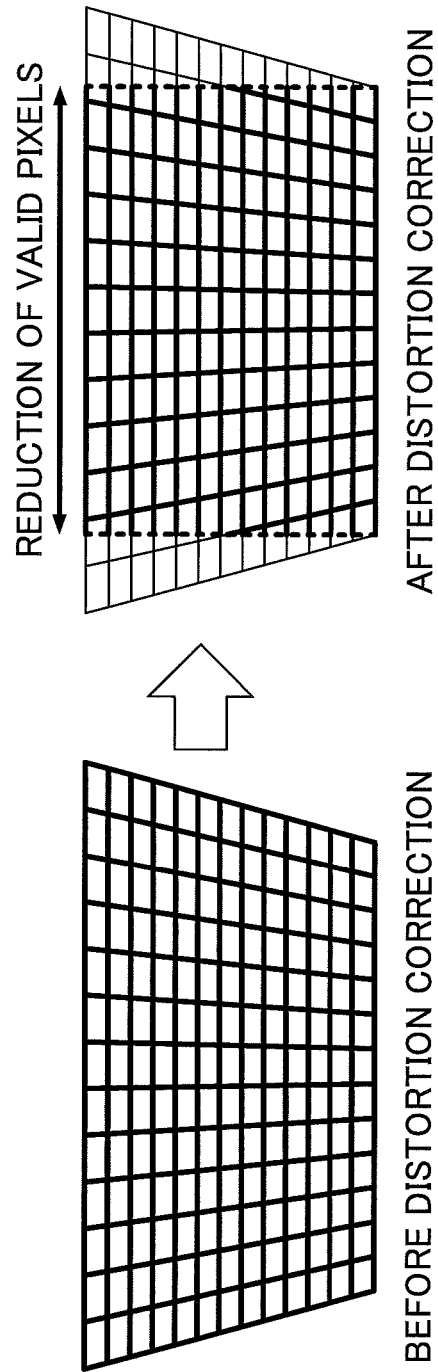
FIG. 39B is a schematic diagram for describing correction of a trapezoid image in a case of using a DLP projector.
Figure 40A:
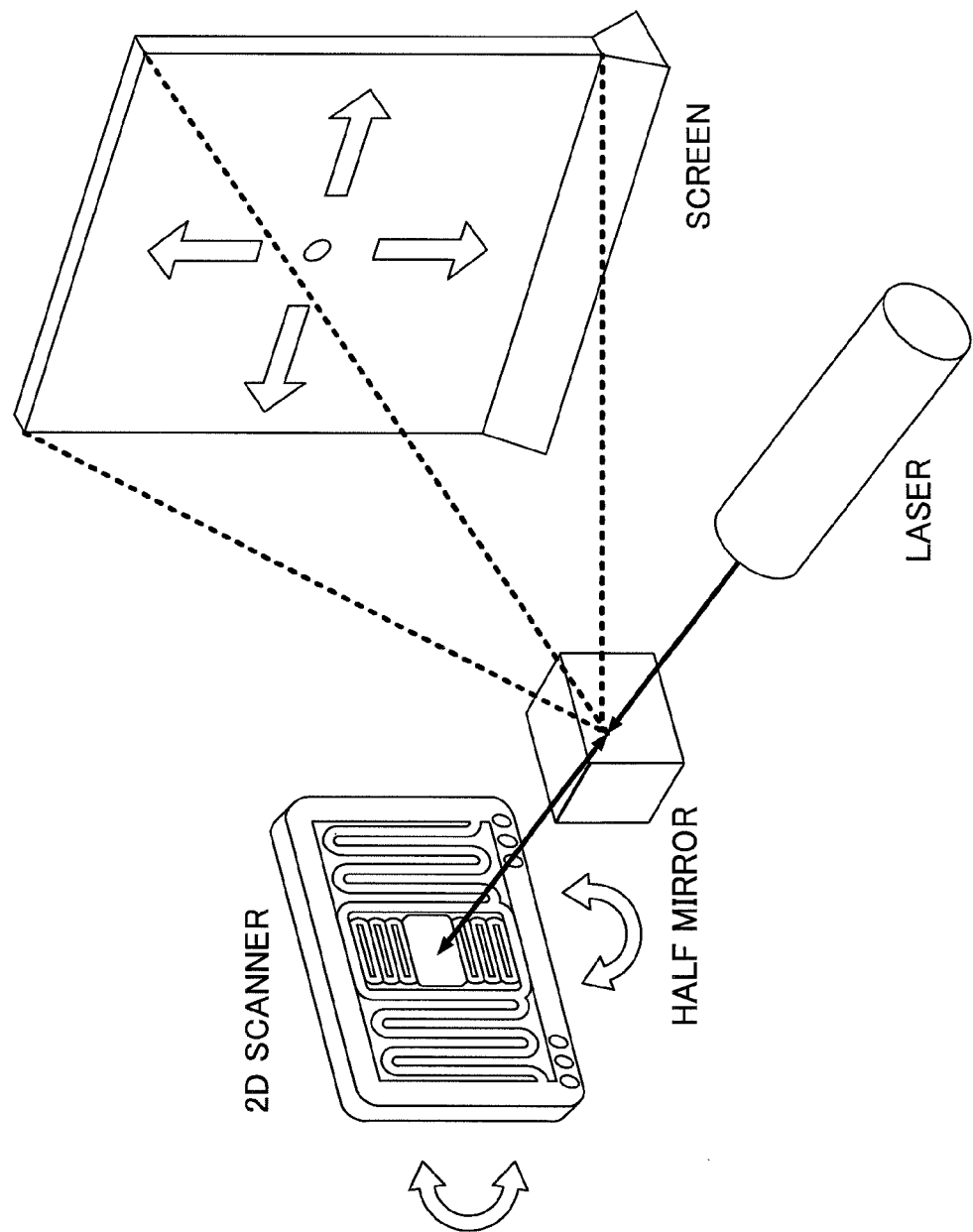
FIG. 40A is a schematic diagram for describing a projector using a laser scanning method.
Figure 40B:
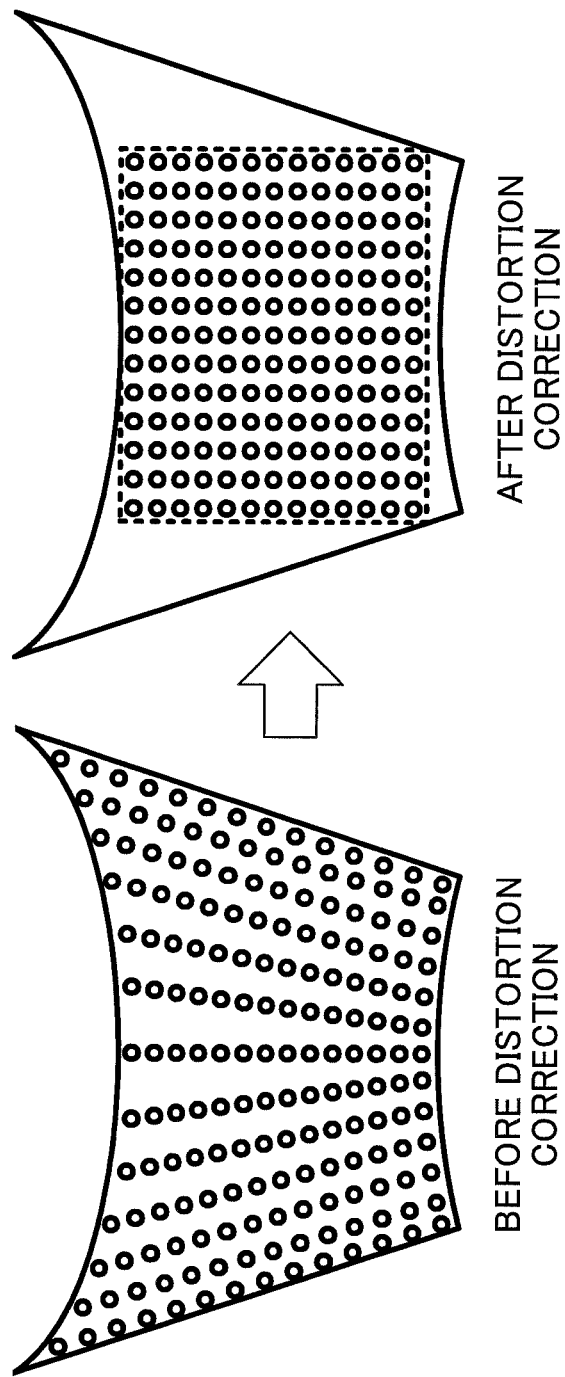
FIG. 40B is a schematic diagram for describing trapezoid correction of a laser scanning type projector.

In FIG. 8, it is assumed that a plane of the MEMS mirror 70 is not parallel to a plane of the screen. Therefore, as illustrated in FIG. 39B, the projection image is deformed into a trapezoid shape. Further, because the projection image of FIG. 8 is projected by the LPJ 200 that uses an image surface magnification lens, the projection image of the LPJ 200 exhibits a characteristic distortion in which the envelope is bent.

The following description explains how the screen coordinates (X, Y) are expressed for correcting the characteristic distortion to a rectangular shape based on the oscillation angles $\phi$ and $\theta$ of the MEMS mirror 70 when the projection angle is a predetermined angle. There is no need to define the distance with respect to the screen because even if the distance between the screen and the MEMS mirror 70 changes, the shapes of the projection image do not change (i.e. the shapes are similar). Therefore, a typical distance between the screen and the MEMS mirror is assumed in this model type.

First, in order to model a polynomial expression, screen coordinates are calculated in a case where oscillation angles of the MEMS mirror 70 are φ, θ when a projection angle of the light passing through a magnification optical system is a predetermined angle. The calculation is performed by using simulation software.

It is assumed that the movement status of the MEMS mirror can be expressed with the following expressions.

$$MX = \phi = A \cdot \sin(\omega t + \alpha) \quad \text{(Expression 1)}$$

$$MY = \theta = B \cdot \sin(\omega' t + \beta) \quad \text{(Expression 2)}$$

In other words, the movement status of the MEMS mirror 70 is modeled as a simple harmonic oscillation in which changes of the angles φ and θ of the MEMS mirror 70 can be expressed with a linear function of time.

Then, the trajectory of the laser is obtained by assigning (setting) a fixed angle to the oscillation angle φ in the main scanning direction while changing the angles of the oscillation angle θ in the sub-scanning direction.

Figure 9:
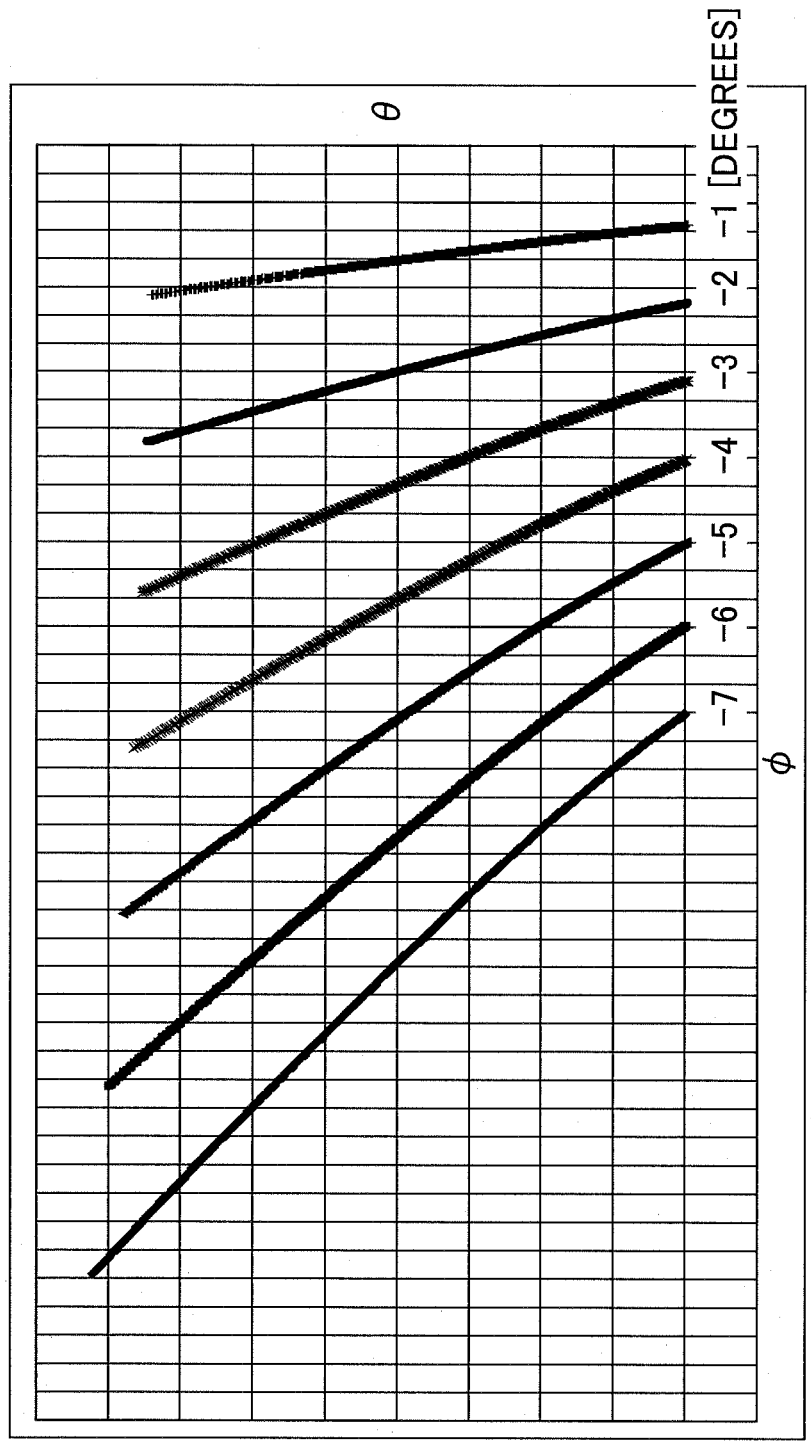
FIG. 9 is a schematic diagram illustrating trajectories of a laser that are obtained in a case where the oscillation angle θ in the sub-scanning direction is changed when the oscillation angle φ in the main scanning direction is −1 to −7 degrees, respectively.
Figure 38A:
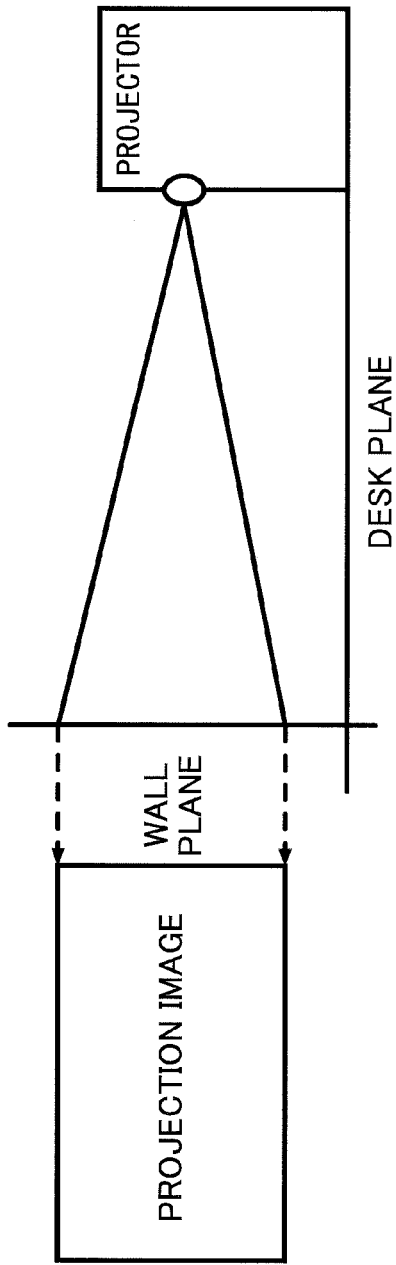
FIGS. 38A-38C are schematic diagrams for describing a projection image in a case where oblique projection occurs in an optical system.
Figure 38B:
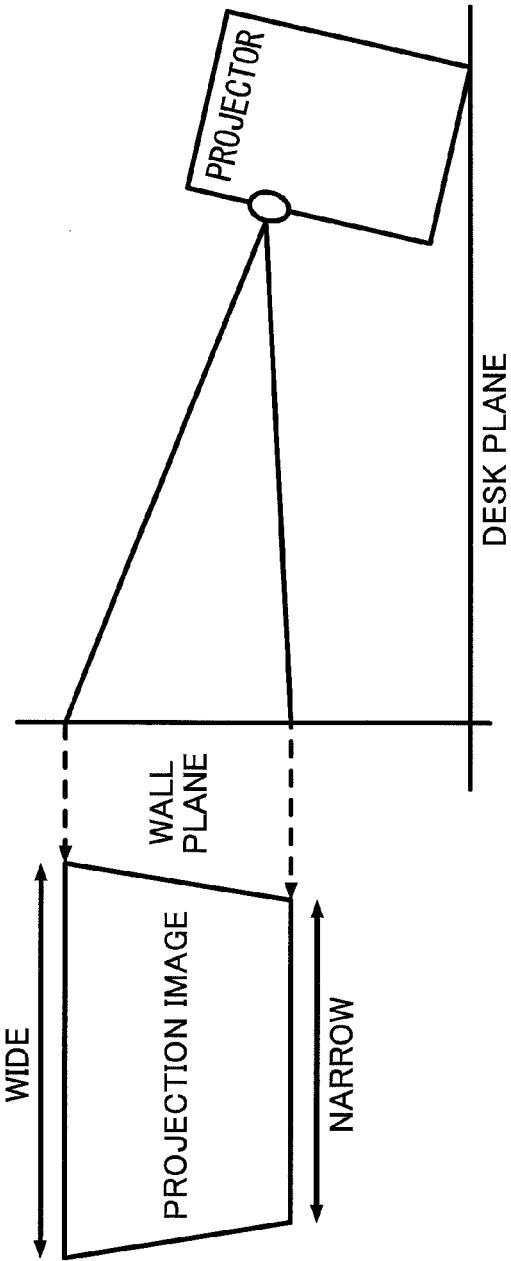
Figure 38C:
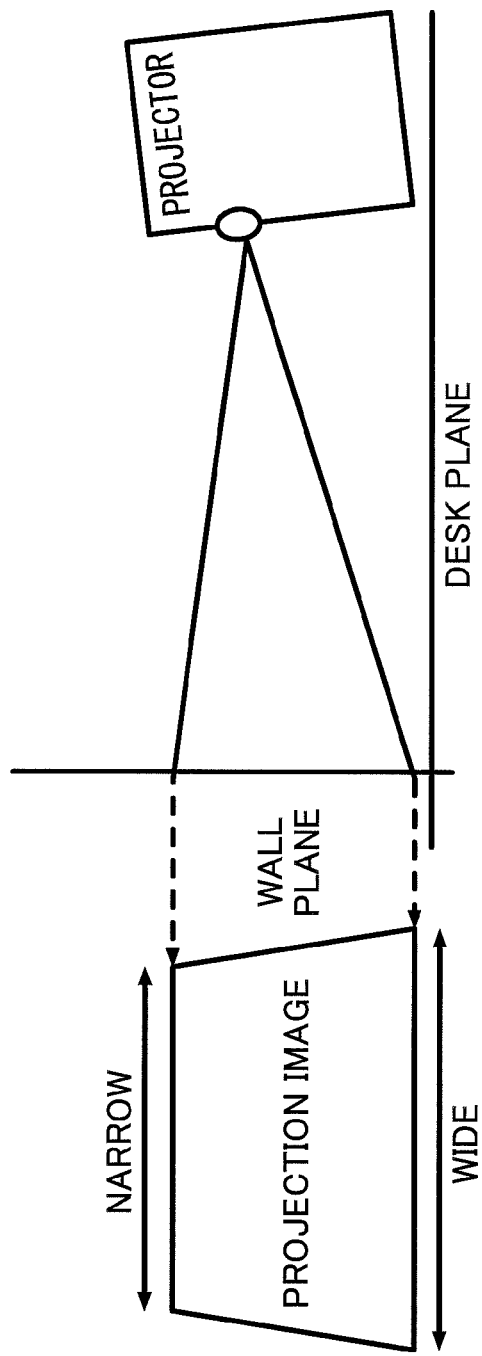

FIG. 9 is a schematic diagram illustrating trajectories of the laser that are obtained in a case where the oscillation angle θ in the sub-scanning direction is changed when the oscillation angle φ in the main scanning direction is −1 to −7 degrees, respectively. Because the oscillation angle φ in the main scanning direction is fixed while the oscillation angle θ in the sub-scanning direction is changed, the trajectories of the laser are depicted in a manner extending in a vertical direction. Because the predetermined projection angle is formed by positioning the projector 200 facing upward (see, for example, FIG. 38b), the distance between the MEMS mirror 70 and the screen surface increases as the oscillation angle φ in the main direction increases. Therefore, even if the amount of change of the oscillation angle θ in the sub-scanning direction remains the same, the trajectory of the laser spreads outward (toward the left side in FIG. 9) as the oscillation angle φ in the main scanning direction increases.

Although the lines of the trajectories in FIG. 9 are not perfectly straight, the lines are nearly straight. Therefore, the X coordinates of a screen coordinate system (X, Y) can be expressed with a quadratic function (quadratic expression) of the oscillation angle θ of the MEMS mirror 70. Thus, in order to express the coordinates of the screen coordinate system (X, Y) as coordinates of an MEMS mirror coordinate system, the oscillation angle φ is assumed as "x" and the oscillation angle θ is assumed as "y".

$$X(x,y) = a(x)y + b(x) \quad \text{(Expression 3)}$$

In other words, if the oscillation angle θ is determined with respect to each oscillation angle φ, a(x) and b(x) which define X(x, y) can be obtained. Thus, by obtaining a(x) and b(x), X(x, y) can be obtained.

Although −1 to −7 are set as the oscillation angle φ in FIG. 9, X(x, y) can also be obtained where 1 to 7 (positive side) are set as the oscillation angle φ.

Figure 10A:
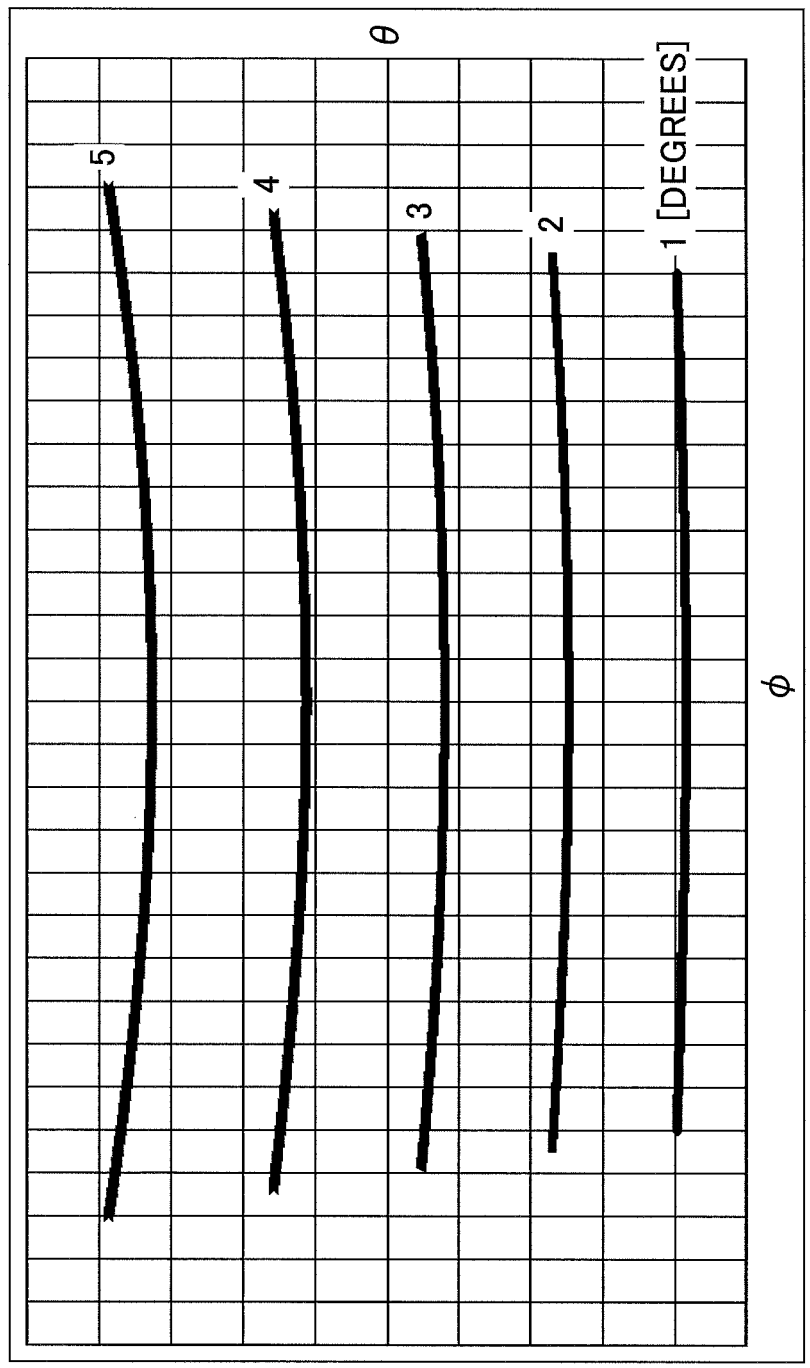
FIGS. 10A and 10B are schematic diagrams illustrating trajectories of the laser that are obtained in a case where the oscillation angle φ in the main scanning direction is changed when the oscillation angle θ in the sub-scanning direction is 1 to 5 degrees, respectively.

FIG. 10A is a schematic diagram illustrating trajectories of the laser that are obtained in a case where the oscillation angle φ in the main scanning direction is changed when the oscillation angle θ in the sub-scanning direction is 1 to 5 degrees, respectively. Because the oscillation angle θ in the sub-scanning direction is fixed while the oscillation angle φ in the main scanning direction is changed, the trajectories of the laser are depicted in a manner extending in a horizontal direction. Because the amount in which each trajectory is curved is difficult to distinguish with FIG. 10A, the trajectory where the oscillation angle θ in the sub-scanning direction is 1 degrees is illustrated in FIG. 10B.

Figure 10B:
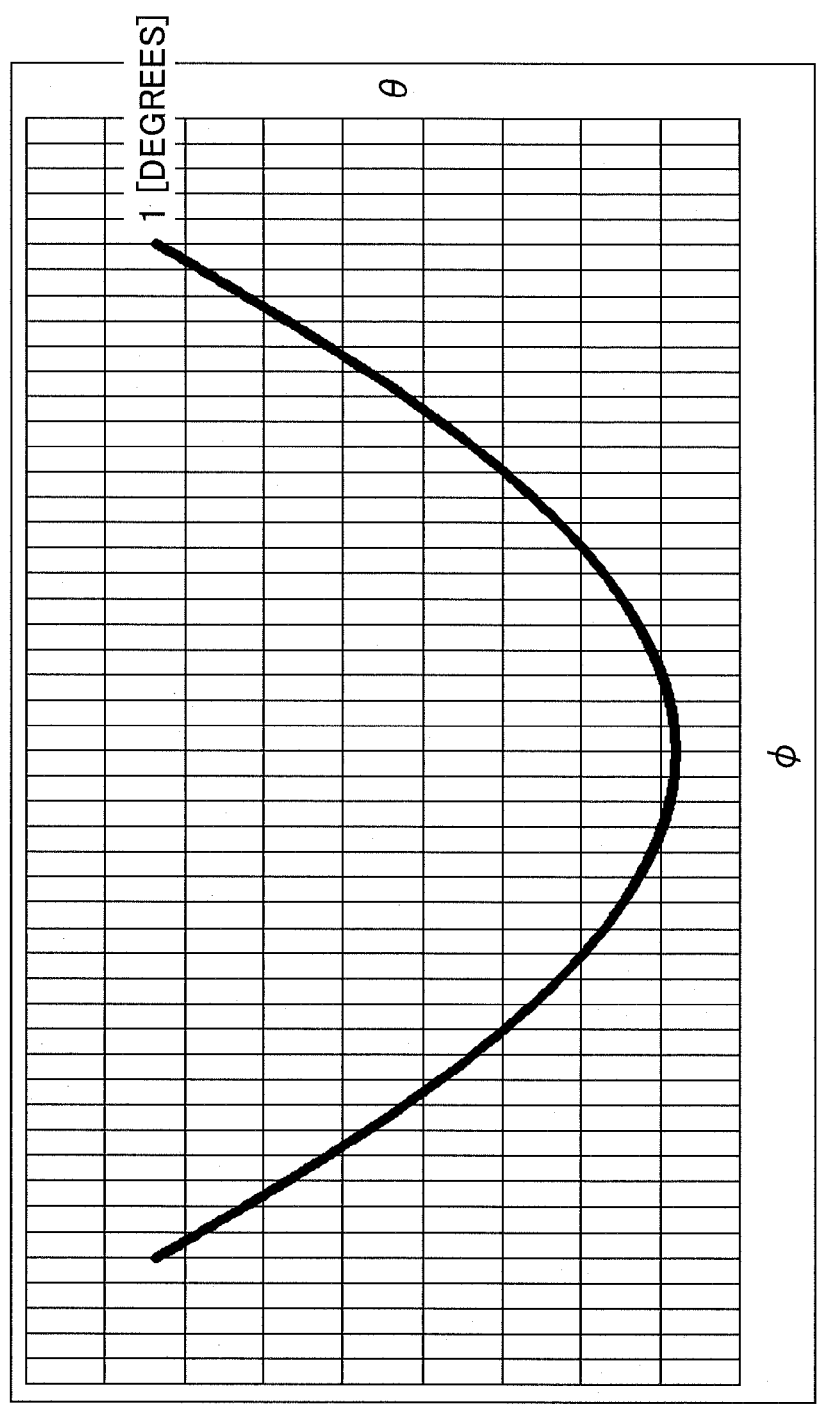

Based on FIG. 10B, it can be assumed that the trajectories in FIG. 10A are nearly parabolic. Therefore, the Y coordinates of the screen coordinate system (X, Y) can be expressed with the oscillation angle φ of the MEMS mirror 70. Thus, in order to express the coordinates of the screen coordinate system (X, Y) as coordinates of an MEMS mirror coordinate system, the oscillation angle φ is assumed as "x" and the oscillation angle θ is assumed as "y".

$$Y(x,y) = c(y)x^2 + d(y)x + e(y) \quad \text{(Expression 4)}$$

In other words, if the oscillation angle φ is determined with respect to each oscillation angle θ, c(y), d(y), and e(y) which define Y(x, y) can be obtained. Thus, by obtaining c(y), d(y), and e(y), Y(x, y) can be obtained.

After obtaining (X, Y) with use of a polynomial expression which can approximate the above-described expressions (1) and (2), the functions a(x)-e(y) are to be numerically defined. Since a(x) and b(x) are functions of x(φ) and c(y), d(y), and e(y) are functions of y(θ), five functions are to be obtained.

[Method for Obtaining 5 Functions]

Next, a method for obtaining the numerical solution of 5 functions according to an embodiment of the present invention is described.

In the above-described expressions (1) and (2), a(x) and b(x) are different depending on the oscillation angle φ, and c(y), d(y), and e(y) are different depending on the oscillation angle φ. Therefore, if it can be determined how a(x) and b(x) change in correspondence with the oscillation angle φ, a(x) and b(x) can be obtained from the oscillation angle φ. Likewise, if it can be determined how c(y), d(y), and e(y) change in correspondence with the oscillation angle θ, c(y), d(y), and e(y) can be obtained from the oscillation angle θ. In this embodiment, a(x), b(x), c(y), d(y), and e(y) can be obtained by using the least squares method.

First, a(x) and b(x) are obtained from each straight line (for example, as illustrated FIG. 9) calculated with the simulation software by using a least square method. By performing this calculation throughout the entire range of the oscillation angle φ (e.g., a range where oscillation angles φ are provided at intervals of 0.01 degrees to 0.1 degrees) in the main scanning direction, a(x) and b(x) throughout the entire range of the oscillation angles φ in the main scanning direction can be obtained.

It is to be noted that the polynomial expression to which oscillation angles are applied is not limited to a linear expression as of expression (3). For example, the polynomial expression may be a quadric polynomial expression or a polynomial expression more than quadric. Alternatively, the polynomial expression may be a hyperbolic curve (e.g., $X^2(x, y)/2a(x) - y^2/2a(x) = 1$). Furthermore, the same polynomial expression need not be used throughout the entire range of the oscillation angle φ. For example, the polynomial expression may be changed according to the oscillation angle φ. More specifically, for example, a straight line polynomial expression may be used in a case of −3 degrees<oscillation angle φ<3 degrees whereas a curve line polynomial expression may be used in a case of oscillation angle φ≤−3 degrees or 3 degrees≤oscillation angle φ. Nevertheless, because a polynomial expression having a few letters (numerals) can be calculated in a short time, this embodiment uses a straight line polynomial expression.

Figure 11A:
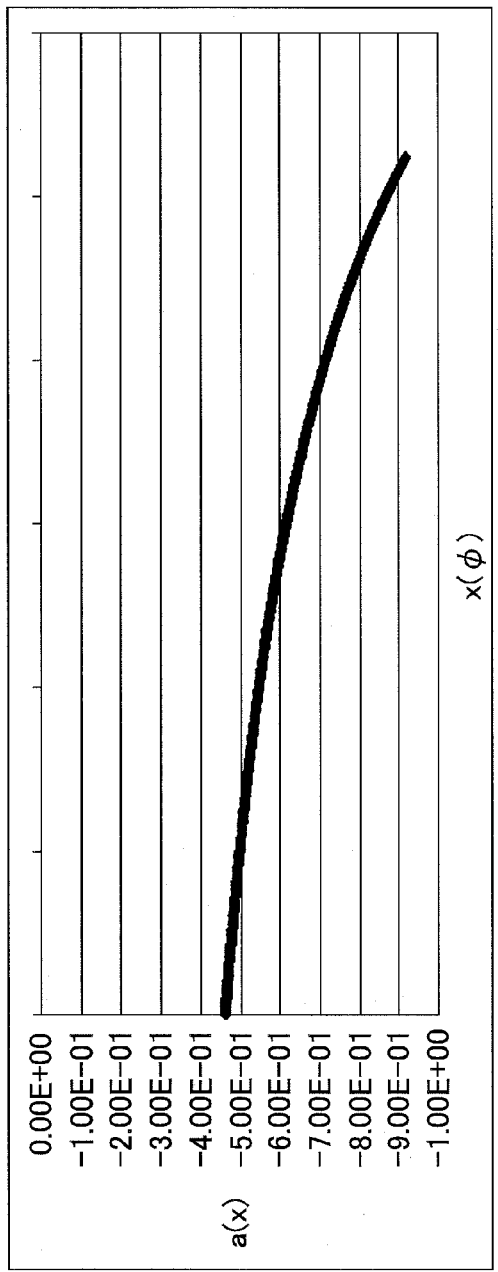
FIG. 11A is a graph illustrating a relationship between the oscillation angle φ in the sub-scanning direction and a(x) according to an embodiment of the present invention.
Figure 11B:
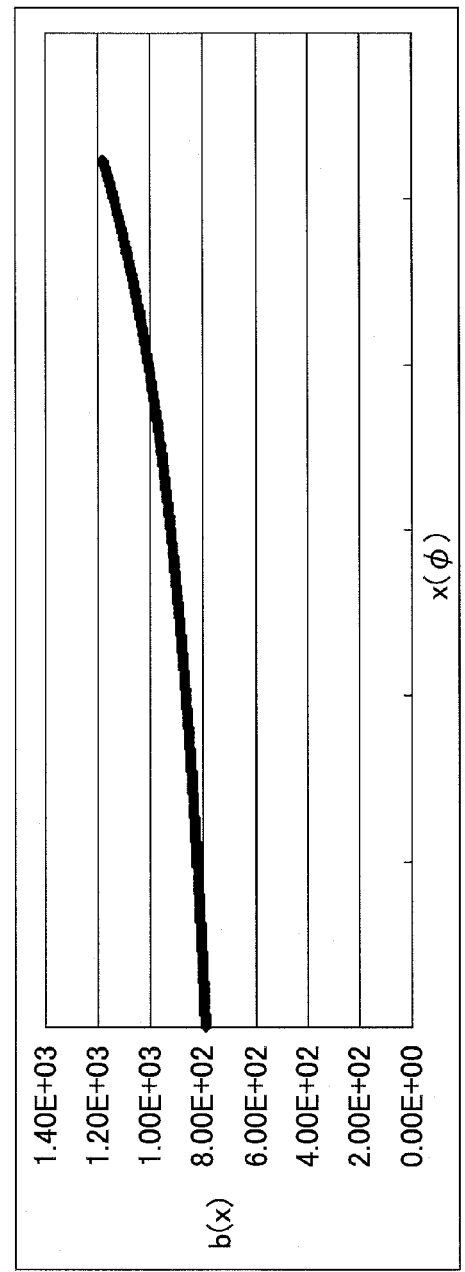
FIG. 11B is a graph illustrating a relationship between the oscillation angle φ and b(x) according to an embodiment of the present invention.

FIG. 11A is a graph illustrating a relationship between the oscillation angle φ in the sub-scanning direction and a(x) according to an embodiment of the present invention. FIG. 11B is a graph illustrating a relationship between the oscillation angle φ and b(x) according to an embodiment of the present invention. The lines illustrated in FIGS. 11A and 11B are assumed to be nearly curved lines. The line illustrated in FIG. 11B is similar to a part of the shape of an irrational function of $(a(x)=\sqrt{\{-(x-b)\}}+c$. The line illustrated in FIG. 11B is similar to a part of the shape of an exponential function.

Then, c(y), d(y), and e(y) are obtained from each line (for example, as illustrated FIG. 10A) calculated with the simulation software by using a least square method. By performing this calculation throughout the entire range of the oscillation angle θ (e.g., a range where oscillation angles θ are provided at intervals of 0.01 degrees to 0.1 degrees) in the sub-scanning direction, c(y), d(y), and e(y) throughout the entire range of the oscillation angles θ in the sub-scanning direction can be obtained.

It is to be noted that the polynomial expression to which oscillation angles are applied is not limited to a polynomial expression as of expression (4). For example, the polynomial expression may be a quartic polynomial expression or a polynomial expression less than quartic. Nevertheless, because a polynomial expression having a few letters (numerals) can be calculated in a short time, this embodiment uses a quadratic expression.

Figure 12A:
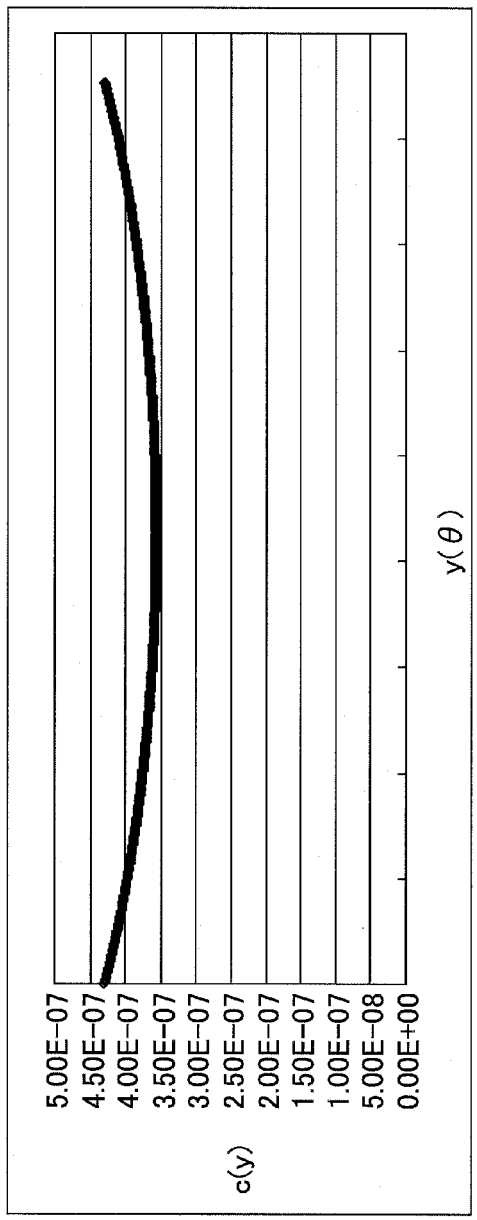
FIG. 12A is a graph illustrating a relationship between a relationship between the oscillation angle θ in the sub-scanning direction and c(y) according to an embodiment of the present invention.
Figure 12B:
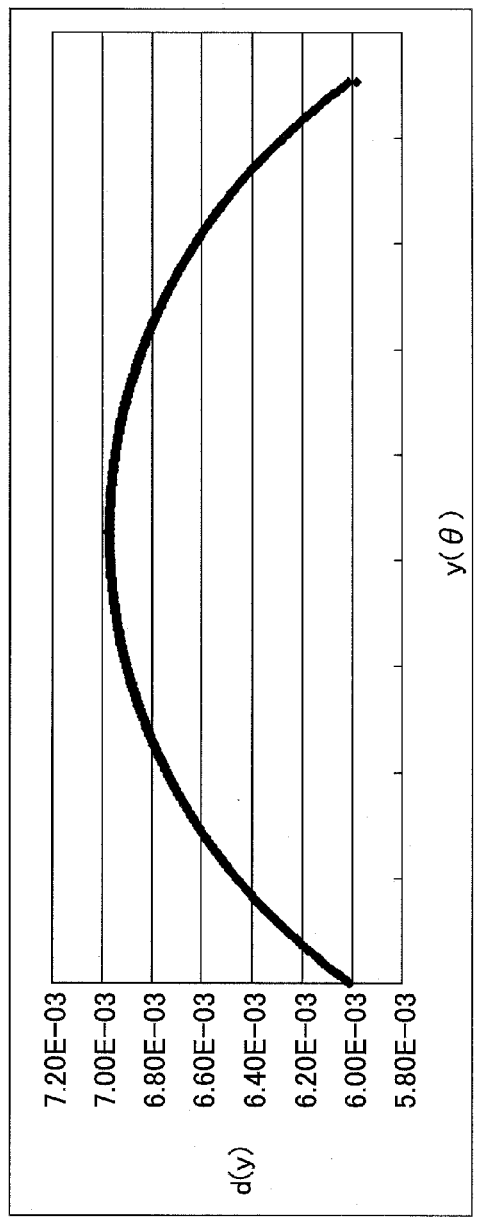
FIG. 12B is a graph illustrating a relationship between a relationship between the oscillation angle θ in the sub-scanning direction and d(y) according to an embodiment of the present invention.
Figure 12C:
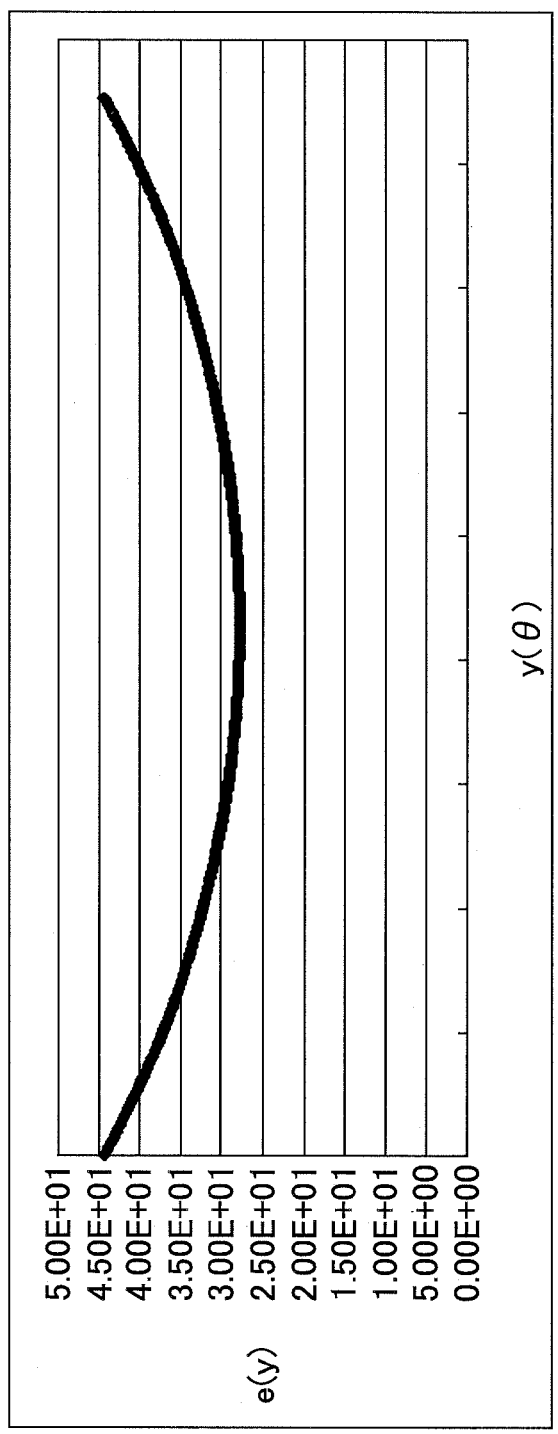
FIG. 12C is a graph illustrating a relationship between a relationship between the oscillation angle θ in the sub-scanning direction and e(y) according to an embodiment of the present invention.

FIG. 12A is a graph illustrating a relationship between the oscillation angle θ in the sub-scanning direction and c(y) according to an embodiment of the present invention. FIG. 12B is a graph illustrating a relationship between a relationship between the oscillation angle θ in the sub-scanning direction and d(y) according to an embodiment of the present invention. FIG. 12C is a graph illustrating a relationship between a relationship between the oscillation angle θ in the sub-scanning direction and e(y) according to an embodiment of the present invention. The lines illustrated in FIGS. 12A-12C are assumed to be nearly curved lines. The line illustrated in FIGS. 12A and 12C are similar to a part of the shape of a parabolic line facing downward, and the line illustrated in FIG. 12B is similar to a part of the shape of a parabolic line facing upward (quadratic polynomial expression). Alternatively, the lines illustrated in FIGS. 12A-12C may be assumed as having a shape of a cubic polynomial or a polynomial more than cubic.

Accordingly, it can be understood that the 5 functions a(x)-e(y) can be obtained by approximating with the above-described straight and curve line equations. In this embodiment, in order to simplify calculation, a(x) to e(y) are all commonly approximated with a quadratic polynomial which has the simplest curve line polynomial expression.

That is, by obtaining the numeric coefficient d of the following quadratic polynomial expression with use of the least squares method, the oscillation angles φ, θ can be obtained from a(x) to e(y).

$a(x)=d_{y1}x^2+d_{y2}x+d_{y3}$ $b(x)=d_{y4}x^2+d_{y5}x+d_{y6}$ $c(y)=d_{x1}y^2+d_{x2}y+d_{x3}$ $d(y)=d_{x4}y^2+d_{x5}y+d_{x6}$ $e(y)=d_{x7}y^3+d_{x8}y+d_{x9}$ (Expression 5)

The 15 coefficients d obtained with the above expression are stored in a non-volatile memory of a microcomputer (not illustrated). When the LPJ 200 is activated, the microcomputer reads out the coefficients from the non-volatile memory and sets the coefficients to, for example, a register of the depiction position calculating unit 57. The register of the depiction position calculating unit 57 corresponds to the distortion correction parameter storage unit 63. The depiction position calculating unit 57 uses the expression 5 to obtain a(x) to e(y) when the oscillation angle φ and the oscillation angle θ is a given angle, respectively. Accordingly, the depiction position calculating unit 57 can obtain the X screen coordinates by using the expression (3) together with the obtained a(x) and b(x) and obtain the Y screen coordinates by using the expression (4) together with the obtained c(y), d(y), and e(y).

With the LPJ 200 according to the above-described embodiment of the present invention, calculation for obtaining screen coordinates can be simplified by approximating with a polynomial expression without using a cubic polynomial expression. Thereby, a large size circuit would not required by the depiction position calculating unit 57.

It is to be noted that, because the graphs of FIGS. 9-10B are merely examples of screen coordinates in a case where the projection angle of the LPJ 200 is a given angle, the values of the 15 coefficients changes in a case where the projection angle of the LPJ 200 becomes nearly 0 degrees. However, in a case where the projection angle of the LPJ 200 is nearly 0 degrees, the depiction position calculating unit 57 does not need to calculate the screen coordinates because the addresses of the frame memory 58 can be identified on a one-to-one relationship with respect to the screen coordinates by referring to the clock count.

[Relationship Between Oscillation Angles φ, θ and Clock Count]

In the above-described embodiment, the movement of the MEMS mirror 70 can be expressed with a combination of overlapped simple harmonic oscillation of 2 axes by using the oscillation angles φ and θ as parameters. This signifies that the changes of angles can be approximated with linear functions of time.

The clock counts, which are input to the depiction position calculating unit 57 for synchronization, are equivalent to time. As described above, considering that the expressing of coordinates using angles as parameters and the expressing of coordinates using time as parameters are equivalent, the screen coordinates (X,Y) can be expressed by using the clock counts input to the depiction position calculating unit 57.

[Overall Operation]

FIG. 13 is a sequence diagram illustrating an overall operation of the image output system circuit 48 according to an embodiment of the present invention.

In Step S1, the 2D scanner drive timing generating unit 51 outputs the clock counts in the main scanning and sub-scanning directions to the corrected clock count calculating unit 61 based on the system clock frequency.

In Step S2, the timing correction instructing unit 54 calculates the correction amount (amount in which the clocks are to be corrected) based on the difference between the actual angle input from the scanner angle calculating unit 55 and the oscillation angle anticipated by the drive waveform and outputs the clock correction amount to the corrected clock count calculating unit 61.

In Step S3, the corrected clock count calculating unit 61 calculates the corrected clock count by adding the clock correction amount to the clock counts.

In Step S4, the screen coordinate measuring unit 62 reads out 15 coefficients from the distortion correction parameter storage unit 63. In a case where the coefficient(s) d is a fixed value, the 15 coefficients need be read out, for example, until Step S4.

In Step S5, the screen coordinate measuring unit 62 obtains the functions a(x) to e(y) by applying the coefficients d to the above-described expression (5). Further, the screen coordinate measuring unit 62 obtains X coordinates of the screen coordinates by applying the functions a(x) and b(y) to the expression (3) and obtains Y coordinates of the screen coordinates by applying the functions c(y), d(y), and e(y) to the expression (4).

In Step S6, the memory address calculating unit 64 obtains the data address of the image data of the depiction target (object to be depicted (displayed)) in accordance with the screen coordinates and outputs the data address to the memory control block 100.

The processes subsequent to Step S6 include a process of reading out data from the frame memory (described below in the second embodiment).

[Steps of Calculating Coefficient d]

FIG. 14 is a flowchart illustrating the steps of obtaining the 15 coefficients from data pertaining to (X, Y) by performing simulation according to an embodiment of the present invention. The simulation is performed using, for example, a computer including a CPU and a memory.

First, the computer has data generated by simulation software loaded to the memory (Step S10).

Then, the computer extracts data corresponding only to data within the range of the oscillation angle of the MEMS mirror 70 (Step S20). This is because the simulation can be performed on a range in which the MEMS mirror 70 cannot oscillate. The range for performing the simulation can be limited to be within an actual oscillation angle beforehand.

Then, the computer converts the oscillation angles $\phi$ and $\theta$ into clock counts (Step S30).

Then, the computer reads out the clock counts having the same coordinates (X, Y) in the main scanning direction and divides the clock counts by sorting the clock counts into groups based on the coordinates in the sub-scanning direction (Step S40). Thereby, the trajectory as illustrated in FIG. 9 can be obtained.

Then, the computer calculates the functions a(x) and b(x) with respect to each position in the main scanning direction (i.e. with respect to each group sorted into groups in Step S40) by using the least squares method (Step S50).

Then, the computer uses the least squares method to calculate the coefficients obtained in a case where the calculated a(x) and b(x) of each position in the main scanning direction are applied to the quadratic polynomial expression (3) (Step S60). Thereby, $d_{y1}$ to $d_{y6}$ can be obtained.

Then, the computer reads out the clock counts having the same coordinates (X, Y) in the sub-scanning direction and divides the clock counts by sorting the clock counts into groups based on the coordinates in the main scanning direction (Step S70).

Then, the computer calculates the functions c(y), d(y), and e(y) with respect to each position in the sub-scanning direction (i.e. with respect to each group sorted into groups in Step S70) by using the least squares method (Step S80).

Then, the computer uses the least squares method to calculate the coefficients obtained in a case where the calculated c(y), d(y), and e(y) of each position in the sub-scanning direction are applied to the quadratic polynomial expression (4) (Step S90).

After obtaining $d_{y1}$ to $d_{x9}$, the computer stores the obtained coefficients into the distortion correction parameter storage unit 63.

Figure 15:
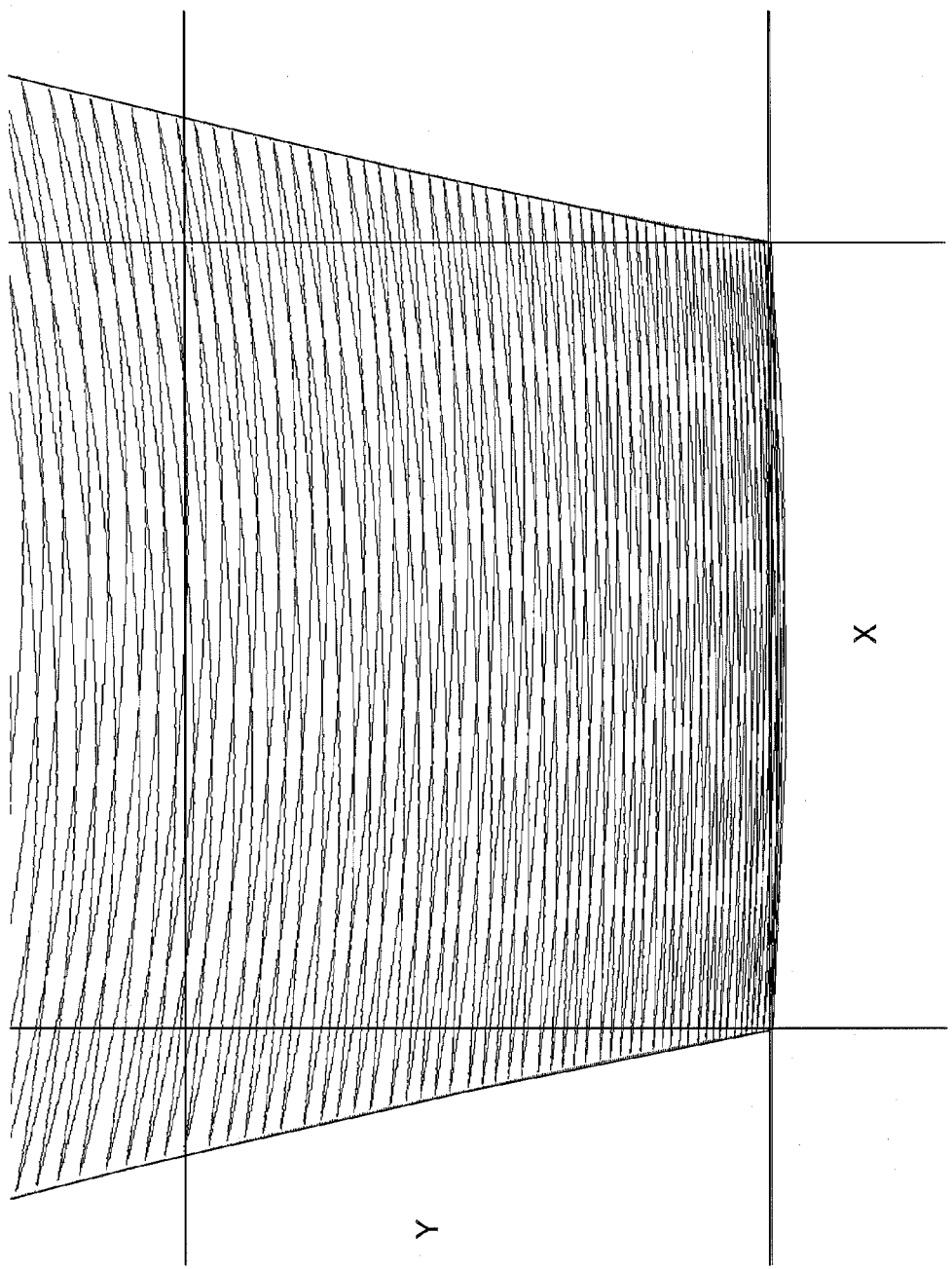
FIG. 15 is a schematic diagram illustrating an example of trajectories of the screen coordinates obtained by obtaining the functions a(x) to e(y) by using $d_{y1}$ to $d_{x9}$ and calculating the trajectories of the screen coordinates from the obtained functions a(x) to e(y) with use of the simulation software according to an embodiment of the present invention.

FIG. 15 is a schematic diagram illustrating an example of trajectories of the screen coordinates obtained by obtaining the functions a(x) to e(y) by using $d_{y1}$ to $d_{x9}$ and calculating the calculated trajectories of the screen coordinates from the obtained functions a(x) to e(y) with use of the simulation software according to an embodiment of the present invention. In FIG. 15, the curved lines reciprocating in the horizontal direction represent the trajectories of the screen coordinates, the envelope of the curved line represents the projection image, and the rectangular shape represents an ideal projection image in a case where the projection angle is 0 degrees.

According to FIG. 15, because the same trajectory as the trajectory of an actual laser can be obtained, it can be confirmed that numerical calculation of coordinates of the laser can be appropriately achieved.

As described above, the projection angle is large and distorted compared to the ideal projection image because the LPJ 200 in this embodiment is set in a slanted position facing upward and forming a predetermined projection angle. More specifically, a laser radiated from outside the rectangle is to be initially radiated within the rectangle. In order to radiate a laser only to the inside of the rectangle, the memory control block 100 is controlled to selectively send image data to the laser driver 59. Thereby, distortion can be corrected without having to lower the resolution.

[Distortion Correction]

As described above, how much the projection image is distorted can be easily determined if a predetermined projection angle can be obtained (calculated). For example, the ratio between the upper side and the lower side of a trapezoid depends on the projection angle. It is considered preferable for the ratio of the horizontal length and the vertical length of the ideal rectangular image (so-called aspect ratio) to maintain an aspect ratio equivalent to that of the aspect ratio of the image data input by video (video input image data). Therefore, the irradiation position of the laser of the distorted projection image is controlled to correspond to an area having a predetermined aspect ratio so that the aspect ratio of the initial image data of the distorted projection image maintains a predetermined aspect ratio. Thereby, distortion can be corrected without reducing the number of pixels.

It is, however, to be noted that the ideal projection image does not necessarily need to have an aspect ratio equivalent to the aspect ratio of the image data of the input by video as long as the ideal projection image has a rectangular shape.

Figure 16:
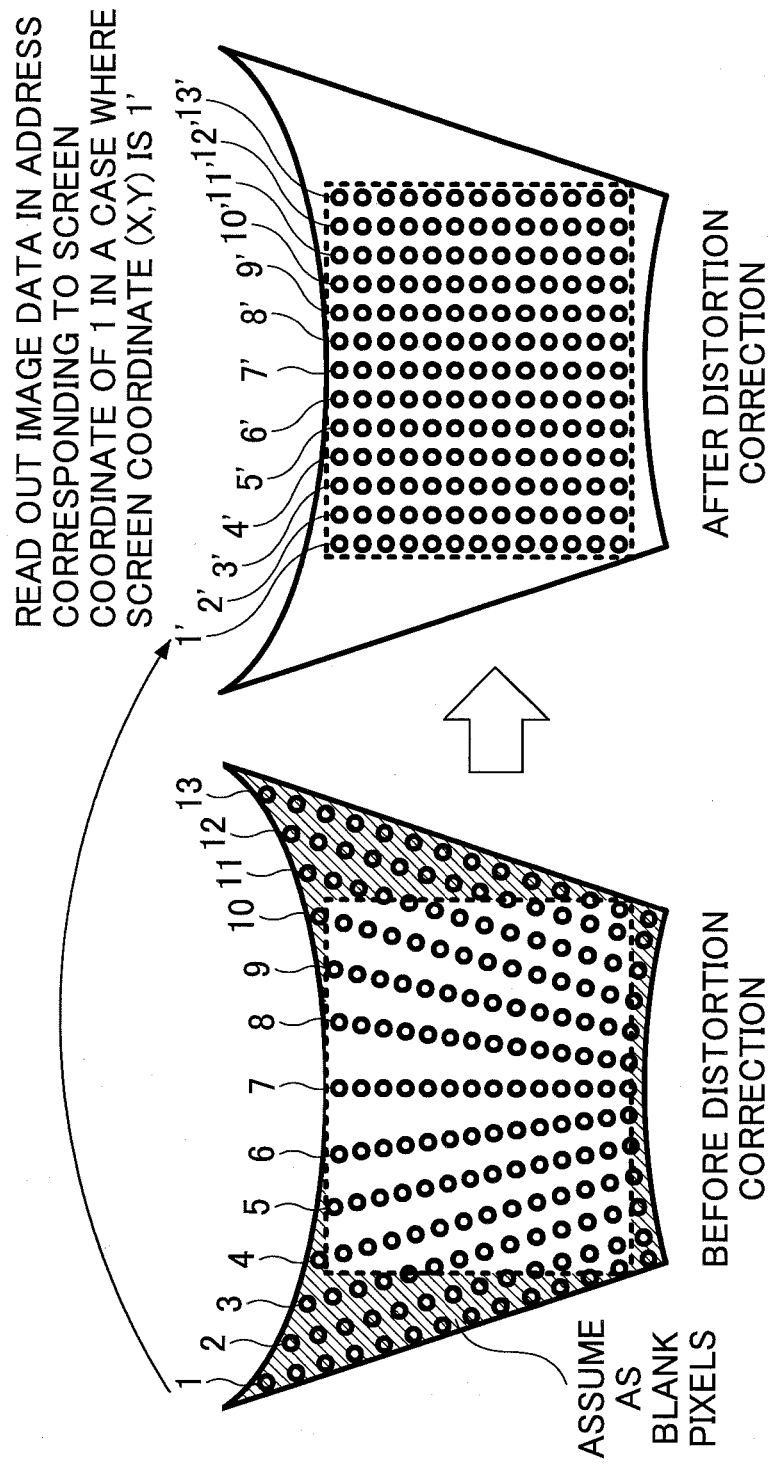
FIG. 16 is a schematic diagram for describing an example of distortion correction.

FIG. 16 is a schematic diagram for describing distortion correction. The aspect ratios of the image data to be video input are detected beforehand by the depiction position calculating unit 57. Then, the memory address calculating unit 64 performs the following processes (i) and (ii).

(i) The memory address calculating unit 64 may include, for example, a determination table prepared in correspondence with a predetermined aspect ratio(s) and may refer to the determination table. The determination table includes data indicating whether each of the screen coordinates is within a rectangle maintaining a predetermined aspect ratio. In a case where the screen coordinates are not within the rectangle, the memory address calculating unit 64 reports to the memory control block 100 that the image corresponding to the screen coordinates is a blank pixel. In this case, the memory control block 100 controls radiation of a laser, so that an image having a luminance of a black level is displayed. In other words, no laser is radiated to the position corresponding to the blank pixel.

(ii) In a case where the screen coordinates are within the rectangle, the memory address calculating unit 64 calculates a data address table based on the screen coordinates and outputs the calculated data address table to the memory control block 100. In order to radiate a projection image having a predetermined aspect ratio as illustrated in FIG. 16 by using the laser used in forming the distorted projection image illustrated in FIG. 16, the timing for radiating the laser is to be adjusted. For example, the laser corresponding to reference numeral 1 of FIG. 16 is to be radiated at a timing of radiating the laser corresponding to reference numeral 1' of FIG. 16, . . . the laser corresponding to reference numeral 13 of FIG. 16 is to be radiated at a timing of radiating the laser corresponding to reference numeral 13' of FIG. 16. Therefore, the memory address calculating unit 64 has a mapping table (prepared in correspondence with each aspect ratio) for mapping the screen coordinates of the distorted image into an area maintaining a predetermined aspect ratio. For example, in a case of the screen coordinates of the laser 1', a data address in the frame memory 58 corresponding to the coordinate 1 is generated. By generating the data address, the coordinates of the distorted image can be mapped to the rectangle without loss of laser.

Accordingly, by selectively driving the laser driver 59, distortion of an image can be eliminated. Thereby, an image can be displayed without having to discard pixels.

Figure 17:
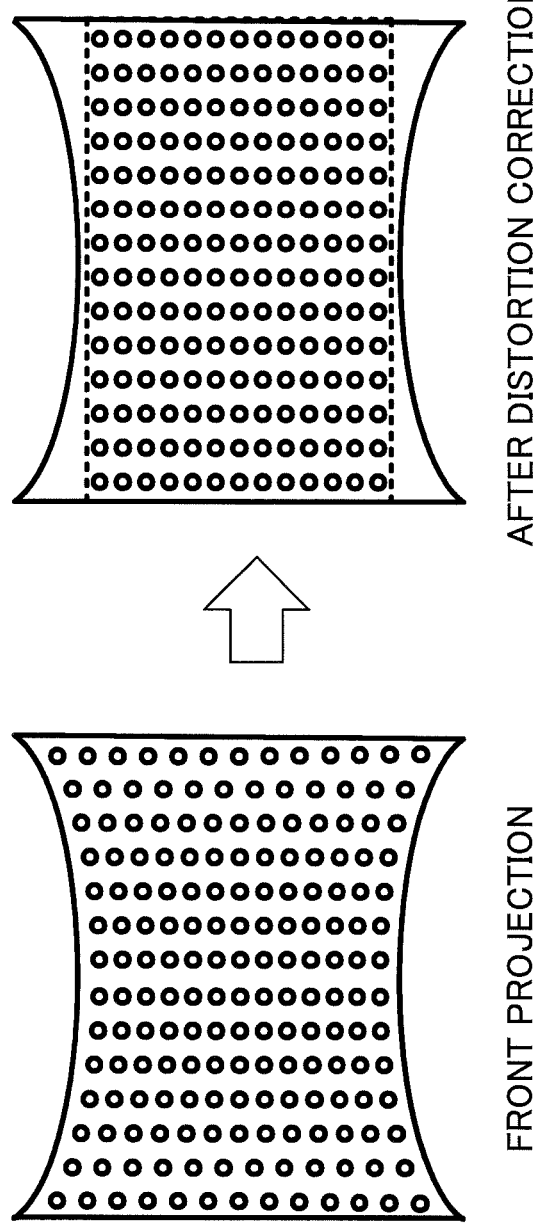
FIG. 17 is a schematic diagram for describing pincushion distortion or barrel distortion and the results of correcting the pincushion distortion or the barrel distortion.

It is to be noted that distortion correction not only can be applied to distortion caused by inclination (tilt) but can also be applied to distortion of the optical system. FIG. 17 is a schematic diagram for describing pincushion distortion or barrel distortion and the results of correcting the pincushion distortion or the barrel distortion. In a case of using a magnification optical system for increasing the projection image, pincushion distortion or barrel distortion may occur. When designing an optical system, distortion can generally be reduced to a hardly noticeable level in a case of front projection. However, even if distortion is hardly noticeable in the case of front projection, pincushion distortion or the like may be significantly noticeable in a case of oblique projection. However, the LPJ 200 according to the above-described embodiment of the present invention can also be applied to correct distortion of the optical system such as the pincushion distortion by adjusting the timing of radiating the laser. Accordingly, distortion of the optical system such as the pincushion distortion can be corrected without having to adjust the optical system.

Further, by operating the depiction position calculating unit 57 and the memory control block 100 at high speed (e.g., 200 MHz in comparison with 60 MHz of a related art example), it becomes possible to perform, for example, interpolation of pixel values. As a result, high definition depiction of images smaller than 1 pixel (in this embodiment, approximately ⅓ of a 1 pixel) can be achieved.

Hence, with the LPJ 200 according to the above-described embodiment of the present invention where screen coordinates are calculated using approximate polynomial expressions, calculation of, for example, depiction position can be performed at high speed without using complicated formulas. Further, distortion of an image can be prevented even where the LPJ 200 is tilted because the timing of radiating a laser from the LPJ 200 can be corrected while maintaining a predetermined aspect ratio.

[Second Embodiment]

In the LPJ 200 using a resonating type MEMS according to the first embodiment, the memory control block 100 scans a frame memory in correspondence with screen coordinates. This method of scanning does not necessarily read out pixels in accordance with the order of addresses of the frame memory. Therefore, it may be difficult for reading out data at a speed equivalent to the speed of, for example, correcting the timing of laser radiation. In view of such difficulty, the LPJ 200 according to the second embodiment performs memory access referred to as "free scan". The term "free scan" is used in contrast with the term "raster scan". In the case of free scan, addresses that are to be accessed are not necessarily consecutive.

First, in the case of free scan, the timing of image input and the timing of image output cannot be matched. Therefore, data of the image to be projected (projection image data) is to be temporarily stored in the frame memory 58.

Figure 18A:
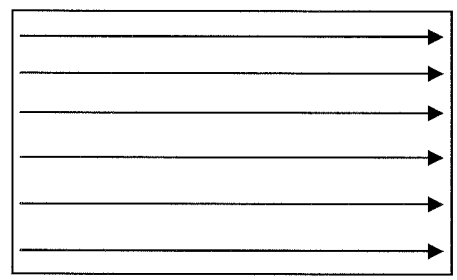
FIGS. 18A and 18B are schematic diagrams for describing an example of free scan.
Figure 18B:
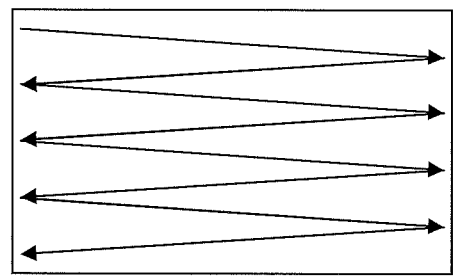

FIGS. 18A and 18B are schematic diagrams for describing free scan. More specifically, FIG. 18A is a schematic diagram illustrating an example of performing raster scan whereas FIG. 18B is a schematic diagram illustrating an example of performing free scan. With raster scan, input pixels are read out in the X-direction by scanning light from a starting point (origin) of an input image and terminating at an end point of the input image in the X-direction. After reaching the end point, the light is moved back (backed to the left in FIG. 18A) and down one line in the Y-direction. Then, input pixels are read out by scanning light in the X-direction until reaching the end point in the X-direction.

In contrast, free scan is performed by scanning light in the X-direction while scanning the light in the Y-direction. Therefore, input pixels cannot be consecutively read out. Therefore, input pixels cannot be read out having consecutive addresses. Thus, the input pixels are intermittently accessed. Therefore, in order to perform free scan on projection image data (data of an image to be projected), the projection image data is to be temporarily stored in the frame memory 58.

However, when accessing the frame memory 58 in the case of free scan as illustrated in FIG. 18B, access to consecutive addresses cannot be performed. In addition, a process of pre-reading or a process of rearranging data to be stored into an appropriate order based on anticipated access addresses cannot be performed. This leads to a problem where unnecessary access is made to the frame memory 58 in a case of, for example, SDRAM (e.g., DDR/DDR2/DDR3) which uses burst access. In order to obtain necessary bandwidth for resolving the problem, there is a method of using an expensive Dual Port SRAM or using a high speed SDRAM (which is inexpensive but consumes large amount of power).

For example, in Japanese Laid-Open Patent Publication No. 8-065686, there is disclosed a method of improving access efficiency to a memory. With this method, image data is stored into a memory by compressing data of plural pixels. Then, the image data is read out by decoding the compressed data and stored in a buffer (cache). Thus, the cached data can be used at the next time of reading out the image data. Accordingly, the load of the memory and the amount of data transfer can be reduced.

However, as disclosed in Japanese Laid-Open Patent Publication No. 8-065686, even if an access bandwidth can be attained by the compression/decoding of image data, the above-described problem of reading out consecutive addresses. That is, in a case of free scan, access addresses are different for each and every scanned data item. Thus, the data to be read out are not stored with consecutive addresses. Therefore, with the method disclosed in Japanese Laid-Open Patent Publication No. 8-065686, even if compressed data is read out and decoded to plural pixels, there may be a case where the plural pixels cannot be used. As a result, it may be necessary to load the data again. Hence, with the method disclosed in Japanese Laid-Open Patent Publication No. 8-065686, it may be difficult to achieve reduction of workload and data transfer amount in the case of, for example, free scan.

The below-described memory control apparatus according to an embodiment of the present invention can achieve access to the frame memory 58 with high efficiency. Because the below-described memory control apparatus corresponds to the memory control block 100 of the first embodiment, the below-described embodiment of the memory control apparatus is also denoted with reference numeral 100.

Figure 19:
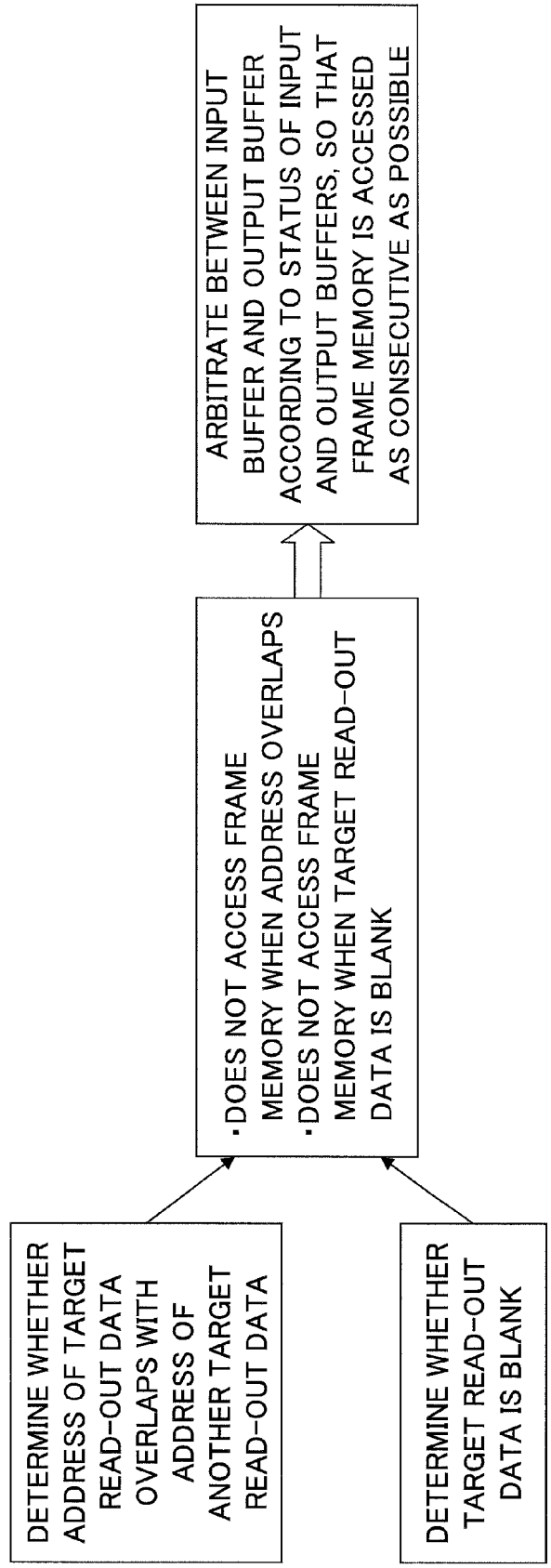
FIG. 19 is a schematic diagram for describing memory access of an LPJ according to an embodiment of the present invention.

FIG. 19 is a schematic diagram for describing memory access of the LPJ 200 according to an embodiment of the present invention.

First, the LPJ 200 constantly determines whether the address of the data to be read out overlaps with the address of another data. In a case where the address of the data to be read out is the same as that of another data (i.e. a case of overlap), data is reproduced without accessing the frame memory (i.e. data having the same address is copied). Further, the LPJ 200 determines whether the data to be read out is a blank in a case where distortion correction is performed. In a case where the data to be read out is a blank, the LPJ 200 does not access the frame memory 58. By the determining of overlapped addresses and the determining of blanks, consecutively access to the same address or access to unnecessary data can be prevented with respect to the frame memory 58 which basically has consecutive addresses.

Further, the LPJ 200 monitors the amount of data remaining in the below-described input buffer 11 and the below-described output buffer 12. Thus, in order to achieve consecutive access to the frame memory 58, the LPJ 200 arbitrates the priority of writing data to the input buffer 11 and the priority of reading out data from the output buffer 12 in accordance with the status of the input buffer 11 and the output buffer 12. Thereby, data can be intensively written to the frame memory 58 and data can be intensively read out from the frame memory 58.

[Regarding DRAM]

In this embodiment, a DRAM (Dynamic Random Access Memory) is used as the frame memory 58. The DRAM is used as the storage device of the frame memory 58 for the following reasons.

DRAM is inexpensive (DRAM can be provided at low cost since DRAM is largely used in personal computers (PCs)).

DRAM can be accessed at high speed (e.g., DDR having a clock frequency of 333 MHz, DDR3 having a clock frequency of 1333 MHz).

The supply of DRAM is steady.

DRAM has large storage capacity (e.g., 128 Mbits, 512 Mbits).

In a case of a low price assembly device, the cost of LSI has a relatively large importance to the overall cost of the low price assembly device. The cost of the LSI is a factor to consider in determining whether to install the LSI in a product. Therefore, the cost of the storage device is desired to be low.

Further, the storage capacity required for the frame memory 58 differs depending on the size of the image. FIG. 20 is a table illustrating an example of the relationship between image size and storage capacity. For example, approximately 7.1 Mbits is required for VGA, and approximately 45 Mbits is required for Full-HD. It is to be noted that the values in the parenthesis of the table indicate the gradation value of 1 pixel. Thus, in a case of displaying gradation with 32 bits, approximately 9.4 Mbits is required for VGA and approximately 60 Mbits is required for Full-HD.

For example, in a case of SRAM for HD (720p), 27.3 Mbits can be stored. Nevertheless, a single SRAM would cost several thousand yen. Thus, depending on the cost of the product using the SRAM, it may be difficult to select SRAM as the storage device of the product. On the other hand, even a single 512 Mbit SDRAM using DDR/DDR2/DDR3 can be supplied at a cost no more than 500 yen.

The DRAM, however, has an undesired characteristic of having large access latency (delay). For example, in a case of performing a single readout access with a DDR3 memory, a maximum of 33 cycles is required starting from a pre-charge to the completion of the readout.

Figure 21:
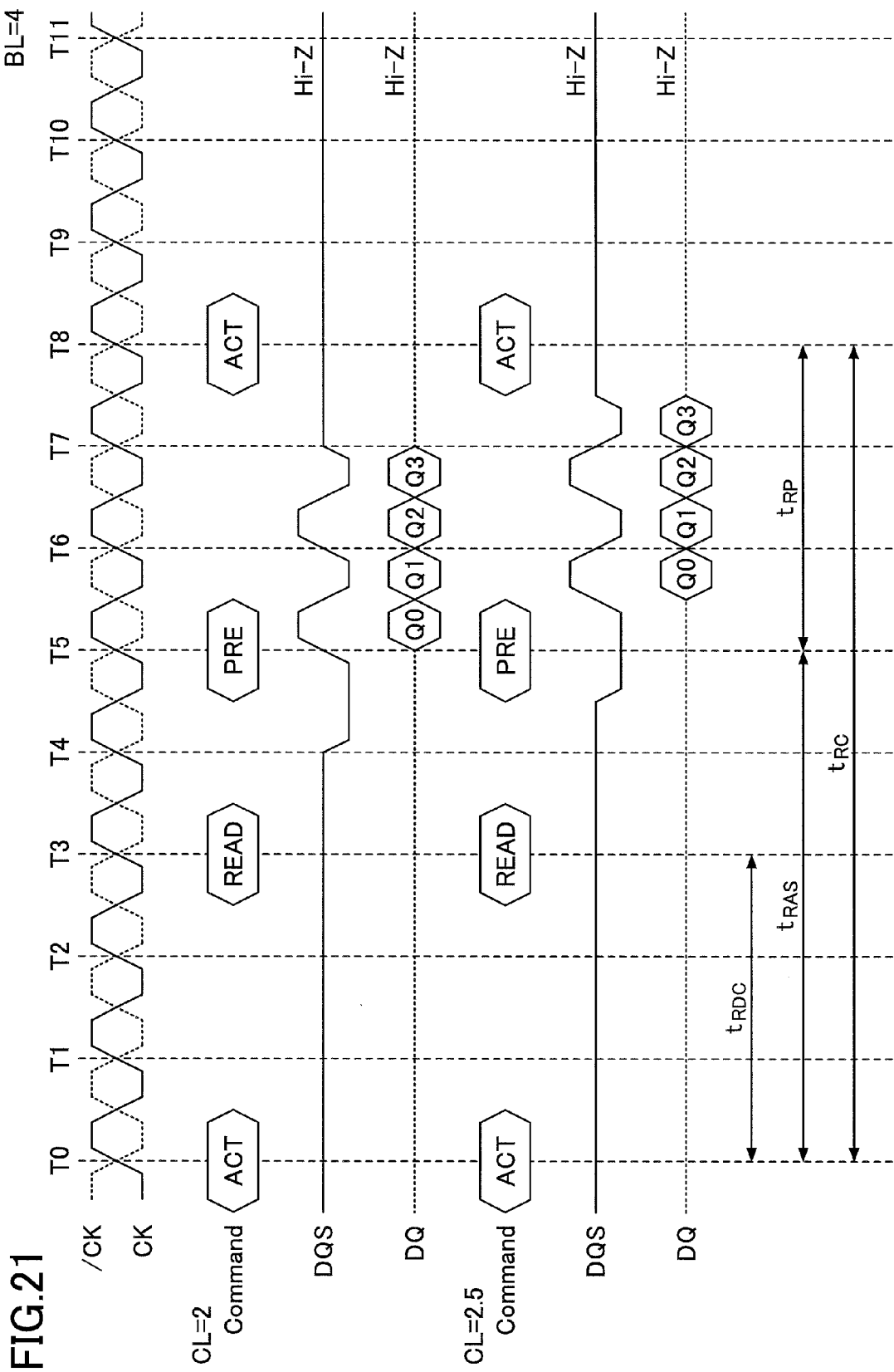
FIG. 21 is a sequence diagram illustrating an example of a read cycle.

FIG. 21 is a sequence diagram illustrating a read cycle. The upper row indicates CAS (Column Address Strobe) Latency (CL) in which CL=2 and the lower row indicates CAS Latency in which CL=2.5. The memory controller performs the following processes.

(i) The memory controller inputs a row address, a bank address together with a ACT (bank active command) in order to make a specific row address of a corresponding bank active.

(ii) Then, after tRCD, the memory controller inputs a column address, a bank address, and a READ (read command).

(iii) Then, after CAS latency, burst data output is started from the above-described identified address.

(iv) Then, after tRAS, the memory controller inputs a PRE (pre-charge command).

(v) The memory ouputs a DQS signal (data strobe signal) and a DQ signal (data signal) synchronizing with the DQS signal. The memory controller obtains the DQ signal by referring to the edge of the rise/fall of the DQS signal.

Accordingly, in order to conceal latency, the SDRAM type basically performs consecutive access.

Figure 22:
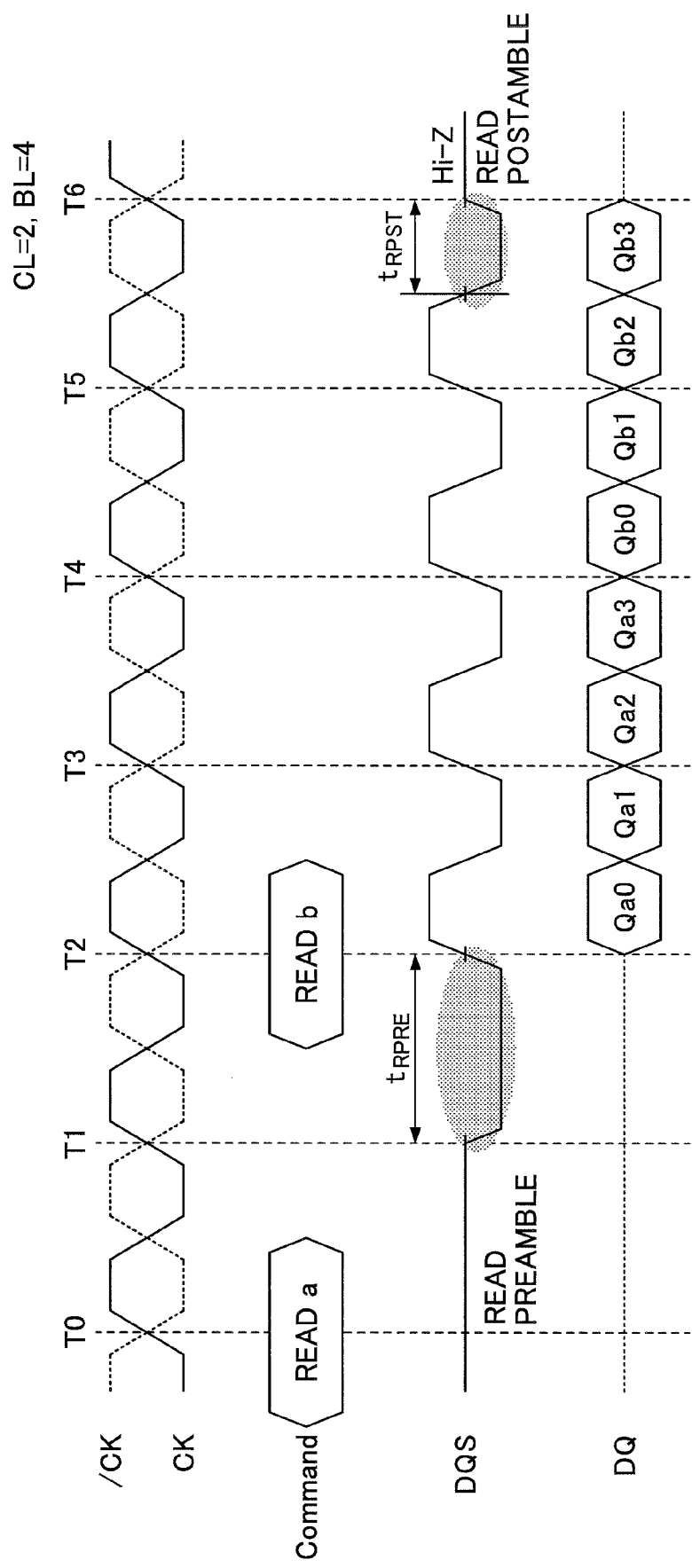
FIG. 22 is a sequence diagram illustrating an example of a read cycle during consecutive access according to an embodiment of the present invention.

FIG. 22 is a sequence diagram illustrating a read cycle during consecutive access according to an embodiment of the present invention. In FIG. 22, the CL (CAS Latency) is 2.

Only at the first time of performing consecutive access (READ a in FIG. 22), all of the above-described processes of the memory controller is performed. At the second time of access and after, access can be performed simply in accordance with an instruction of the column address (Read b in FIG. 22). In other words, at the second time of access and after, the outputting of the ACT, the bank address, and the row address is omitted. Further, the output of pre-charge (PRE in FIG. 22) is omitted.

Accordingly, even where latency is large, access can be achieved with high throughput. FIG. 22 is a sequence diagram illustrating a case where column address is instructed two times consecutively. As illustrated in FIG. 22, reading out of data can be performed immediately after the second read command (READ b).

Thus, in order to achieve access to a DDR memory with high throughput, consecutive access is to be performed only with a column address and without changing the bank address and the row address (because the bank address, and the row address are omitted in consecutive access).

[Raster Scan]

Figure 23:
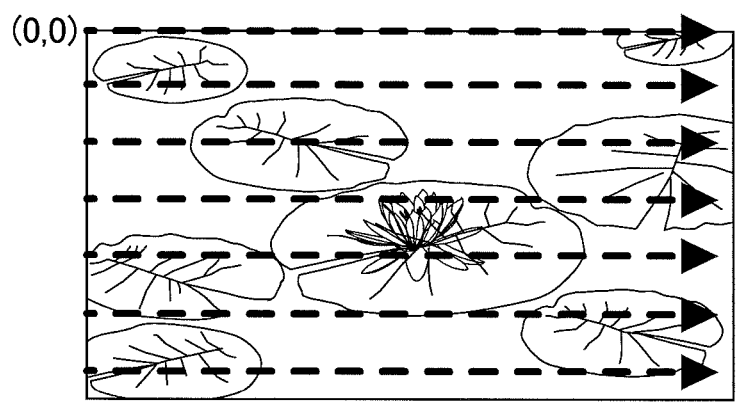
FIG. 23 is a schematic diagram for describing an example of performing raster scan.

FIG. 23 is a schematic diagram for describing an example of performing raster scan. Raster scan is a known method in writing data to, for example, the frame memory 58 and reading data from the frame memory 58. For example, raster scan is used for displaying an image on a display of a PC. The raster scan is a scanning method performed by converting a single scan line of an original image into data and displaying the data in the same order of scanning the original image.

In a case of the frame memory 58 of the LPJ 200 using the resonance type MEMS mirror 70, image data input from a PC, a mobile phone or the like to the LPJ 200 is stored in the frame memory 58. In a case of recording image data obtained from the PC or the like, the LPJ 200 may sequentially store the image data line-by-line by using raster scan.

In raster scan, image data of an input image is stored by scanning a single line in the X-direction from an origin (0, 0) until reaching an end point of the line. Then, the LPJ 200 continues storage of the image data by moving down one line in the Y-direction and scanning in the X-direction. By repeating this process, a single frame image can be input. Because data is stored in the X-direction in consecutive addresses in the case of performing raster scan, data can be consecutively written to the frame memory 58.

[Free Scan]

FIG. 23 is a schematic diagram for describing an example of performing raster scan. Because the LPJ 200 uses the resonance type MEMS mirror 70, it is extremely difficult to set specific values as the oscillation frequencies in the X and Y directions. Therefore, oscillation frequencies in the X and Y directions become given values. That is, the oscillation frequencies in the X and Y directions differ depending on the physical properties of the MEMS mirror 70. If specific values are set to the oscillation frequencies in the X and Y directions, image data can be stored so that raster scan is performed according to the specific oscillation frequencies. However, because the oscillation frequencies in the X and Y directions are given values, image data cannot be recorded to the frame memory 58 in a predetermined order. As a result, image output of the LPJ 200 is performed by free scan.

Figure 24:
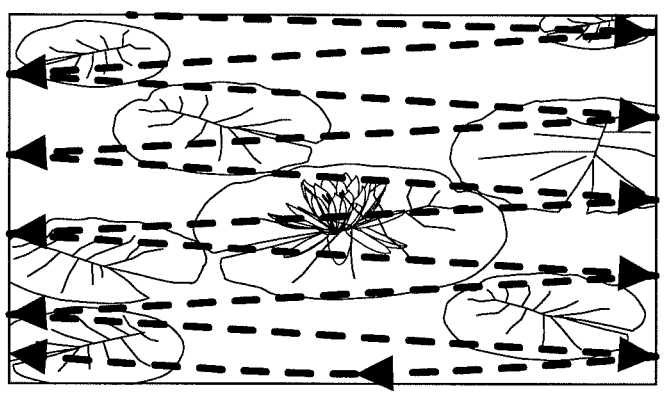
FIG. 24 is a schematic diagram for describing an example of free scan.

As illustrated in FIG. 24, the LPJ 200 scans in the X-direction while scanning in the Y-direction (see scanning line illustrated with diagonal arrows in FIG. 24). Accordingly, a single line in the X-direction cannot be accessed with consecutive addresses. After consecutively reading data in the X-direction to some degree and moving the scanning position in the Y-direction, the reading of data in the X-direction is started again. This causes access to the frame memory 58 to be intermittent (i.e. not continuous). The intermittent access to the frame memory 58 causes the overhead of access to increase.

[Distortion Correction]

Figure 25A:
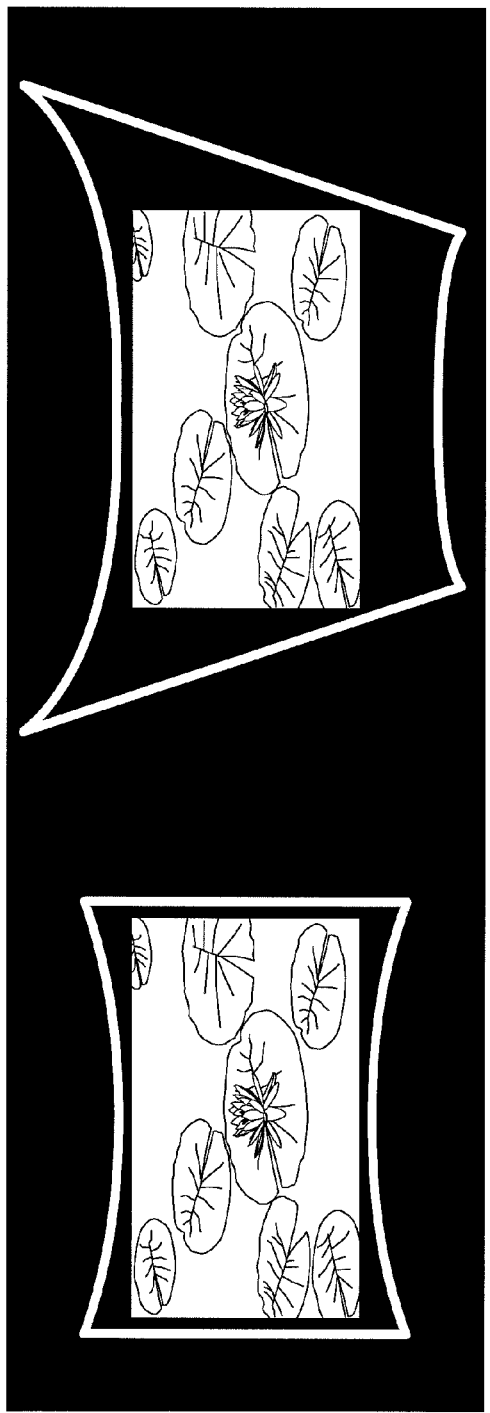
FIGS. 25A and 25B are schematic diagrams for describing distortion correction.

FIGS. 25A and 25E are for describing distortion correction according to an embodiment of the present invention. In this embodiment, the LPJ 200 uses a magnification lens in order to project an image to a large screen by using a small optical engine including, for example, a laser oscillator, an MEMS mirror, and a lens. The magnification lens is designed to reduce distortion of the projection image. The LPJ 200 is designed not only to reduce distortion in a case of front projection (i.e. projecting light from the front of a screen) but also in a case of oblique projection (i.e. projecting light from an oblique position with respect to a screen).

In a case where components and the like are provided to the LPJ 200 for both front projection, the distortion of the projection image may be large in a case of oblique projection if the magnification lens is designed for front projection and the distortion of the projection image may be large in a case of front projection if the magnification lens is designed for oblique projection.

The projection image on the left of FIG. 25A is an example of a distortion during front projection with lens distortion and the projection image on the right of FIG. 25A is an example of distortion during oblique projection with lens distortion. The frame line of FIG. 25A corresponds to the outer edge of the distorted image when actually scanned with a laser. The image inside the frame line illustrates a corrected image by performing distortion correction.

In the distortion correction, a distorted image is corrected to project an image equivalent to a projection image formed by front projection. The distortion correction is performed by shifting projection position by performing mapping using the distorted image and the projection image formed by front projection. Because access to the frame memory 58 is performed by free scan, the accessing order of the free scan is adjusted in accordance with the distortion correction.

Figure 25B:
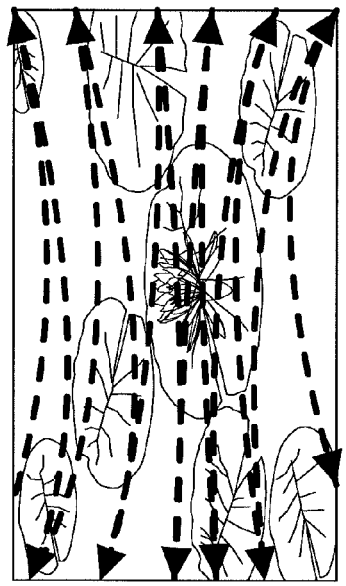

As illustrated with the arrows in FIG. 25B, the scanning direction of free scan may curve depending on the accessed position. However, as illustrated in FIG. 25B, even if there is lens distortion when performing free scan with the LPJ 200, a projection image equivalent to the projection image formed by front projection can be displayed.

Further, blank pixels may be formed due to the performing of distortion correction. With reference to FIGS. 25A and 25B, although the scanning range of the laser of the LPJ 200 corresponds to the frame line, the laser need only be radiated to the range of the projection image formed by front projection. This leads to the forming of blank pixels (pixels to which laser is not radiated) at areas between the projection image formed by front projection and the frame line. Because there is no need to read out data corresponding to the blank pixel from the frame memory 58, a process of reading out data from the frame memory 58 can be omitted for the LPJ.

[Configuration]

Figure 26:
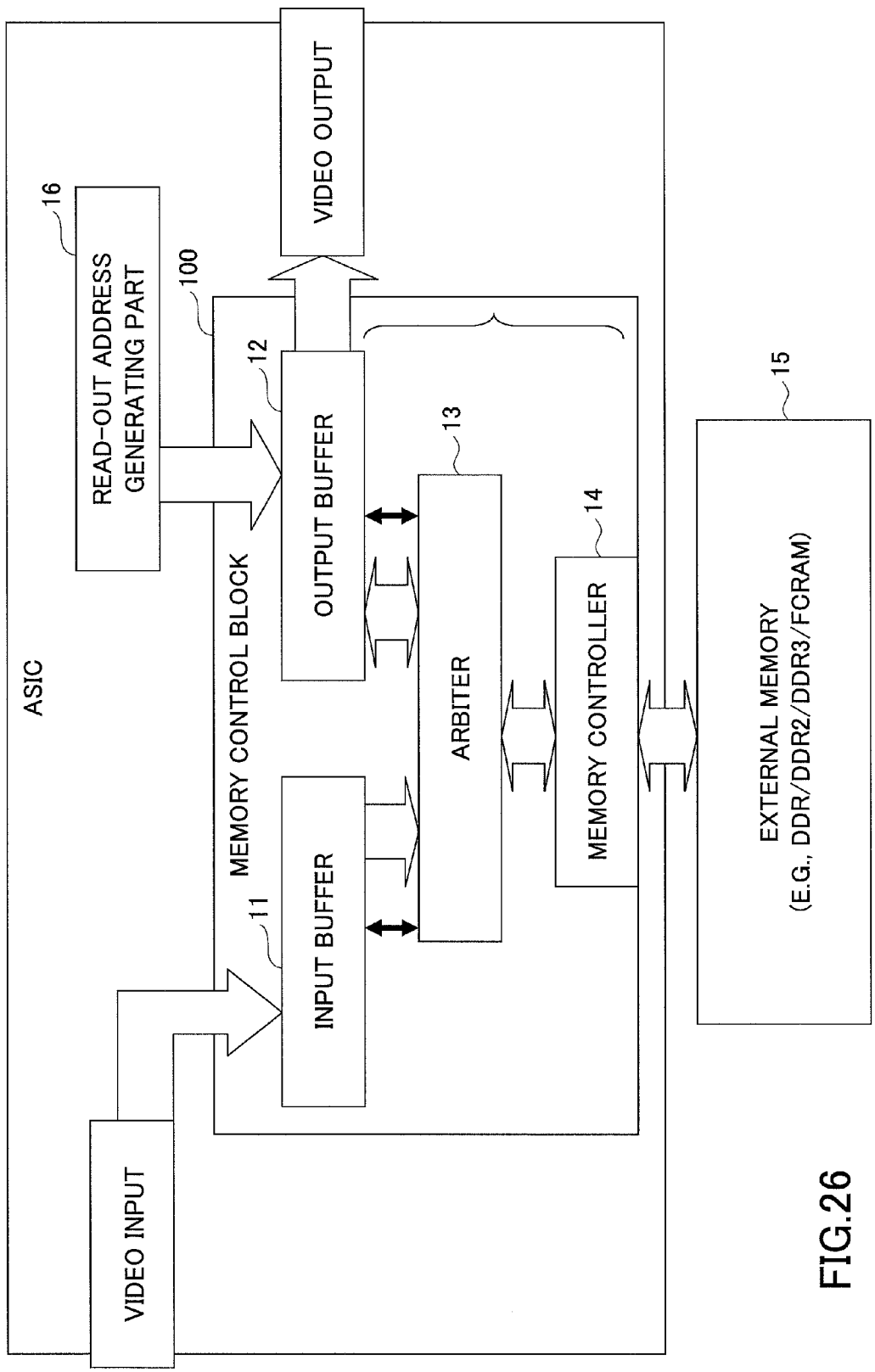
FIG. 26 is a block diagram illustrating an exemplary configuration of a memory control block according to an embodiment of the present invention.

FIG. 26 is a block diagram illustrating an exemplary configuration of the memory control block 100 according to an embodiment of the present invention. The memory control block 100 may be an IC (Integrated Circuit) such as ASIC (Application Specific Integrated Circuit). The memory control block 100 includes, for example, an input buffer 11, an arbiter 13, a memory controller 14, and an output buffer 12. In the following description, image data and various signals may be collectively referred to as data, input data (in a case of writing image data), or output data (in a case of reading out image data).

The input buffer 11 temporarily stores image data input from the video input. The arbiter 13 arbitrates (selects) between input requests from the input buffer 11 to the memory controller 14 for inputting image data and output requests from the output buffer 12 for outputting image data. The memory controller 14 outputs ACT, READ, PRE, and various addresses to the external memory (equivalent to the frame memory 58) 15, controls the external memory 15, and reads/writes data. The output buffer 12 temporarily stores data addresses input from an readout address generating part 16, requests image data to be read out to the arbiter 13, and temporarily stores image data to be output to the video output. The readout address generating part 16 serves as the above-described image output system circuit 48 required by, for example, the depiction position calculating part 57. It is to be noted that the term "data address" may hereinafter also be referred to as readout address.

As illustrated in, for example, FIG. 26, the flow of data is as follows.

Data input: The memory control block 100 stores image data input from the video input to the external memory 15.

Video input→input buffer 11→arbiter 13→memory controller 14→external memory 15

Data output: The memory control block 100 reads out image data from the external memory 15 in accordance with a readout address designated by the readout address generating part 16 and outputs the image data to the video output.

Readout address: readout address generating part 16→output buffer 12→arbiter 13→memory controller 14→external memory Image data: external memory 15→memory controller 14→arbiter 13→output buffer 12→video output In this embodiment, the memory control block 100 and components thereof include the following characteristics.

The input buffer 11 can store image data equivalent to approximately 1 to several lines. The input buffer 11 consecutively delivers writing data (image data to be written to the external memory 15) in accordance with instructions from the arbiter 13.

The arbiter 13 performs arbitration (selection) for enabling input data to be accessed as consecutively as possible.

In a case where readout of data is consecutively requested with respect to the same readout address, the output buffer 12 reads out the data from the external memory 15 only once (one time) and uses a copy of the data on or after the second time.

In a case where image data outside a depiction areas (i.e. blank) is requested, the output buffer 12 does not read out the image data from the external memory 15 and outputs a blank data (blank value) to the video output.

<Input Buffer>

Figure 27:
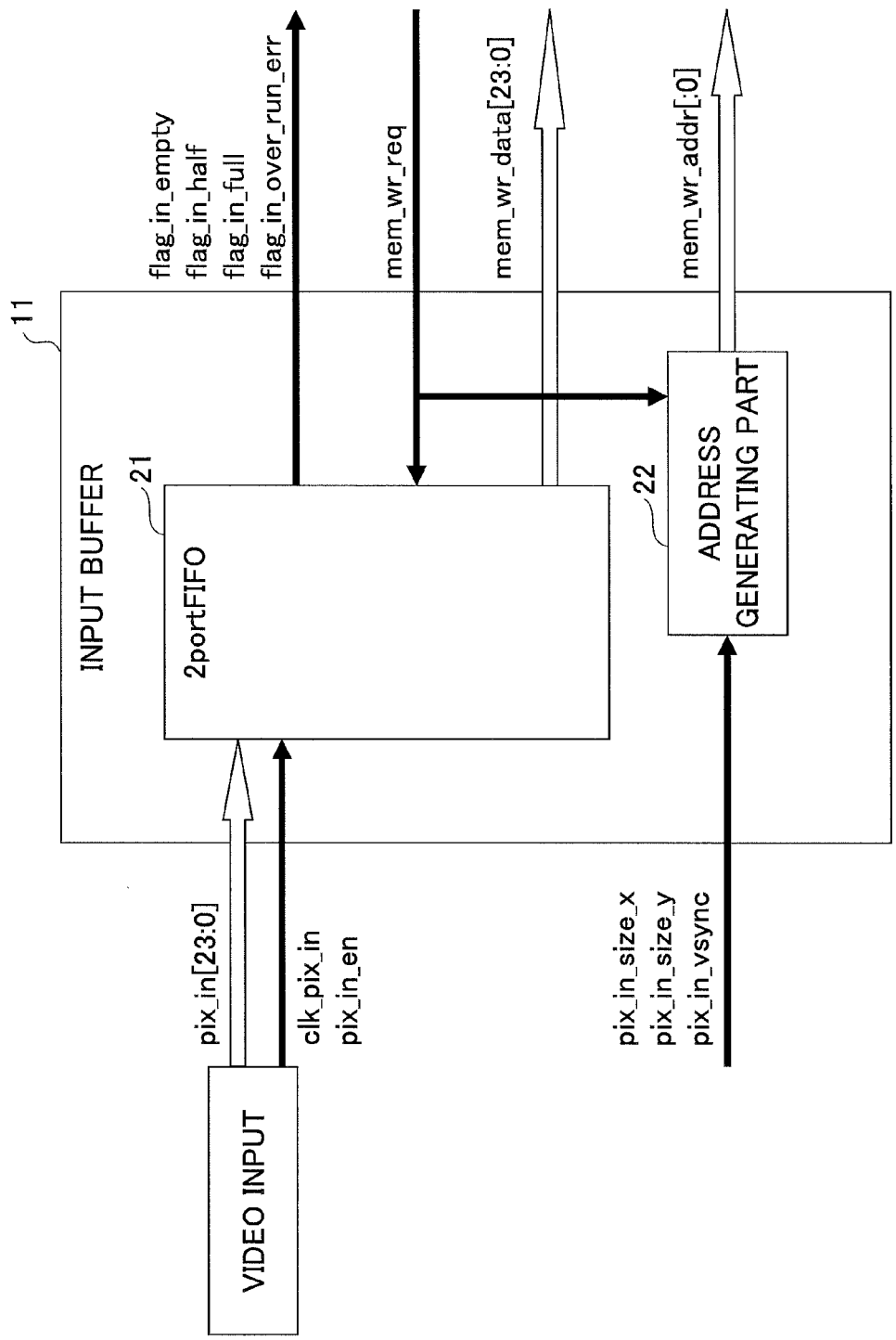
FIG. 27 is a block diagram illustrating an input buffer according to an embodiment of the present invention.
Figure 28:
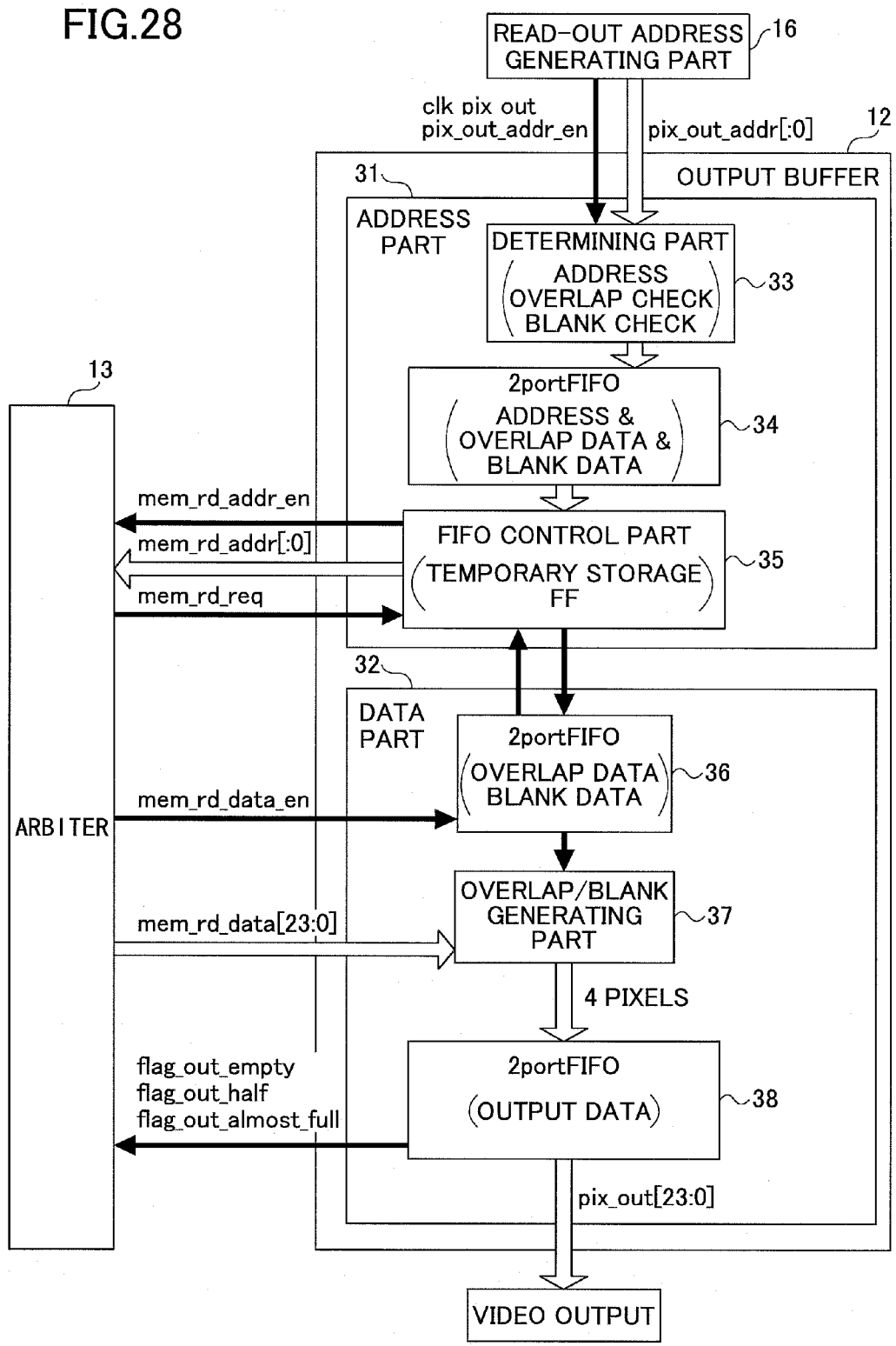
FIG. 28 is a block diagram illustrating an output buffer according to an embodiment of the present invention.
Figure 29:
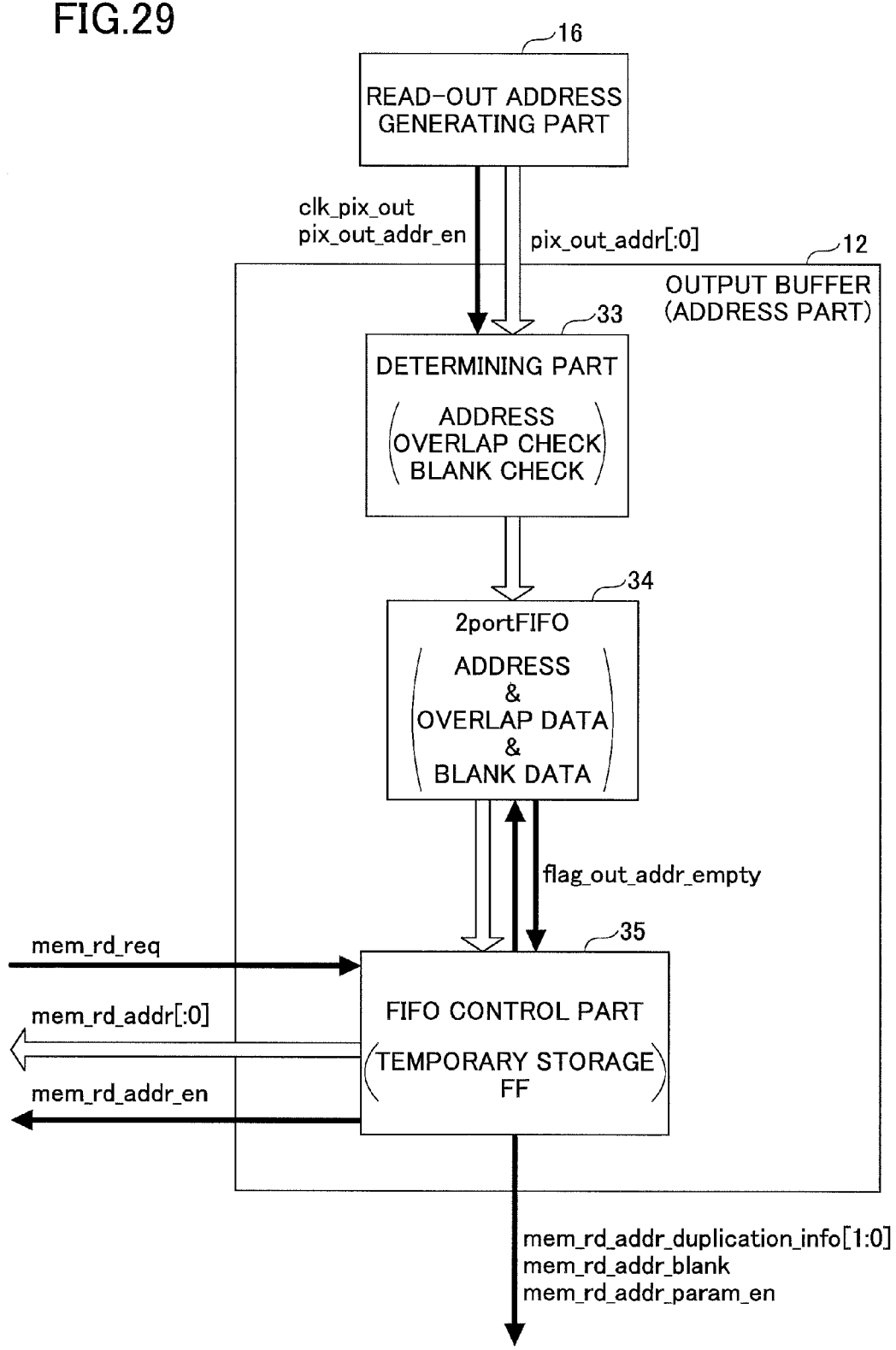
FIG. 29 is a block diagram illustrating an address part of an output buffer according to an embodiment of the present invention.

FIG. 27 is a block diagram illustrating an input buffer 11 according to an embodiment of the present invention. In FIGS. 27-29, the flow of signals is illustrated with a black arrow, and the flow of data is illustrated with a white arrow. The input buffer 11 temporarily stores the image data input from the video input into the 2portFIFO 21. Then, in response to a request from the arbiter 13, the input buffer 11 adds an address to the image data and sends the data to the arbiter 13.

If the "burst-right" to the external memory 15 assumed to be approximately ¼ line to ½ line in the x scan direction, it is considered that approximately 1 line in the x scan direction is the appropriate amount of data that can be stored in the 2PortFIFO 21.

The address generating part 22 generates a regular increasing address. The address generating part 22 is cleared to zero when pix_in_vsync (vertical synchronization of input image) is input to the address generating part 22.

The input buffer 11 delivers a flag_in_* indicative of the status of the 2portFIFO 21 to the arbiter 13. The signal flag_in_* is one of the signals flag_in_empty, flag_in_half, flag_in_full, or flag_in_over_run_err.

It is to be noted that the input buffer 11 may be a typical asynchronous absorption buffer for inputting of images. Thus, in this embodiment, no special structure is required for the input buffer 11.

The content of the signals are as follows.

pix_in [23:0]: input data
clk_pix_in: clock of 1 pixel of input data
pix_in_en: becomes "1" when requesting acceptance of input data
pix_in_size_x: size of input data with respect to x direction
pix_in_size_y: size of input data with respect to y direction
pix_in_vsync: vertical synchronization signal of input data
flag_in_empty: flag that becomes "1" when the 2PortFIFO is empty
flag_in_half: flag that becomes "1" when half or more of the 2PortFIFO is filled with data
flag_in_full: flag that becomes "1" when the 2PortFIFO is full (for example, 90% or more)
flag_in_over_run_err: flag that becomes "1" when input data overflows for being unable to timely read out from the 2PortFIFO
mem_wr_req: requesting writing to the 2PortFIFO
mem_wr_data [23:0]: image data to be written to arbiter by the 2PortFIFO
mem_wr_addr[:0]: address generated by address generating part 22

<Output Buffer>

FIG. 28 is a block diagram illustrating the output buffer 12 according to an embodiment of the present invention. The output buffer 12 performs requesting readout to the external memory 15, temporarily storing output image data, and outputting data to the video output. From the aspect of function, the output buffer 12 may be divided into an address part 31 and a data part 32.

The address part 31 includes, for example, a determining (checking) part 33, a 2PortFIFO 34, and a FIFO control part 35. The data part 32 includes, for example, a 2PortFIFO 36, an overlap/blank generating part 37, and a 2PortFIFO 38.

<<Address Part of Output Buffer>>

FIG. 29 is a block diagram illustrating the address part 31 of the output buffer 12 according to an embodiment of the present invention. The determining part 33 determines whether there are any overlaps (overlap checking) and whether there are any blanks (blank checking).

Overlap checking: In an overlap checking process, the determining part 33 determines whether there are any plural readout requests that are consecutively requested with respect to the same address. In this embodiment, the maximum number of consecutive requests determined by the determining part 33 is 4 consecutive requests. However, the maximum number of consecutive requests may be altered in view of, for example, implementation.

Blank checking: In a blank checking process, the determining part 33 determines whether there are any areas to which no pictures are depicted in a case where there is distortion correction by the LPJ 200. The readout address generating part 16 calculates the readout address (pix_out_addr) from the coordinates at which a picture is to be depicted. On the other hand, regarding the coordinates at which no picture is to be depicted, the readout address generating part 16 outputs a signal of "pix_out_addr_en=0" and reports the coordinates to the output buffer 12. The determining part 33 recognizes the signal of "pix_out_addr_en=0" and determines to depict a blank at a corresponding timing. Although the determining part 33 determines whether there are any overlaps of blank areas, the determining part 33 ignores the address.

Figure 30:
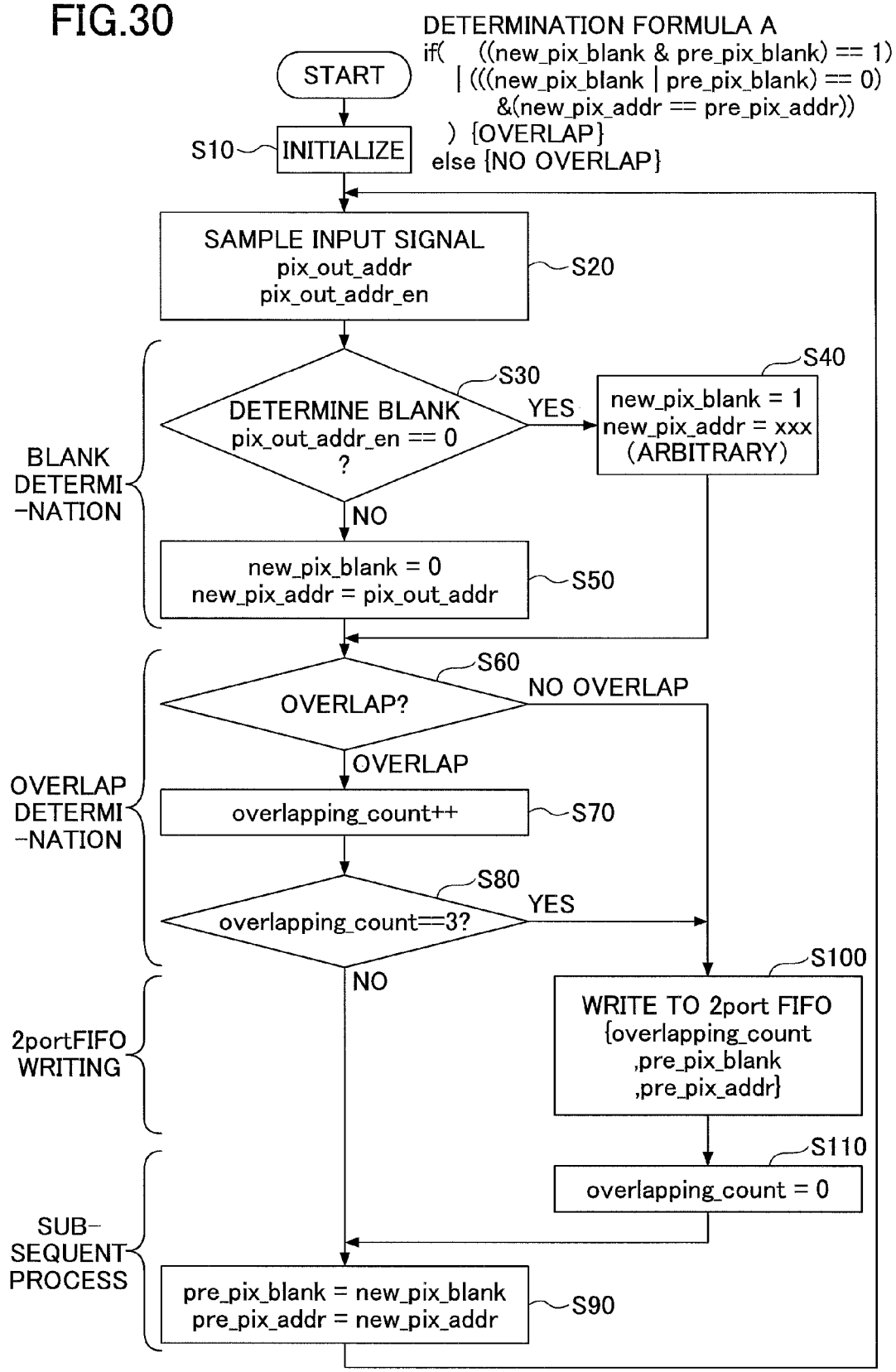
FIG. 30 is a flowchart illustrating an operation starting from inputting a readout address to an address part and writing corresponding data to a 2PortFIFO according to an embodiment of the present invention.

The content of the signals are as follows.

pix_out_addr[:0]: readout address generated by the readout generating part 16
clk_pix_out: clock when the readout generating part 16 requests readout
pix_out_addr_en: becomes "0" when the readout address is blank
flag_in_empty: flag that becomes "1" when data of the address of the readout target is not stored in the 2PortFIFO
mem_rd_addr_duplication_info [1:0]: number of overlaps is stored
mem_rd_addr_blank: becomes "1" when blank
mem_rd_addr_param_en: becomes "1" when address of readout target or the like is stored in the 2PortFIFO 34
mem_rd_req: becomes "1" when arbiter selects the output buffer
mem_rd_addr[:0]: address requested to be readout by the arbiter
mem_rd_addr_en: becomes "1" when readout is requested to arbiter FIG. 30 is a flowchart illustrating an operation starting from inputting a readout address to the address part 31 and writing corresponding data to the 2PortFIFO according to an embodiment of the present invention. The input from the readout address generating part 16 is performed every single clock cycle. The processes of input signal sampling, blank checking, writing data to the 2PortFIFO 34, and performing a subsequent process (post process) are conducted in 1 clock cycle.

The meaning of the variables used in the flowchart of FIG. 30 is as follows.

overlapping_count: variable into which the number of overlaps is stored pre_pix_addr: variable into which a previously input readout address is stored pre_pix_blank: variable into which "1" is stored when the previously input readout address is a blank new_pix_addr: variable into which a currently input readout address is stored new_pix_blank: variable into which "1" is stored when the currently input readout address is a blank First, the address part 31 initializes the variables as shown below (Step S10).

overlapping_count=0
pre_pix_addr=0
pre_pix_blank=0

Then, the address part 31 samples input signals (Step S20). In this embodiment, the address part 31 samples the signal of pix_out_addr and the signal of pix_out_addr_en every 1 clock.

The determining part 33 determines whether the signal of pix_out_addr_en=0 (Step S30). In a case of "pix_out_addr_en=0", the image data of the readout address is blank. Therefore, the determining part 33 sets "1" to the variable of new_pix_blank (Step S40). Further, the determining part 33 assigns an arbitrary address to the new_pix_blank. The reason that the determining part 33 assigns an "arbitrary" address is because the address part 31 does not access the external memory 15 when the image data is a blank.

In a case where pix_out_addr_en is not equal to 0, the image data of the readout address is not a blank. Therefore, the determining part 33 sets "0" to the variable of pre_pix_blank (Step S50). Further, the determining part 33 assigns the newly (currently) read out address to the new_pix_addr.

Then, the determining part 33 determines whether there is an overlap (Step S60). This determination can be expressed with the following expression.

if {((new_pix_blank & pre_pix_blank)==1) or ((new_pix_blank or pre_pix_blank==0) & (new_pix_addr==pre_pix_addr))}: overlap
else: no overlap In other words, if both the currently read out address and a previously (one time previous) read out address are blank or if either the currently read out address or the previously read out address is not a blank when the currently read out address or the previously read out address are the same, it is determined that the consecutively read out addresses overlap. Because addresses are ignored when both the image data of the currently read out address and the image data of the previously read out address are blank, large amounts of overlap can be detected.

In the flowchart of FIG. 30 where 2 addresses have been consecutively read out, it is to be noted that overlap is determined and whether to write data to the 2PortFIFO 34 is determined according to the determination results of the overlap.

In a case where the consecutively read out addresses overlap, the determining part 33 increments 1 to the variable of overlapping_count (Step S70). In a case where the consecutively read out addresses do not overlap, the determining part 33 does not write any data to the 2PortFIFO 34. Therefore, the FIFO control part 35 does not request read out to the arbiter 13.

However, even if the consecutively read out addresses overlap, the determining part 33 determines whether the variable of overlapping_count is 3 (Step S80). Until the variable of overlapping_count becomes 3, the determining part 33 copies the new_pix_blank to the pre_pix_blank and copies the new_pix_addr to the pre_pix_addr (Step S90).

In a case where the consecutively read out addresses do not overlap, the determining part 33 writes the variables of overlapping_count, the pre_pix_blank, and the pre_pix_addr to the 2PortFIFO 34 for reading out image data (Step S100). Among the two consecutively read out addresses, overlap data and blank data of the earlier read out address is written to the 2PortFIFO 34 because the variables are "pre_pix_blank" and "pre_pix_addr".

Then, the variable of overlapping_count is initialized (Step S110). In this case also, the determining part 33 copies the new_pix_blank to the pre_pix_blank and copies the new_pix_addr to the pre_pix_addr (Step S90).

The writing of data (e.g., data indicating the number of times of overlap, data indicating whether the previously read out address is blank, data indicating the previously read out address) to the 2PortFIFO 34 is not performed until after overlap of consecutively read out addresses is determined (detected) for 3 times. Therefore, access to the memory having the same address can be controlled. The upper limit of the number of times of overlap is not limited to 3 times. For example, the upper limit of the number of times of overlap may be 4 or more times.

Figure 31:
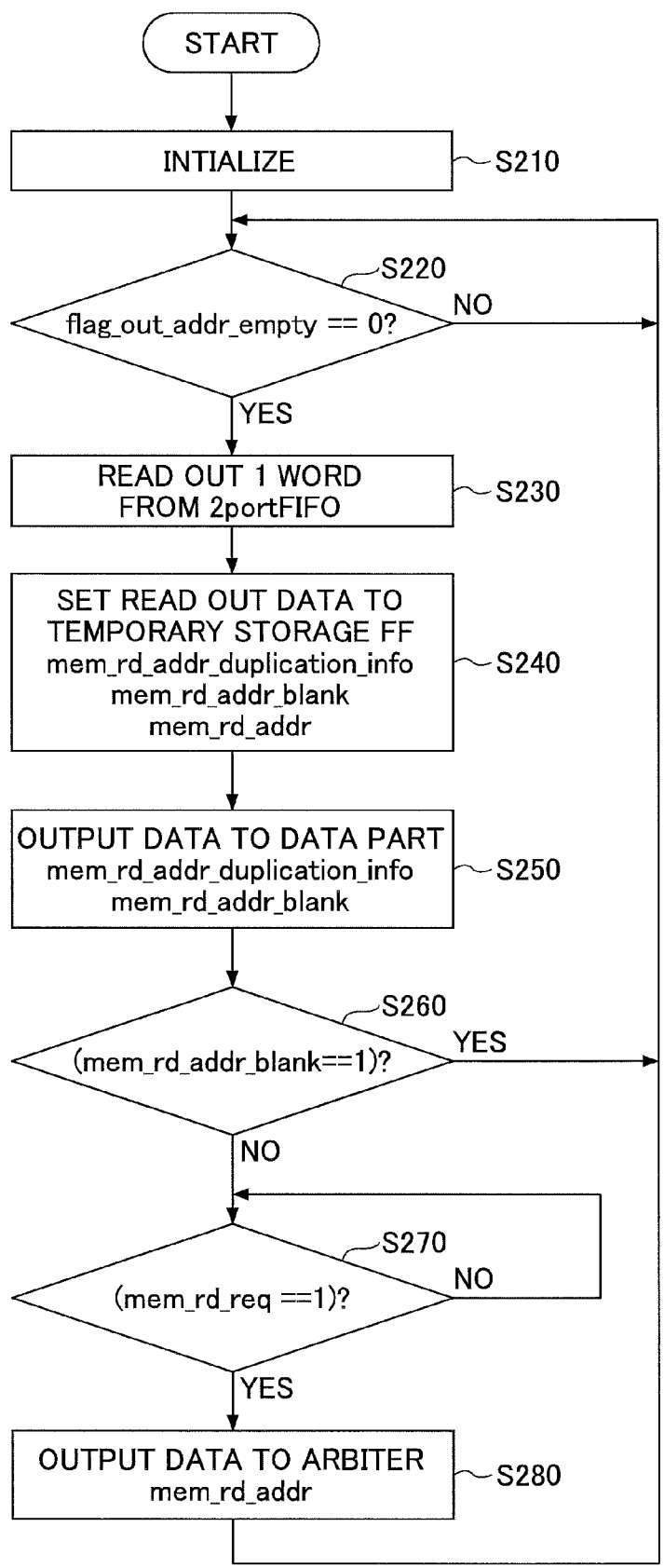
FIG. 31 is a flowchart for describing an operation that is performed until a FIFO control part delivers data stored in a 2PortFIFO to an arbiter or a data part according to an embodiment of the present invention.

FIG. 31 is a flowchart for describing an operation that is performed until the FIFO control part 35 delivers the data stored in the 2PortFIFO 34 to the arbiter 13 or the data part 32 according to an embodiment of the present invention.

First, the conditions for delivering address data from the FIFO control part 35 to the arbiter 13 are:
mem_rd_req=1 is output from the arbiter 13;
flag_out_addr_empty=0 (address of read out destination is stored) is output as the status of the 2PortFIFO 34 of the address part 31; and
mem_rd_addr_blank=0 is output from the FIFO control part 35 because the read out address stored in the 2PortFIFO 34 is not blank.

Further, the condition for delivering overlap data and blank data from the FIFO control part 35 to the data part 32 is:
flag_out_addr_empty=0 is output as the status of the 2PortFIFO 34.

First, the FIFO control part 35 initializes variables and the like that are to be used by the FIFO control part 35 itself (Step S210).

Then, the FIFO control part 35 determines whether flag_out_addr_empty=0 (Step S220).

Because "flag_out_addr_empty=0" indicates that the addresses and the like are stored in the 2PortFIFO 34, the FIFO control part 35 reads out 1 word from the 2PortFIFO 34 (Step S230). In this embodiment, "1 word" is a series of data that is stored as a single group (e.g., 32 bits).

Then, the FIFO control part 35 sets the read out data (1 word) to the temporary FF (Files Folder) (Step S240). That is, the FIFO control part 35 sets data of the overlapping_count to the mem_addr_duplication_info, data of the pre_pix_blank to the mem_rd_addr_blank, and data of the pre_pix_addr to the mem_rd_addr.

Then, the FIFO control part 35 delivers the set data to the data part 32. That is, the FIFO control part 35 outputs mem_addr_duplication_info and mem_rd_addr_blank to the data part 32 (Step S250). When the data is output to the data part 32, the mem_rd_addr_param_en is incremented to "1".

Then, the FIFO control part 35 determines whether mem_rd_addr_blank=1 (Step S260).

In the case where "mem_rd_addr_blank=1", the read out address is a blank. Therefore, the operation returns to Step S220.

In the case where mem_rd_addr_blank is not 1, the read out address is not a blank. Therefore, the FIFO control part 35 waits until mem_rd_req=1 (Step S270). Because "mem_rd_reg=1" indicates that the arbiter 13 can select the output buffer 12, the FIFO control part 35 outputs data to the arbiter 13 (Step S280). In other words, the FIFO control part 35 outputs mem_rd_addr to the arbiter 13. When mem_rd_addr is output to the arbiter 13, the mem_rd_addr_param_en is incremented to "1".

Accordingly, in the case of "mem_rd_addr_blank=1" in Step S260, no access is made to the external memory 15 because the read out address is determined as a blank. Therefore, unnecessary access can be controlled.

<<Data Part of Output Buffer>>

Next, the data part 32 of the output buffer 12 according to an embodiment of the present invention is described.

FIG. 32 is a block diagram illustrating an exemplary configuration of the data part 32 of the output buffer 12 according to an embodiment of the present invention. The data part 32 mainly includes the following 3 parts.

2PortFIFO 36: The 2PortFIFO 36 is for temporarily storing overlap data and blank data.

Overlap/blank generating part 37: The overlap/blank generating part 37 is for reproducing image data corresponding to overlapped read out addresses and image data corresponding to blank read out addresses.

2PortFIFO 38: The 2PortFIFO 38 is for temporarily storing output data.

Next, a process of temporarily storing overlap data and blank data and an operation performed by the 2PortFIFO 36 are described below.

On condition that "mem_rd_addr_param_en=1", the 2PortFIFO 36 continues to receive and store data from the address part 31.

The timing for delivering data to the overlap/blank generating part 37 is as follows.

When data to be delivered next is blank data (mem_rd_addr_blank=1), the 2PortFIFO 36 simply delivers the data to the overlap/blank generating part 37.

When data to be delivered next is not blank data (mem_rd_addr_blank=0), the 2PortFIFO 36 waits for image data to be input from the arbiter 13 (mem_rd_data_en=1) and delivers the data when the image data is input.

Figure 33A:
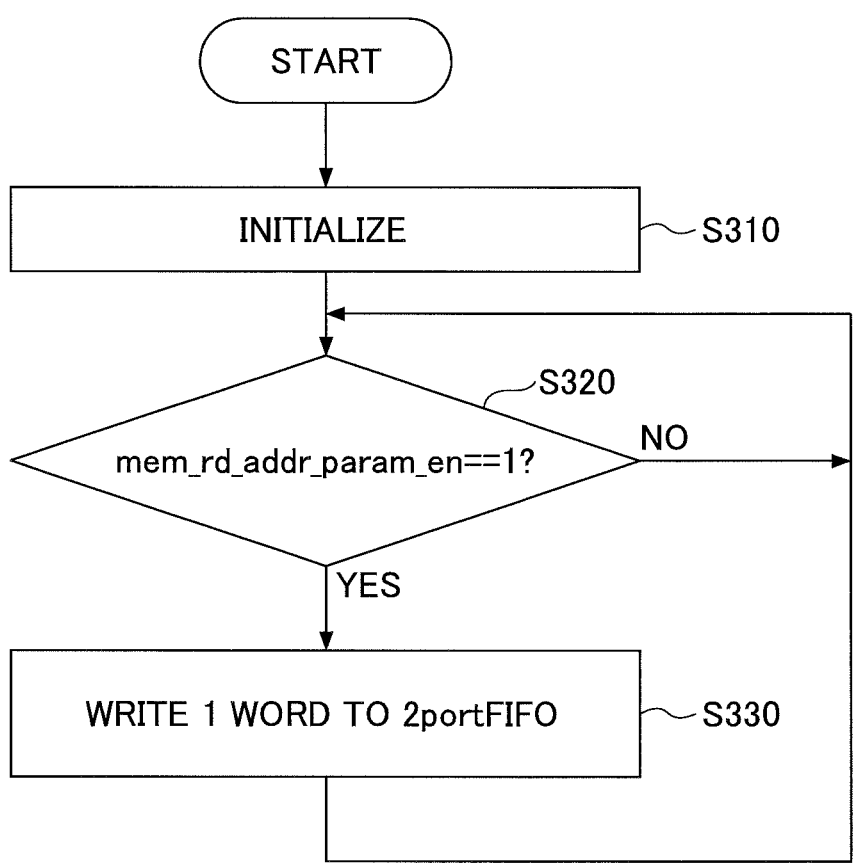
FIG. 33A illustrates an operation where overlap data/blank data are written by a FIFO control part according to an embodiment of the present invention.

FIGS. 33A and 34B are flowcharts illustrating operations for controlling with the data part 32 the writing and reading out of overlap data and blank data with the data part 32 according to an embodiment of the present invention.

FIG. 33A illustrates an operation where overlap data/blank data are written by the FIFO control part 35 according to an embodiment of the present invention. First, the data part 32 initializes the 2PortFIFO 36 (Step S310). Then, the data part 32 determines whether mem_rd_addr_param_en=1 (Step S320).

Because the address part 31 has data of addresses and the like stored therein in a case of mem_rd_addr_param_en=1, the 2PortFIFO 36 accepts mem_rd_addr_duplication_info (data indicating number of overlaps) and mem_rd_addr_blank (blank data) to be written thereto from the address part 31 (Step S330).

On the other hand, because the address part 31 has no data of addresses and the like stored therein in a case where mem_rd_addr_param_en is not 1, the 2PortFIFO 36 waits.

Figure 33B:
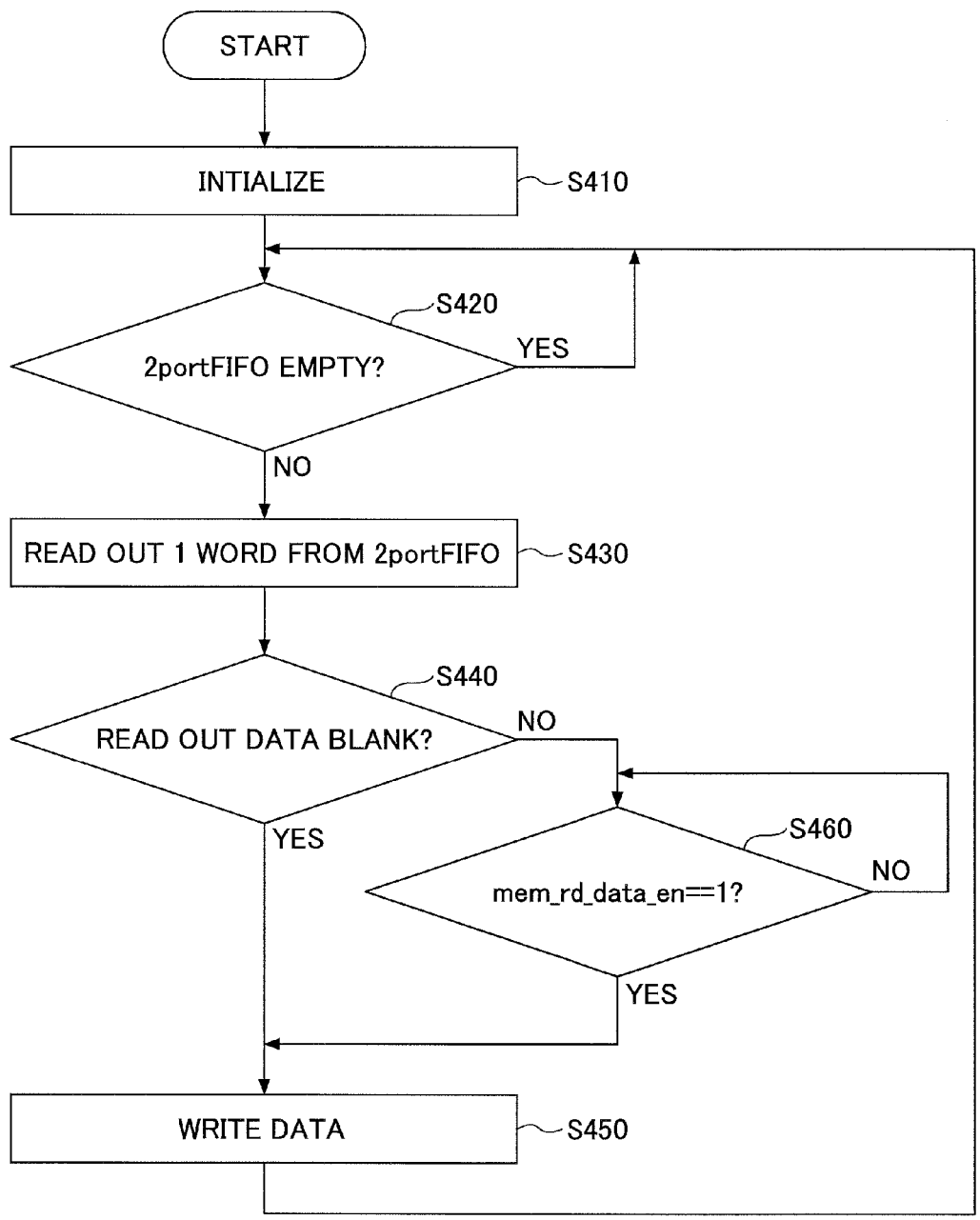
FIG. 33B illustrates an operation where an overlap/blank generating part loads data from a 2PortFIFO 36 according to an embodiment of the present invention.

FIG. 33B illustrates an operation where the overlap/blank generating part 37 loads data from the 2PortFIFO 36.

First, the overlap/blank generating part 37 initializes itself according to necessity.

Then, the overlap/blank generating part 37 determines whether the 2PortFIFO 36 is empty (Step S420). In a case where the 2PortFIFO 36 is empty, the overlap/blank generating part 37 waits because there is no need to read out data (Yes in Step S420).

In a case where the 2PortFIFO 36 is not empty (No in Step S420), the overlap/blank generating part 37 reads out 1 word (e.g., overlap data, blank data) from the 2PortFIFO 36 (Step S430).

Then, the 2PortFIFO 36 determines whether the image data to be read out is a blank based on the mem_rd_addr_blank (blank data) (Step S440).

In a case where the image data to be read out is a blank (Yes in Step S440), there is no need to read out image data from the external memory 15 because the address of the image data to be read out is not delivered to the arbiter 13. Accordingly, overlap data and blank data are written to the overlap/blank reproducing part 37 (Step S450).

In a case where the image data to be read out is not a blank (No in S440), the 2PortFIFO 36 determines whether mem_rd_data_en==1 (Step S460). Because "mem_rd_data_en==1" indicates that image data is stored in the arbiter 13, the overlap/blank reproducing part 37 receives image data in accordance with from the arbiter 13 and writes the received image data to the 2PortFIFO 38 (Step S450).

Accordingly, the overlap/blank image data reproducing part 37 can obtain image data from the arbiter 13 only when the image data to be read out is not a blank.

[Reproduction of Overlap/Blank in Output Buffer]

Figure 34:
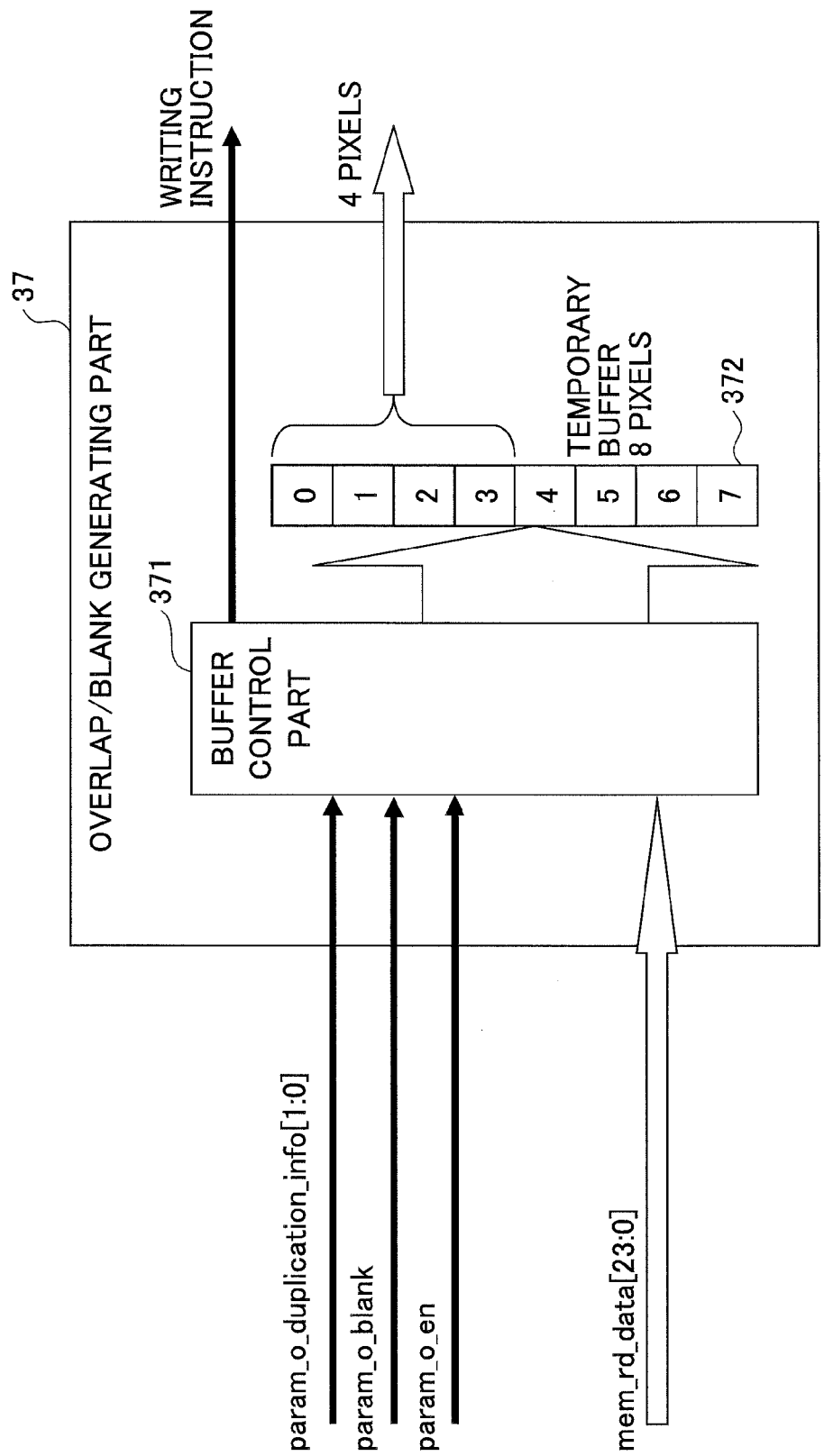
FIG. 34 is a block diagram illustrating an exemplary configuration of an overlap/blank reproducing part according to an embodiment of the present invention.

FIG. 34 is a block diagram illustrating an exemplary configuration of the overlap/blank reproducing part 37 according to an embodiment of the present invention. The overlap/blank reproducing part 37 includes, for example, a buffer control part 371 and a temporary buffer 372. The buffer control part 371 is for reproducing blank image data or overlapped image data.

As described above, the overlap/blank reproducing part 37 receives overlap data and blank data from a preceding 2PortFIFO 36.

The overlap/blank reproducing part 37 obtains mem_rd_data from the arbiter 13 only when mem_rd_data_en=1.

The overlap/blank reproducing part 37 reproduces a maximum of 4 pixels in accordance with overlap data.

The image data reproduced by the overlap/blank reproducing part 37 is written to the 2Port FIFO 38 toward the output side of the output buffer 32.

In FIG. 34, the overlap/blank reproducing part 37 sets mem_rd_duplication_info (overlap data) to param_0_duplication_info, mem_rd_addr_blank (blank data) to param_0_blank, and mem_rd_addr_param_en to param_0_en, respectively.

Figure 35:
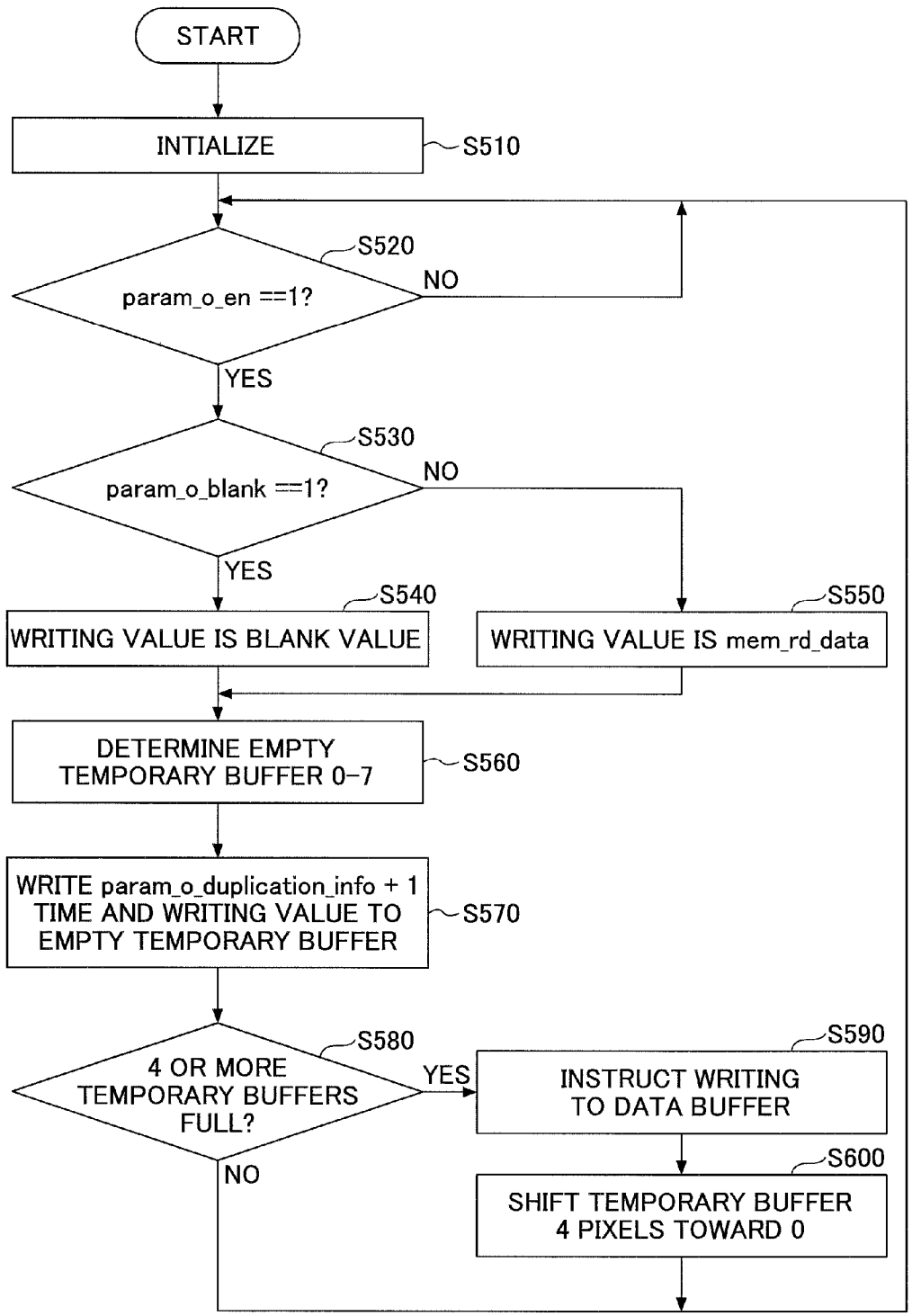
FIG. 35 is a flowchart illustrating an operation of reproducing overlap/blank data with an overlap/blank reproducing part according to an embodiment of the present invention.

FIG. 35 is a flowchart illustrating an operation of reproducing overlap/blank data with the overlap/blank reproducing part 37 according to an embodiment of the present invention.

First, the overlap/blank reproducing part 37 initializes the temporary buffer 372 according to necessity (Step S510).

The overlap/blank reproducing part 37 determines whether param_0_en==1 (Step S520). In a case where param_0_en is not 1 (No in Step S520), the 2PortFIFO 36 has no data stored therein. Therefore, the overlap/blank reproducing part 37 waits.

In a case where param_0_en==1 (Yes in Step S520), data is stored in the 2PortFIFO 36. Accordingly, the overlap/blank reproducing part 37 determines whether param_0_blank=1 (Step S530).

In a case where param_0_blank==1 (Yes in Step S530), the value to be written (writing value) to the 2PortFIFO 38 is a blank value. The blank value is, for example, image data in which luminance of an image becomes zero. In a case of RGB, the blank value is, for example, image data in which the RGB value is (0,0,0) (i.e. black).

In a case where param_0_blank is not 1 (No in Step S530), the value to be written (writing value) to the 2PortFIFO 38 is mem_rd_data (image data) obtained from the arbiter 13 (Step S550).

Then, the overlap/blank reproducing part 37 determines whether any of the temporary buffers 0-7 are empty (S560). The temporary buffers 0-7 have data registered therein for indicating whether the temporary buffers 0-7 are empty. For example, the temporary buffers 0-7 may have flags corresponding to every single pixel that are switched on and off depending on whether data is output to the 2PortFIFO 38.

The overlap/blank reproducing part 37 writes param_0_duplication_info+1 time together with a writing value (Step S570). That is, the overlap/blank reproducing part 37 writes data indicative of (number of times of overlaps+1 time), blank data, or mem_rd_data.

In the determination of Step S60 in FIG. 30, the number of times of overlaps is 1 time when 2 consecutively read out addresses overlap with each other, the number of times of overlaps is 2 times when 3 consecutively read out addresses overlap with each other, and the number of times of overlaps is 3 times when 4 consecutively read out addresses overlap with each other. Accordingly, in Step S570 of FIG. 35, the buffer control part 371 writes the number of times of overlaps+1 time, the blank value, or the mem_rd_data to the 2PortFIFO 38.

It is to be noted that, when the next consecutively read out address is determined not to overlap in a case the number of times of overlaps is 1 or 2 times, the address to be written to the 2PortFIFO 34 is the address preceding the address determined not to overlap. Therefore, there is no need to consider the image data corresponding to the address determined not to overlap. Accordingly, the timing in which the image data corresponding to the address determined not to overlap could be written to the 2PortFIFO 34 is, at soonest, the next clock cycle.

Accordingly, the buffer control part 371 copies data indicating the number of times of overlaps+1 time, the blank value, or the mem_rd_data to the temporary buffers 0-7.

Then, the buffer control part 371 determines whether the number of temporary buffers 0-7 that are full is 4 or more (Step S580). This determination is performed in order to write image data when image data are accumulated in the temporary buffers to some extent.

In a case where the number of temporary buffers 0-7 that are full is 4 or more (Yes in Step S580), image data is written to the succeeding 2PortFIFO 38 (Step 590).

Then, the buffer control part 371 shifts the temporary buffers equivalent to 4 pixels toward the address 0 (Step S600). For example, when image data equivalent to 2 or more pixels are copied in a case where image data equivalent to 3 pixels are stored in the temporary buffers 0-7, image data equivalent to more than 4 pixels are to be stored in the temporary buffers 0-7. Accordingly, after image data equivalent to 4 pixels are written to the 2PortFIFO 38, image data that were not written to the succeeding 2PortFIFO 38 and remain in the temporary buffers 0-7 are shifted towards an address having a lower number. Because there are 8 temporary buffers 0-7, there will be always one remaining temporary buffer when image data equivalent to 4 pixels are copied in a state where image data equivalent to 3 pixels are stored in the temporary buffers 0-7.

[2PortFIFO Toward Output Side]

In this embodiment, the operation of the 2PortFIFO 38 toward the output side of the output buffer 32 is substantially the same as a typical 2PortFIFO.

The data length of the input port of the 2PortFIFO 38 and the data length of the output port of the 2PortFIFO 38 are different.

The input port of the 2PortFIFO 38 receives image data equivalent to 4 pixels (24 bits×4 pixels) from the overlap/blank reproducing part 37.

The output port of the 2PortFIFO 38 outputs image data equivalent to 1 pixel (24 bits) to the video output.

The 2PortFIFO 38 includes status flags for indicating the amount of data remaining in the 2PortFIFO 38. For example, flag_out_empty indicates that the amount of data remaining in the 2PortFIFO 38 is none, flag_out_half indicates that the amount of data remaining in the 2PortFIFO 38 is half or more, and flag_out_almost_full indicates that the amount of data remaining in the 2PortFIFO 38 is almost full (see FIG. 36). In this embodiment, "almost full" corresponds to approximately 90% of the capacity of the 2PortFIFO 38. This is in view of the necessity to handle read out addresses that are already delivered to the arbiter 13. The status flags are output to the arbiter 13.

[Arbiter]

Figure 36:
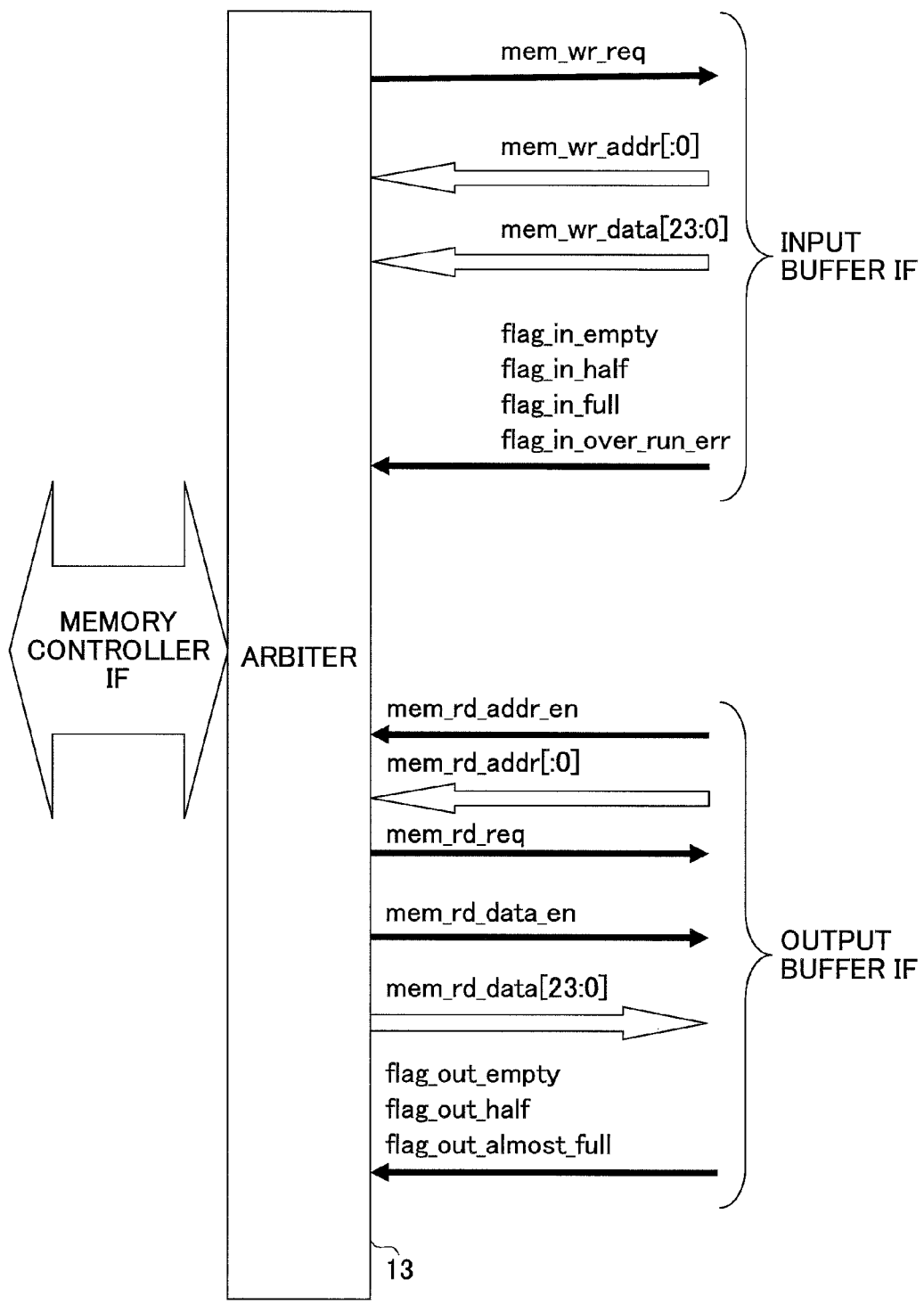
FIG. 36 is a schematic diagram illustrating signals that are input to and output from an arbiter according to an embodiment of the present invention.

FIG. 36 is a schematic diagram illustrating signals that are input to and output from the arbiter 13 according to an embodiment of the present invention. The arbiter 13 determines whether to accept requests from the input buffer IF (interface) or the output buffer IF based on the status indicated by the status flags input from the input and output buffer interfaces.

The arbitration policy of the arbiter 13 according to an embodiment of the present invention is as follows.

Input Side (Input Buffer 11)

(A-1) The 2PortFIFO 21 is not to become full.

(A-2) The data stored in the 2PortFIFO 21 is to be maintained at half or less of the storage capacity of the 2PortFIFO 21 as much as possible.

(A-3) No access is required if the 2PortFIFO 21 is empty. If access is to be made, the access is to be performed consecutively as much as possible.

Output Side (Output Buffer 12)

(B-1) The 2PortFIFO 38 is not to become full.

(B-2) The data stored in the 2PortFIFO 38 is to be maintained at half or less of the storage capacity of the 2PortFIFO 38 as much as possible.

(B-3) No access is required if the 2PortFIFO 21 is empty.

FIG. 37 illustrates an example of an arbitration table generated according to the above-described arbitration policy. Regarding the combination of status flags in FIG. 37, a combination of two flags (if there are two flags) represents "1".

In a case where the arbiter 13 selects the input side, "1" is set to the mem_wr_req. In a case where the arbiter 13 selects the output side, "1" is set to the mem_rd_req.

No. 1: Because Flag_in_empty is "1", there is no need to access the input side. Because the Flag_out_empty is "1", the output side is prioritized in view of item (B-1) of the arbitration policy.

No. 2: Because Flag_in_empty is "1", there is no need to access the input side in view of item (A-3) of the arbitration policy. Although there is no flag of the output side, the output side is prioritized.

No. 3: Because Flag_in_empty is "1", there is no need to access the input side. Although Flag_out_half is "1", the output side is prioritized for accumulating more image data.

No. 4: Because Flag_in_empty is "1" there is no need to access the input side. Because Flag_out_almost_full is "1", there is no need to access the output side. However, the output side is prioritized and selected.

No. 5: Although there is no flag of the input side, the output side is prioritized because Flag_out_empty is "1" in view of item (B-1) of the arbitration policy.

No. 6: Because there are no flags for both input and output sides, the output side is prioritized and selected in view of item (B-2) of the arbitration policy.

No. 7: Although there is no flag of the input side, the output side is prioritized for accumulating more image data because Flag_out_half is "1" in view of the items (A-2) and (B-2) of the arbitration policy.

No. 8: Although there is no flag of the input side, the input side is prioritized because Flag_out_almost_full is "1" in view of the item (B-3) of the arbitration policy. The input buffer 11 is maintained as the buffer to be selected until Flag_in_empty is output. Thereby, data can be transferred until the input buffer 11 becomes empty.

No. 9: Because Flag_in_half is "1", the image data of the input side is half or more of the storage capacity of the input buffer 11. Because the Flag_out_empty is "1", the output side is prioritized in view of the item (B-1) of the arbitration policy. The output buffer 12 is maintained as the buffer to be selected until Flag_out_half or Flag_out_addr_empty is output. Thereby, data can be transferred until accumulated data becomes half or more of the storage capacity of the output buffer 12.

No. 10: Because Flag_in_half is "1", the image data of the input side is half or more of the storage capacity of the input buffer 11. Because there is no flag of the output side (half or less output data), the output side is prioritized in view of the item (B-2) of the arbitration policy. The output buffer 12 is maintained as the buffer to be selected until Flag_out_half or Flag_out_addr_empty is output. Thereby, data can be transferred until accumulated data becomes half or more of the storage capacity of the output buffer 12.

No. 11: Because Flag_in_half is "1", the image data of the input side is half or more of the storage capacity of the input buffer 11. Because Flag_out_half is "1", the image data of the output side is half or more of the storage capacity of the output buffer 12. Thus, the input side is prioritized in view of the item (A-2) of the arbitration policy. The input buffer 11 is maintained as the buffer to be selected until Flag_in_empty is output. Thereby, data can be transferred until the input buffer 11 becomes empty.

No. 12: Because Flag_in_half is "1", the image data of the input side is half or more of the storage capacity of the input buffer 11. Because Flag_out_almost_full is "1", no image data is required for the output side. Thus, the input side is prioritized in view of the item (A-2) of the arbitration policy. The input buffer 11 is maintained as the buffer to be selected until Flag_in_empty is output. Thereby, data can be transferred until the input buffer 11 becomes empty.

No. 13: Because of Flag_in_full and Flag_out_empty, both input and output sides become an error. However, the output buffer 12 is selected in order to fill the output buffer 12 first.

No. 14: Because of Flag_in_full, the input side becomes an error. Thereby, the input side is selected.

No. 15: Because of Flag_in_full, the input side becomes an error. Therefore, even in a case of Flag_out_half, the input side is selected.

No. 16: Because of Flag_in_full, the input side becomes an error whereas the output side is Flag_out_almost_full. Thus, because no image data is required for the output side, the input side is selected.

Accordingly, the arbiter 13 makes it easier for data to be consecutively transferred by selecting between the input side and the output side. For example, in a case of Nos. 9 and 10 of the arbitration table of FIG. 37, data can transferred until data accumulated in the output side becomes half or more of the storage capacity of the output buffer 12. In a case of Nos. 8, 11, and 12 of the arbitration table of FIG. 37, data can be transferred until the input buffer 11 becomes empty. Therefore, consecutive transfer of solely data to be read out or consecutive transfer of solely data to be written can be achieved.

Hence, according to the above-described embodiments of the present invention, the LPJ 200 can prevent data having the same address from being consecutively read out and prevent data of unnecessary blank areas (areas where no pictures are depicted) from being read out. Accordingly, the LPJ 200 can read out image data at high speed. Further, because the arbiter 13 of the LPJ 200 can arbitrate between a process of writing image data to the input buffer 11 and reading image data out from the output buffer 12, consecutive access can be easily achieved.

The present invention is not limited to the specifically disclosed embodiments, and variations and modifications may be made without departing from the scope of the present invention.

The present application is based on Japanese Priority Application Nos. 2010-259459 and 2011-063216 filed on Nov. 19, 2010 and Mar. 22, 2011, respectively, the entire contents of which are hereby incorporated herein by reference.

What is claimed is:

1. An image projection apparatus comprising:
an IC (integrated circuit);
an image input system circuit configured to input image data;
a frame memory configured to store the image data;
a laser oscillator configured to radiate a laser to a screen;
a deflection part including a reflective optical element and an angle detector for detecting first and second oscillation angles of the reflective optical element and configured to oscillate the reflective optical element with respect to two perpendicularly intersecting axes;
a storage part configured to store coefficient data of a polynomial expression including a first group of coefficients obtained from the polynomial expression;
an irradiation position calculating part configured to obtain, by way of the IC, a second group of coefficients based on the first group of coefficients stored in the storage part and the first and second oscillation angles detected by the angle detector, and calculate, by way of the IC, an irradiation position by using the second group of coefficients;
an address calculating part configured to calculate, by way of the IC, an address in the frame memory corresponding to the irradiation position;
a memory control part configured to read out pixel data of the address, wherein the memory control part includes:

an input buffer configured to temporarily store the image data and write the image data to the frame memory;

an address generating part configured to generate, by way of the IC, a readout address;

a determining part configured to determine, by way of the IC, whether there are consecutive requests to read out the image data from the same address in the frame memory, determine, by way of the IC, whether there is a request to read the image data corresponding to a blank address by referring to the address generating part, and determining, by way of the IC, whether the reading of the blank address is ignore by depict a blank at a corresponding timing;

a readout instructing part configured to instruct, by way of the IC, the frame memory to output the image data in a case where the determining part determines that there are no consecutive requests to read out the image data and no request to read the image data corresponding to the blank address, wherein no laser is radiated to a position corresponding to the blank image data;

a data obtaining part configured to obtain the image data from the frame memory;

a data reproducing part configured to reproduce the image data consecutively requested to be read out and blank image data corresponding to the blank address;

an output buffer configured to temporarily store the image data obtained by the data obtaining part and the image data reproduced by the data reproducing part;

an arbitrating part configured to arbitrate, by way of the IC, a writing request from the input buffer and a readout request from the output buffer by obtaining flags from the input and the output buffers for writing the image data consecutively to the frame memory and reading out the image data from the frame memory; and wherein the arbitrating part is configured to arbitrate, by way of the IC, the writing request and the readout request for consecutively writing the image data until a half or more of a storage capacity of the output buffer is filled and for consecutively reading out the image data until the input buffer becomes empty; and a laser drive part configured to oscillate the laser oscillator in accordance with a luminance corresponding to the pixel data.

2. The image projection apparatus as claimed in claim 1, further comprising a determination table;

wherein the address calculating part is configured to determine, by way of the IC, whether the irradiation position is within at least one of a rectangle maintaining an aspect ratio of the image data or a predetermined rectangle by referring to the determination table;

wherein the address calculating part is configured to output, by way of the IC, blank data corresponding to a pixel having a luminance of a black level in a case where the address calculating part determines that the irradiation position is not within the rectangle maintaining the aspect ratio of the image data or the predetermined rectangle.

3. The image projection apparatus as claimed in claim 2, wherein the address calculating part is configured to calculate, by way of the IC, the address in the frame memory corresponding to the irradiation position in a case where the address calculating part determines that the irradiation position is within the rectangle maintaining the aspect ratio of the image data or the predetermined rectangle.

4. The image projection apparatus as claimed in claim 2, further comprising a conversion table including coordinate positions inside the rectangle maintaining the aspect ratio of the image data or the predetermined rectangle;

wherein the address calculating part is configured to convert, by way of the IC, the irradiation position to one of the coordinate positions and calculate the address in the frame memory based on the converted irradiation position in a case where the address calculating part determines that the irradiation position is within the rectangle maintaining the aspect ratio of the image data or the predetermined rectangle.

5. The image projection apparatus as claimed in claim 1, wherein the reflective optical element is configured to oscillate in a first direction and a second direction that perpendicularly intersects with the first direction;

wherein the polynomial expression includes a first polynomial expression that approximates the irradiation position when scanning the reflective optical element in the second direction in a case where the first oscillation angle in the first direction is fixed and a second polynomial expression that approximates the irradiation position when scanning the reflective optical element in the first direction in a case where the second oscillation angle in the second direction is fixed.

6. The image projection apparatus as claimed in claim 5, wherein the first polynomial expression is a primary polynomial expression with respect to a vertical angle and the second polynomial expression is a secondary polynomial expression with respect to a horizontal direction.

7. The image projection apparatus as claimed in claim 6, wherein the irradiation position calculating part is configured to calculate, by way of the IC, the second group of coefficients with respect to a vertical angle by applying the coefficient data with respect to a secondary approximation expression with respect to the vertical angle;

wherein the irradiation position calculating part is configured to calculate, by way of the IC, the second group of coefficients with respect to a horizontal angle by applying the coefficient data with respect to another secondary approximation expression with respect to the horizontal angle.

8. The image projection apparatus as claimed in claim 1, wherein the determining part is configured to count, by way of the IC, the number of times of the consecutive requests and report the number of times to the data reproducing part;

wherein the data reproducing part is configured to duplicate, by way of the IC, the image data consecutively requested to be read out in accordance with the number of times until the determining part determines, by way of the IC, that there are no consecutive requests to read out the image data.

9. The image projection apparatus as claimed in claim 8, wherein the readout instructing part is configured to instruct, by way of the IC, the frame memory to output the image data in a case where the number of times of the consecutive requests is equal to or greater than a predetermined number of times.

10. The image projection apparatus as claimed in claim 1, wherein the determining part is configured to count, by way of the IC, the number of times of the request to read the image data corresponding to the blank address and report the number of times to the data reproducing part;

wherein the data reproducing part is configured to duplicate, by way of the IC, the blank image data corresponding to the blank address in accordance with the number of times.

11. The image projection apparatus as claimed in claim 1, wherein the determining part is configured to determine, by way of the IC, that there are consecutive requests to read out the image data from the same address in the frame memory when an address prior to a current address generated by the address generating part is the blank address or when at least one of the current address or the address prior to the current address is not the blank address.

12. The image projection apparatus as claimed in claim 1, further comprising:
a laser projector including:
the frame memory further configured to write and readout image data faster in a case of consecutive access compared to non-consecutive access; and
an optical engine including the laser oscillator, a resonance type MEMS (Micro-Electro-Mechanical-System) mirror.

13. An image projection method comprising the steps of:
a) inputting image data;
b) storing the image data;
c) radiating a laser to a screen;
d) oscillating a reflective optical element with respect to two perpendicularly intersecting axes;
e) detecting first and second oscillation angles of the reflective optical element;
f) storing coefficient data of a polynomial expression including a first group of coefficients obtained from the polynomial expression;
g) obtaining a second group of coefficients based on the first group of coefficients stored in step f) and the first and second oscillation angles detected in step e);
h) calculating an irradiation position by using the second group of coefficients;
i) calculating an address in a frame memory corresponding to the irradiation position;
j) reading out pixel data of the address, comprising steps of:
1) temporarily storing the image data and writing the image data to the frame memory;
2) generating a readout address;
3) determining whether there are consecutive requests to read out the image data from the same address in the frame memory, determining whether there is a request to read the image data corresponding to a blank address, and determining whether the reading of the blank address is ignore by depict a blank at a corresponding timing;
4) instructing the frame memory to output the image data in a case where it is determined that there are no consecutive requests to read out the image data and no request to read the image data corresponding to the blank address, wherein no laser is radiated to a position corresponding to the blank image data;
5) obtaining the image data from the frame memory;
6) reproducing the image data consecutively requested to be read out and blank image data corresponding to the blank address;
7) temporarily storing the image data obtained and the image data reproduced;
8) arbitrating a writing request from the input buffer and a readout request from the output buffer by obtaining flags from the input and the output buffers for writing the image data consecutively to the frame memory and reading out the image data from the frame memory; and
9) arbitrating the writing request and the readout request for consecutively writing the image data until a half or more of a storage capacity of the output buffer is filled and for consecutively reading out the image data until the input buffer becomes empty; and
k) oscillating a laser oscillator in accordance with a luminance corresponding to the pixel data.

14. An image projection apparatus comprising:
an IC (integrated circuit);
an image input system circuit configured to input image data;
a frame memory configured to store the image data;
a laser oscillator configured to radiate a laser to a screen;
a deflection part including a reflective optical element and an angle detector for detecting first and second oscillation angles of the reflective optical element and configured to oscillate the reflective optical element with respect to two perpendicularly intersecting axes;
a storage part configured to store coefficient data of a polynomial expression including a first group of coefficients obtained from the polynomial expression;
an irradiation position calculating part configured to obtain, by way of the IC, a second group of coefficients based on the first group of coefficients stored in the storage part and the first and second oscillation angles detected by the angle detector, and calculate, by way of the IC, an irradiation position by using the second group of coefficients;
an address calculating part configured to calculate, by way of the IC, an address in the frame memory corresponding to the irradiation position;
a memory control part configured to read out pixel data of the address, wherein the memory control part includes:
an input buffer configured to temporarily store the image data and write the image data to the frame memory;
an address generating part configured to generate, by way of the IC, a readout address;
a data reproducing part configured to reproduce the image data consecutively requested to be read out and blank image data corresponding to the blank address;
a determining part configured to determine, by way of the IC, whether there are consecutive requests to read out the image data from the same address in the frame memory, determine, by way of the IC, whether there is a request to read the image data corresponding to a blank address by referring to the address generating part, and determining, by way of the IC, whether the reading of the blank address is ignore by depict a blank at a corresponding timing;
wherein the determining part is configured to count, by way of the IC, the number of times of the request to read the image data corresponding to the blank address and report the number of times to the data reproducing part;
wherein the data reproducing part is configured to duplicate, by way of the IC, the blank image data corresponding to the blank address in accordance with the number of times;
wherein the determining part is configured to determine, by way of the IC, that there are consecutive requests to read out the image data from the same address in the frame memory when an address prior to a current address generated by the address generating part is the blank address or when at least one of the current address or the address prior to the current address is not the blank address;
a readout instructing part configured to instruct, by way of the IC, the frame memory to output the image data in a case where the determining part determines that there are no consecutive requests to read out the image data and no request to read the image data corresponding to the blank address, wherein no laser is radiated to a position corresponding to the blank image data;

a data obtaining part configured to obtain the image data from the frame memory; and a laser drive part configured to oscillate the laser oscillator in accordance with a luminance corresponding to the pixel data.

\* \* \* \* \*